(12) United States Patent
Michie, Jr.

(10) Patent No.: US 8,318,862 B2
(45) Date of Patent: Nov. 27, 2012

(54) POLYETHYLENE COMPOSITIONS, METHODS OF MAKING THE SAME, AND ARTICLES PREPARED THEREFROM

(75) Inventor: William J. Michie, Jr., Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 105 days.

(21) Appl. No.: 12/664,012

(22) PCT Filed: Oct. 19, 2007

(86) PCT No.: PCT/US2007/081894
§ 371 (c)(1),
(2), (4) Date: Apr. 15, 2010

(87) PCT Pub. No.: WO2008/153586
PCT Pub. Date: Dec. 18, 2008

(65) Prior Publication Data
US 2010/0203311 A1    Aug. 12, 2010

Related U.S. Application Data

(60) Provisional application No. 60/943,680, filed on Jun. 13, 2007, provisional application No. 60/853,652, filed on Oct. 23, 2006.

(51) Int. Cl.
C08F 8/00 (2006.01)
C08L 23/00 (2006.01)
C08L 23/04 (2006.01)

(52) U.S. Cl. ..................... 525/191; 525/240

(58) Field of Classification Search ............... 525/191, 525/240
See application file for complete search history.

(56) References Cited

U.S. PATENT DOCUMENTS

| | | | |
|---|---|---|---|
| 6,248,831 B1 | 6/2001 | Maheshwari et al. | |
| 6,770,341 B1 | 8/2004 | Bohm et al. | |
| 2004/0034169 A1* | 2/2004 | Zhou et al. | 525/240 |
| 2004/0158001 A1 | 8/2004 | Hamrock | |
| 2004/0158011 A1 | 8/2004 | Jain et al. | |

FOREIGN PATENT DOCUMENTS

| | | |
|---|---|---|
| EP | 0492656B1 A1 | 7/1992 |
| WO | WO 96/12762 | 5/1996 |
| WO | WO-97/29152 A2 | 8/1997 |
| WO | WO-00/01765 A1 | 1/2000 |
| WO | WO-00/18814 A1 | 4/2000 |
| WO | WO-00/40620 A1 | 7/2000 |
| WO | WO-01/02480 A1 | 1/2001 |
| WO | WO-01/25328 A1 | 4/2001 |
| WO | WO-03/020821 A1 | 3/2003 |
| WO | WO-03/033586 A1 | 4/2003 |
| WO | WO-03/051937 A1 | 6/2003 |
| WO | WO-03/102075 A1 | 12/2003 |
| WO | WO 2004/025523 | 3/2004 |
| WO | WO 2004/101674 | 11/2004 |
| WO | WO-2008/153586 A1 | 12/2008 |

OTHER PUBLICATIONS

Abstract of JP 2004217802 (A) ; Publication date Aug. 5, 2004, Yahiro Shuji, Asahi Chemical Corp.
Abstract of JP 2004231844 (A); Polyethylene Resin Composition ,Publication date Aug. 19, 2004; Takahashi Kei; Origasa Yuichi; Egashira Toshiaki ± (Takahashi Kei, ; Origasa Yuichi, ; Egashira Toshiaki) Applicant(s): Japan Polyolefins Co Ltd ± (Japan Polyolefins Co Ltd).
Abstract of JP 2003253063 (A);Polyethylene Resin Composition for Aluminum Composite Pipe;Publication date: Sep. 10, 2003 Inventor(s): Yahiro Shuji ± (Yahiro Shuji) Applicant(s): Asahi Chemical Corp ± (Asahi Kasei Corp).
Abstract of JP 2003128848 (A); Polyethylene Composition; Publication date: May 8, 2003 Inventor(s): Nozaki Takashi ± (Nozaki Takashi) Applicant(s): Asahi Chemical Corp.
Abstract of JP 8134285 (A); Ethylene Copolymer Composition; Publication date: May 28, 1996 Inventor(s): Kishine Masahiro; Matsunaga Shinya; Nagano Shinichi ± (Kishine Masahiro, ; Matsunaga Shinya, ; Nagano Shinichi) Applicant(s): Mitsui Petrochemical Ind ± (Mitsui Petrochem Ind Ltd).
U.S. Appl. No. 60/943,680.
U.S. Appl. No. 60/653,652.
Abstract WO1997029152 is English p. 1; no other English Equiv. of this patent.

* cited by examiner

*Primary Examiner* — Nathan M Nutter

(57) ABSTRACT

The invention is related to films formed from a composition, comprising a blend, wherein said blend comprises a high molecular weight ethylene-based interpolymer and a low molecular weight ethylene-based interpolymer, and the high molecular weight ethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and the low molecular weight ethylene-based interpolymer is heterogeneously branched linear or a homogeneously branched linear ethylene-based interpolymer, and has a density from 0.940 g/cc to 0.955 g/cc, and a melt index (I2) from 6 g/10 min to 50 g/10 min. The blend has a single peak in an ATREF profile eluting above 30° C., and has a coefficient of viscosity average molecular weight (CMv) less than −0.0032 in the log(calculated Mv) versus elution temperature, said CMv calculated in the range of elution temperatures from 70° C. to 90° C. The Mv is the viscosity average molecular weight.

18 Claims, 29 Drawing Sheets

Sample 1515

Sample I517

Sample 1922

Sample C510

Sample C920

Sample C921

Sample C923

Sample C924

Sample Com049

Sample Com769

Inventive Example D20

POLYETHYLENE COMPOSITIONS, METHODS OF MAKING THE SAME, AND ARTICLES PREPARED THEREFROM

REFERENCE TO RELATED APPLICATIONS

This application claims the benefit of U.S. Provisional Application No. 60/943,680, filed on Jun. 13, 2007, and U.S. Provisional Application No. 60/853,652, filed on Oct. 23, 2006; each application is fully incorporated herein by reference.

The present invention provides films formed from polyethylene compositions, and articles formed from such films.

Polyethylene compositions with a multimodal molecular weight distribution (MWD), for example a bimodal MWD, can offer distinct advantages compared with unimodal polyethylenes or other polyolefins, in various applications, including film, pipe, and drip tape and tubing applications. Some multimodal polyethylenes compositions are described in the following International Publications: WO 03/020821; WO 03/102075; WO 97/29152; WO 00/01765; WO 00/18814; WO 01/02480; WO 01/25328; WO03/051937; WO03/033586; WO00/40620; U.S. Pat. No. 6,248,831; Japanese Publication Nos. 2004-217802 (Abstract); 2004-231844 (Abstract); 2003-253063 (Abstract); 2003-128848 (Abstract); 08-134285 (Abstract); and EP0492656B1.

Polyethylene films should have at least the following characteristics: (1) good dart impact, (2) good tear resistance, and (3) excellent stabilization against thermal and oxidative degradation during fabrication, and end use applications. These needs are particularly pronounced in shipping sack applications, such as heavy duty shipping sacks. There is also a need for a polyethylene film resin, which offers an advantageously balanced combination of thermal, mechanical, and processing properties. In particular, there is a need for film resins that exhibit an improved balance of extrudability, bubble stability, dart drop, tensile and tear properties, and FAR (Film Appearance Rating), while being able to be successfully extruded at all commercially required line speeds. Some of these needs and others have been met by the following invention.

SUMMARY OF THE INVENTION

The invention provides a film comprising at least one component formed from a composition, comprising a blend, wherein said blend comprises a high molecular weight ethylene-based interpolymer and a low molecular weight ethylene-based interpolymer, and wherein the high molecular weight ethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is a heterogeneously branched linear or a homogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight.

The invention also provides for articles, each comprising at least one component formed from an inventive film as described herein.

DETAILED DESCRIPTION OF THE INVENTION

Figure 1:
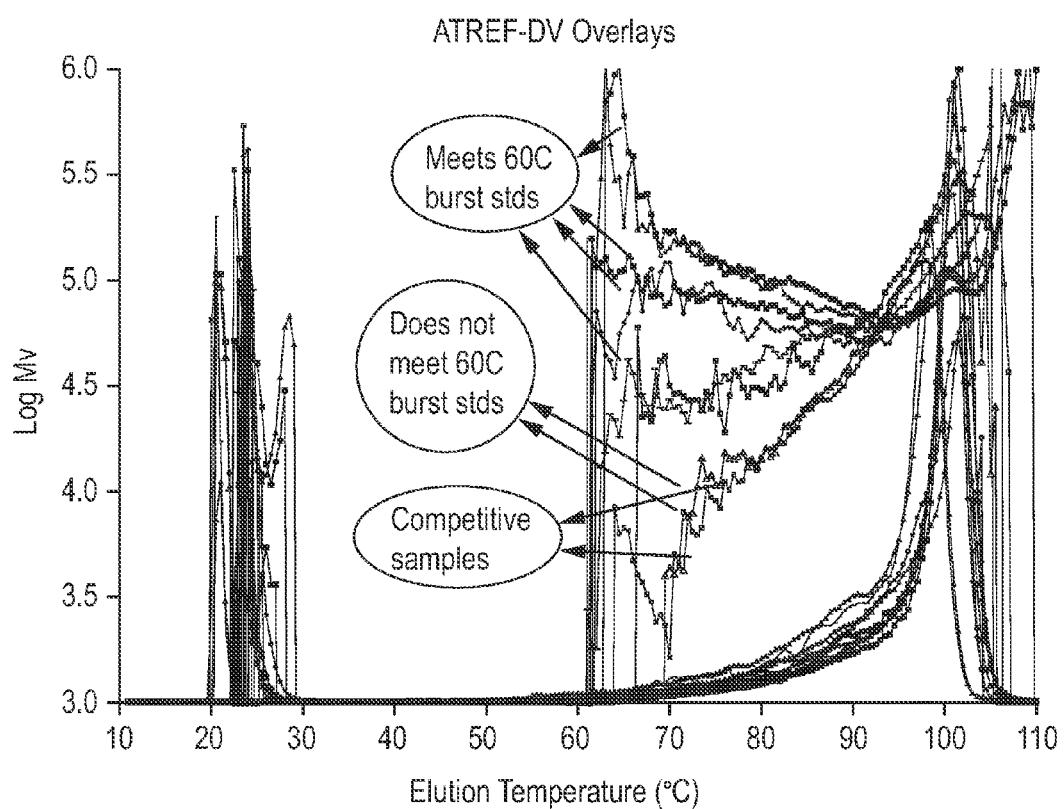
FIG. 1 depicts ATREF-DV profiles of several blends and competitive resins.
Figure 2:
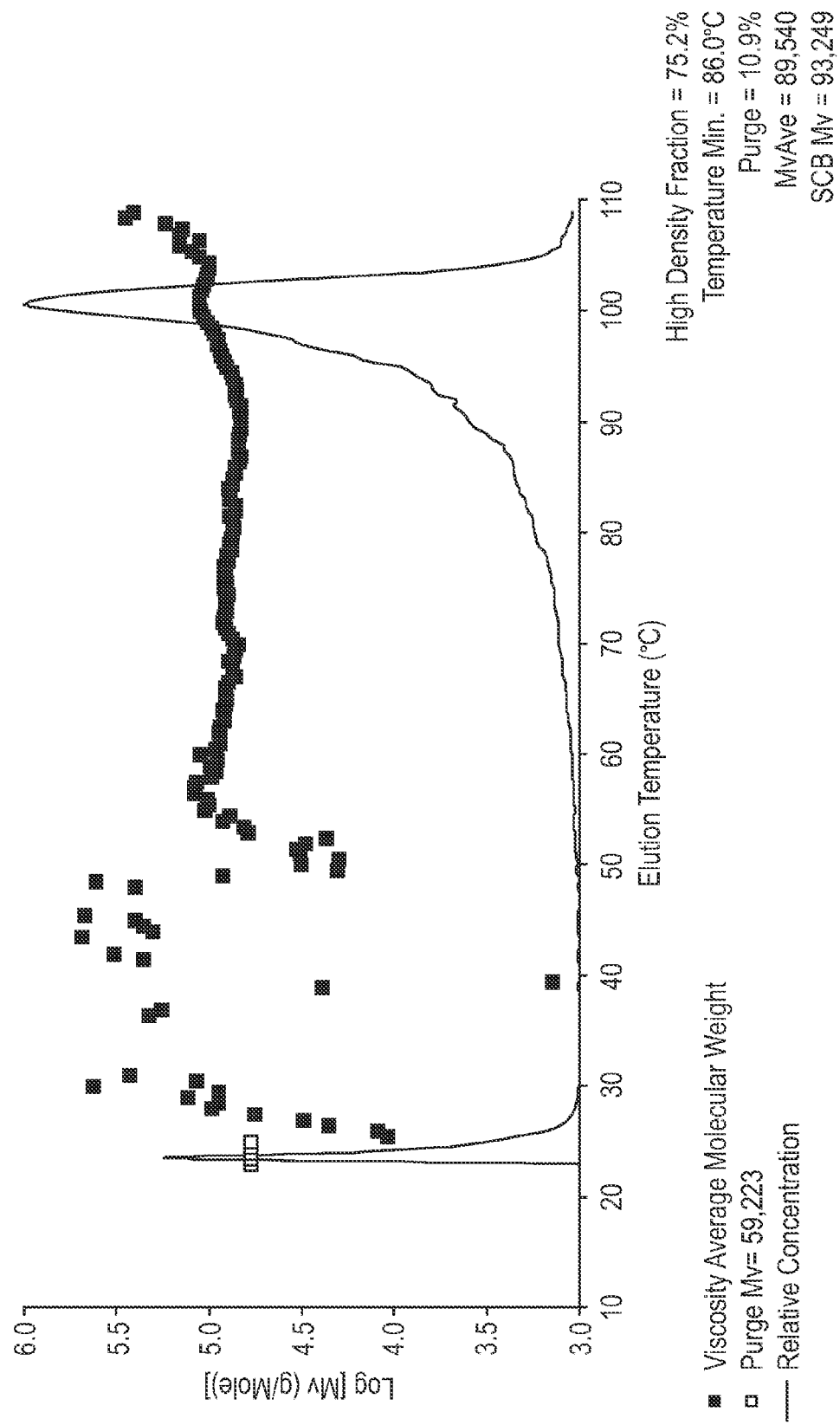
FIGS. 2-29, each depicts an ATREF-DV overlay profile for one blend or competitive resin.
Figure 3:
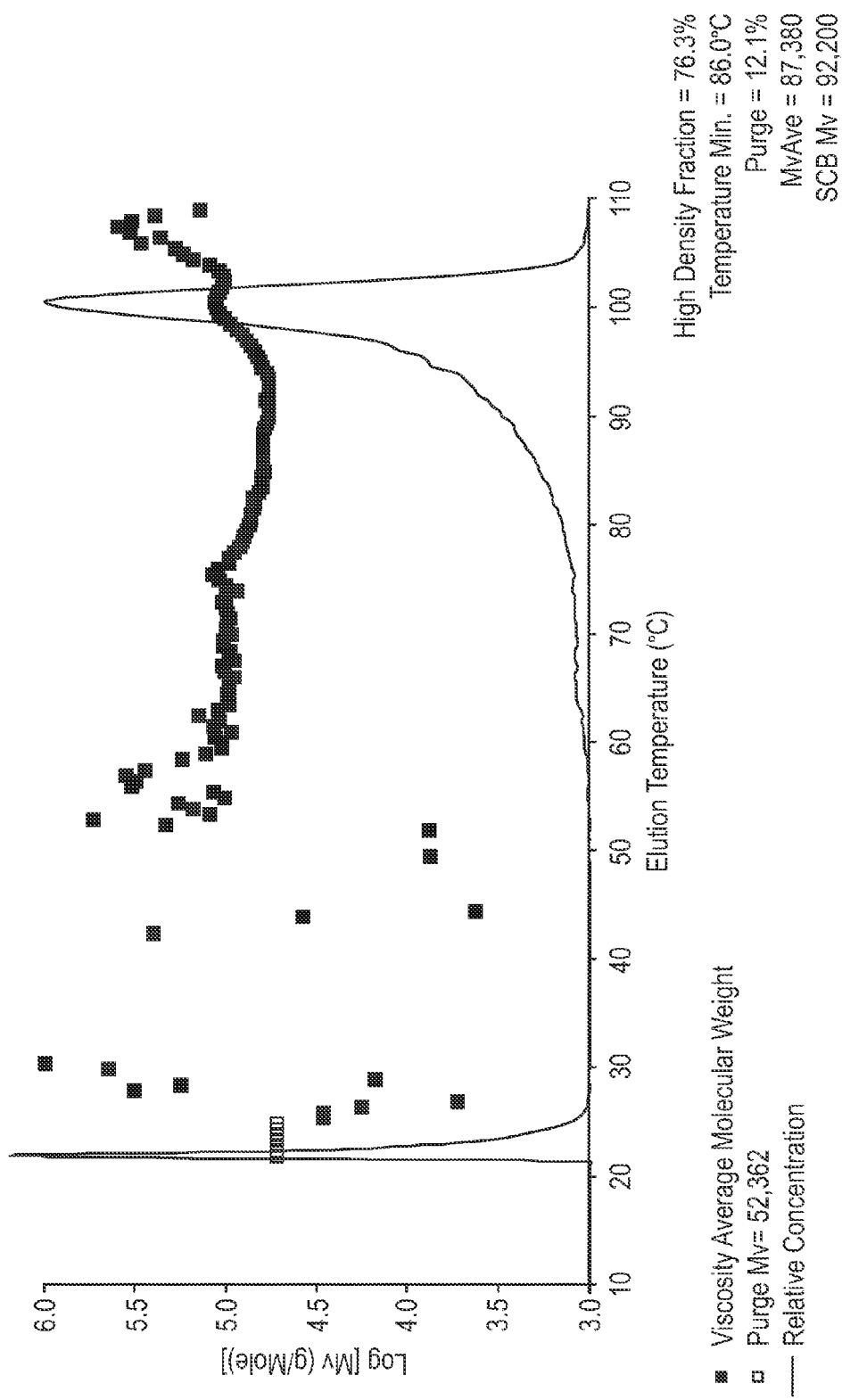
Figure 4:
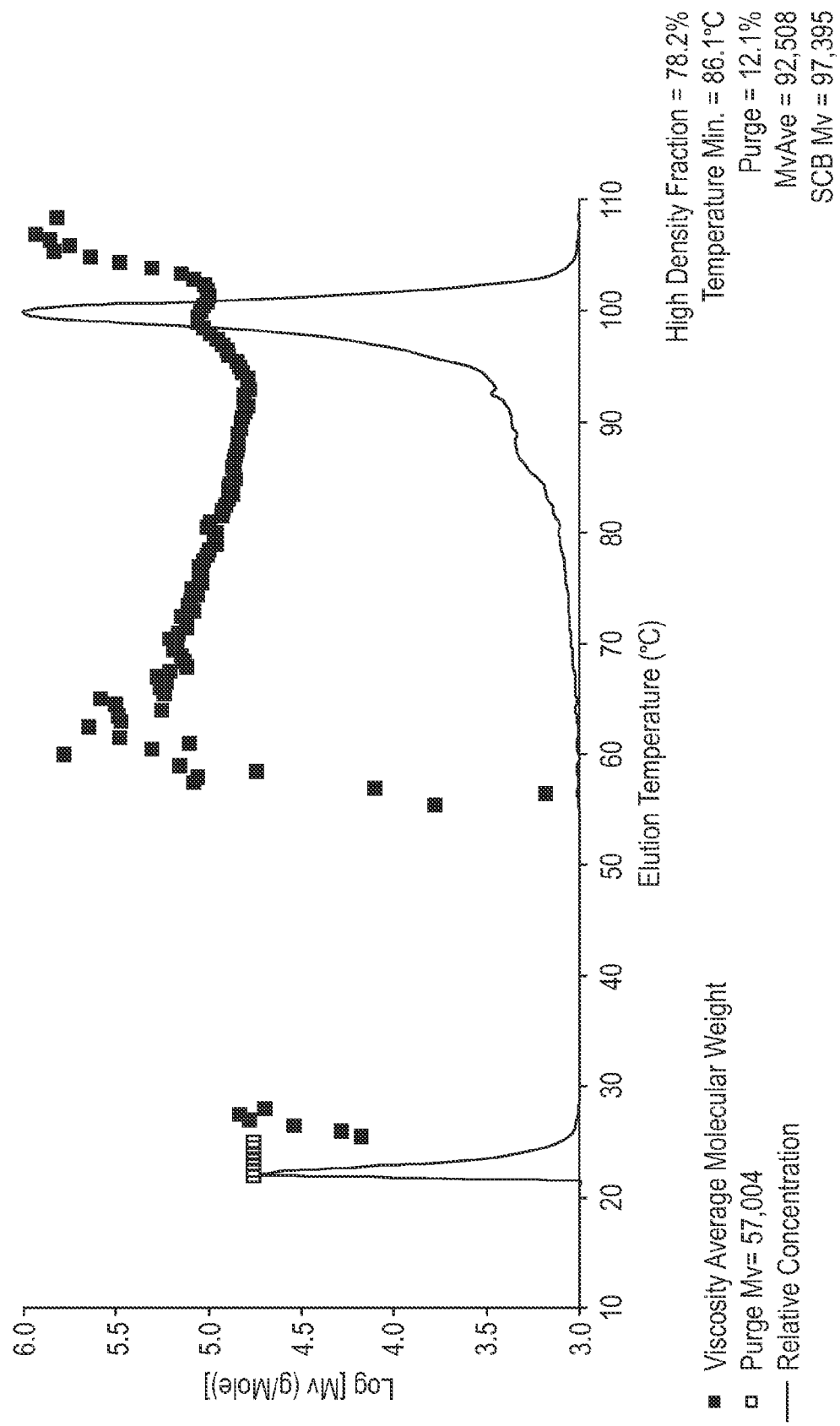
Figure 5:
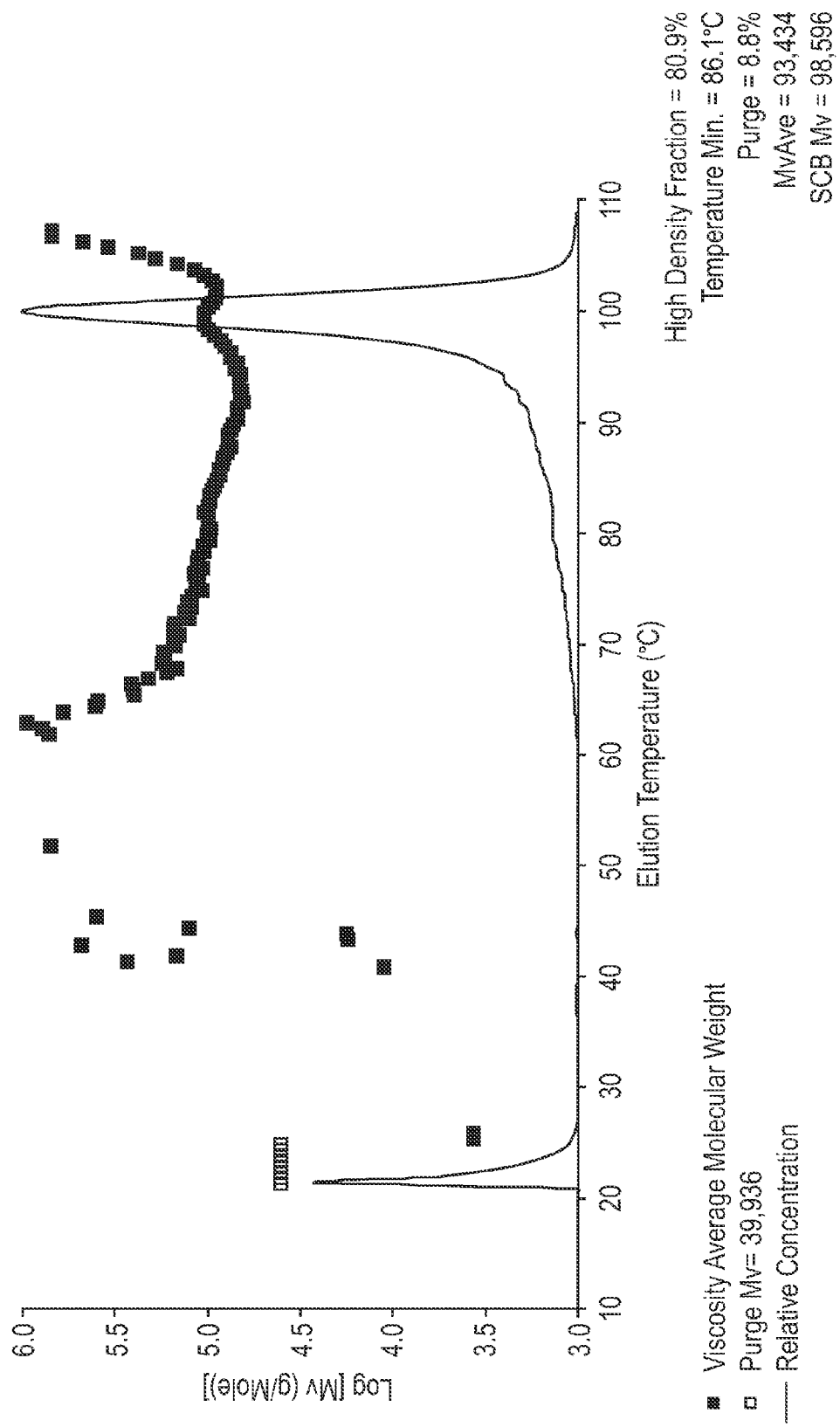
Figure 6:
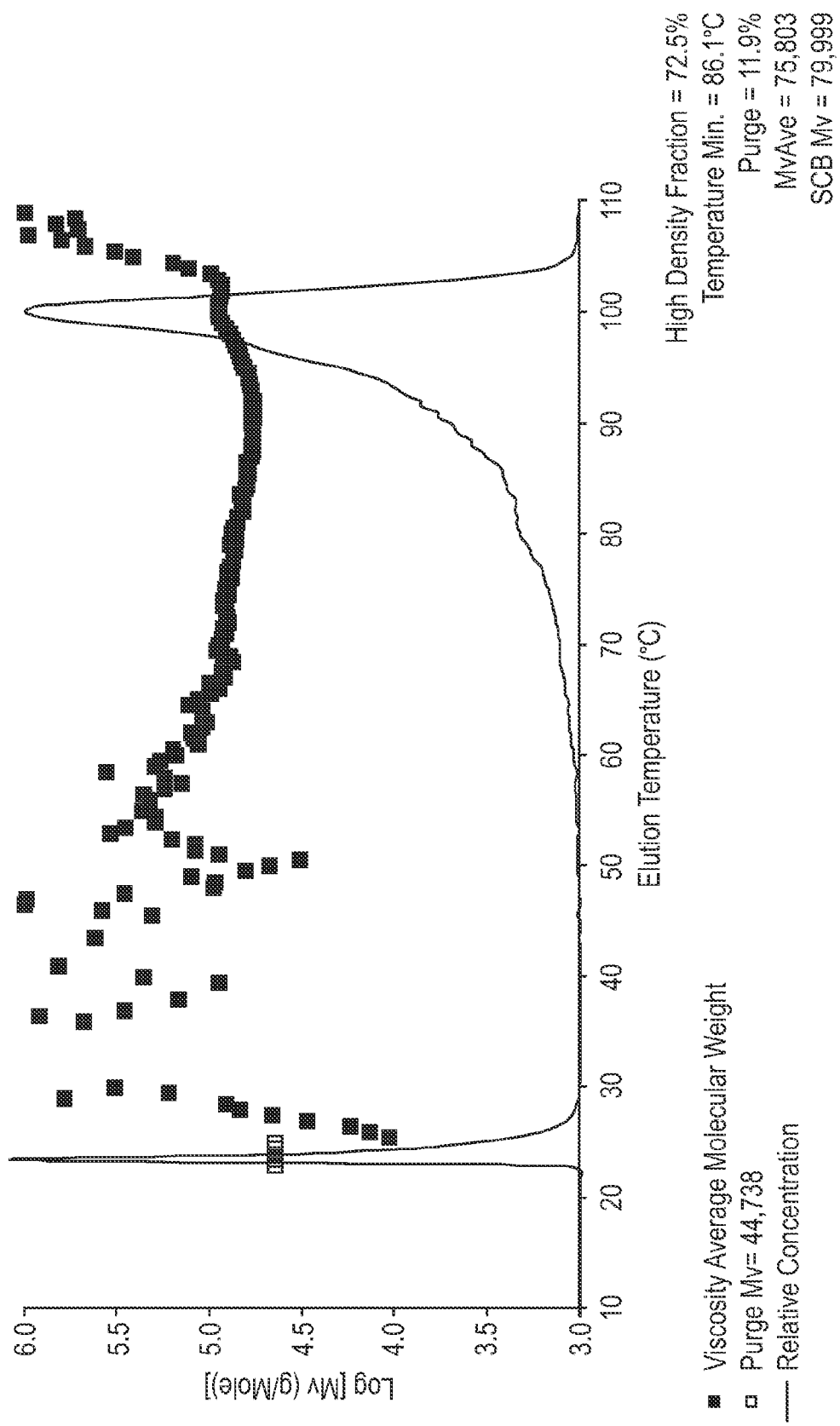
Figure 7:
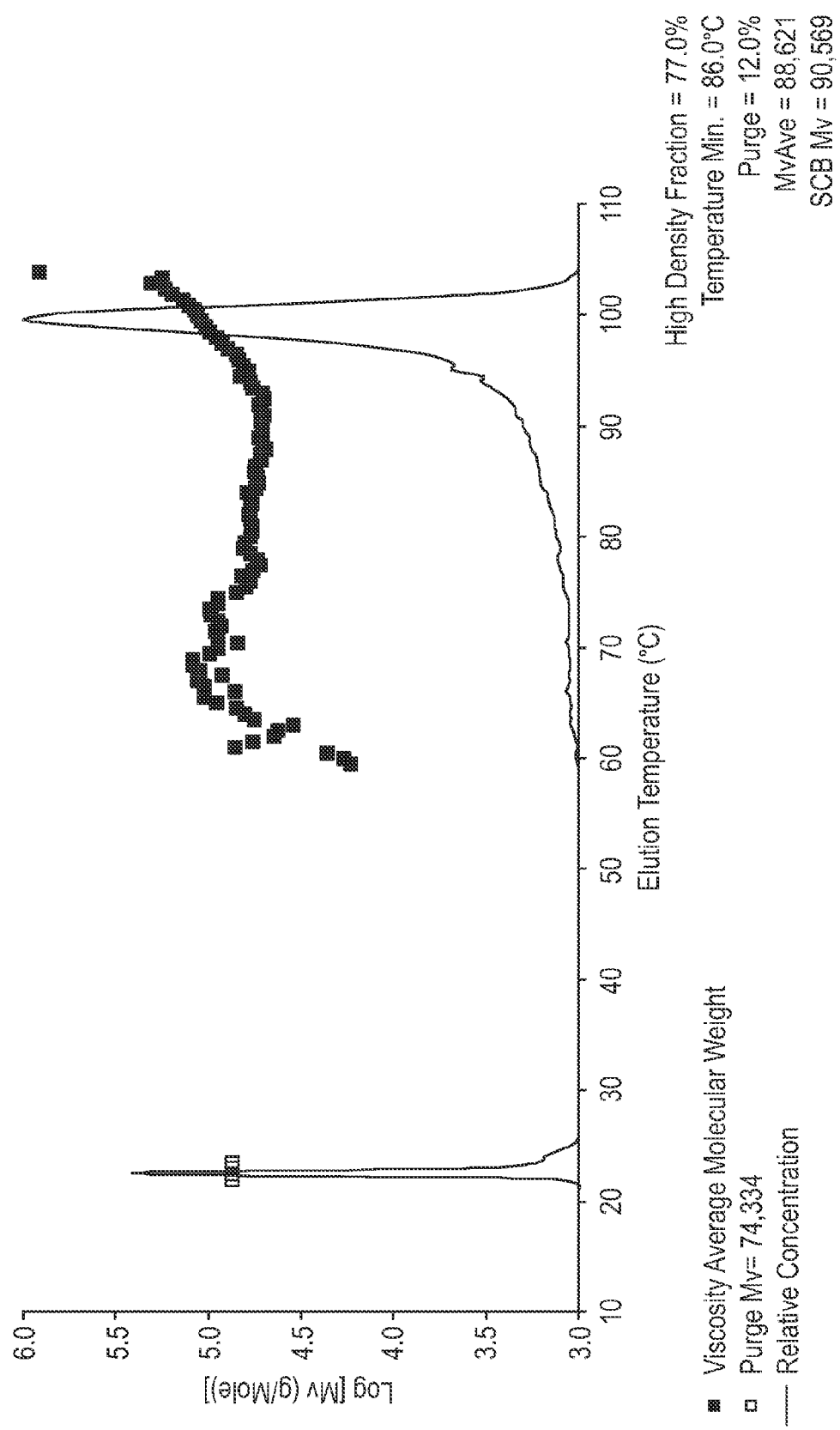
Figure 8:
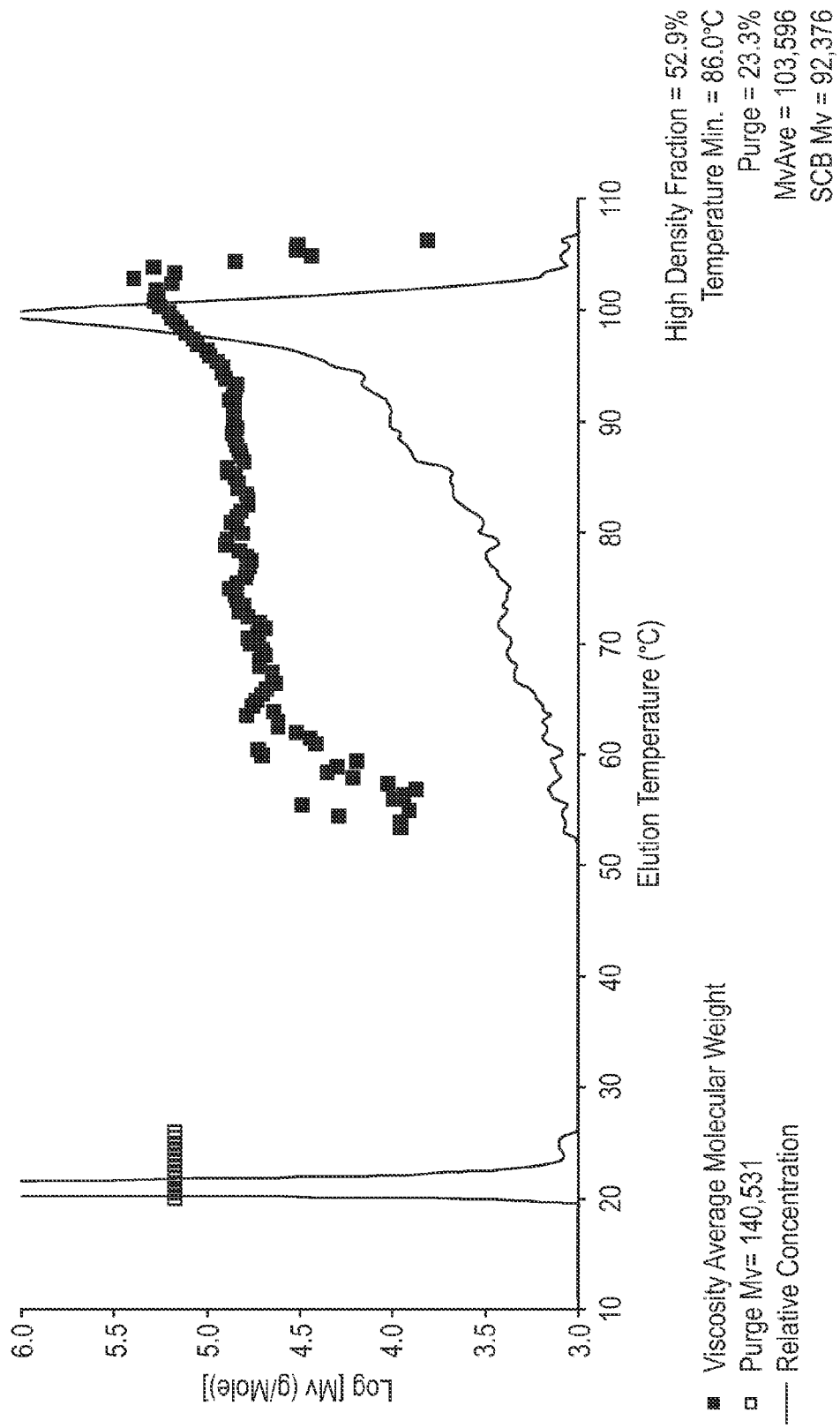
Figure 9:
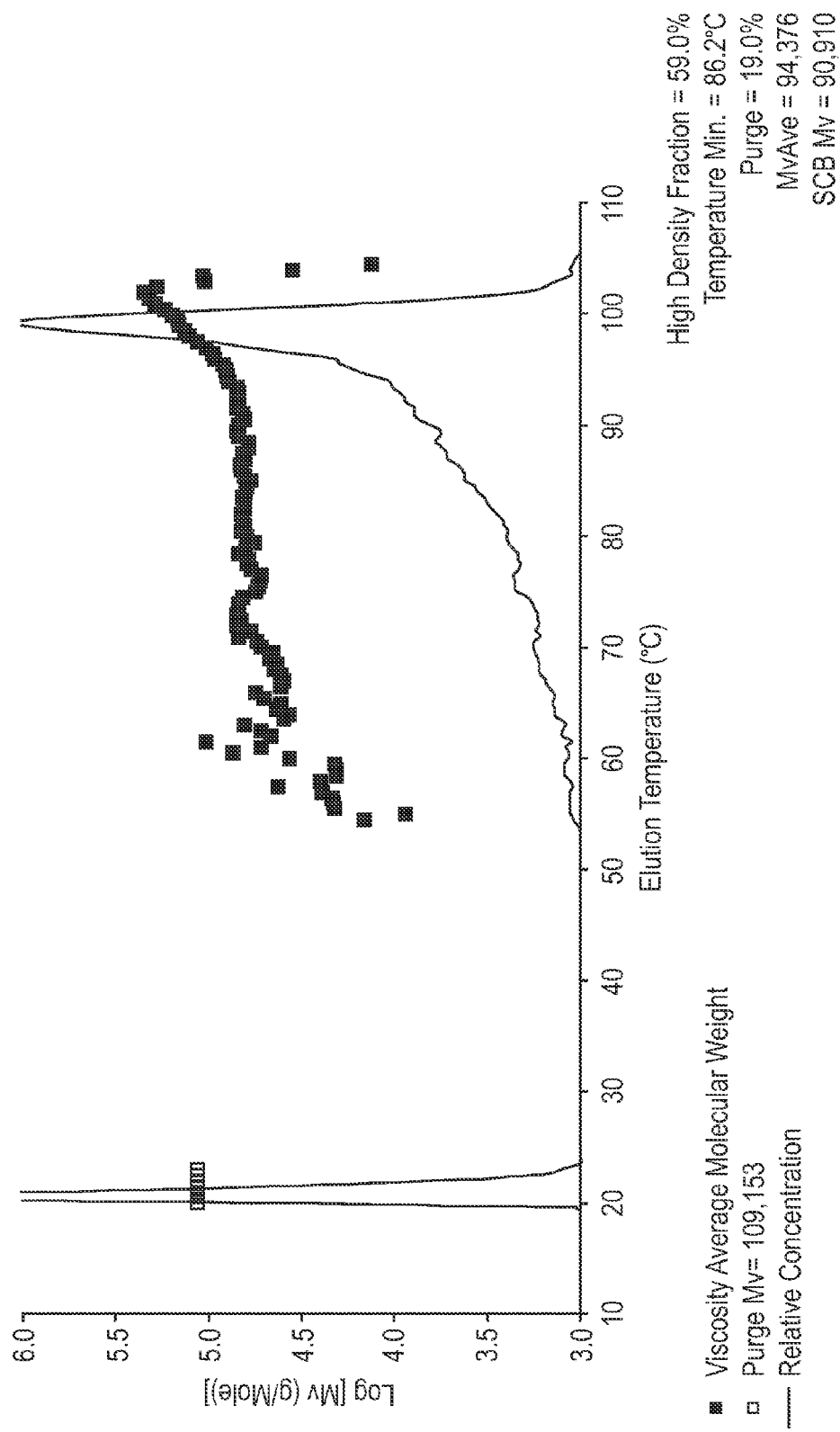
Figure 10:
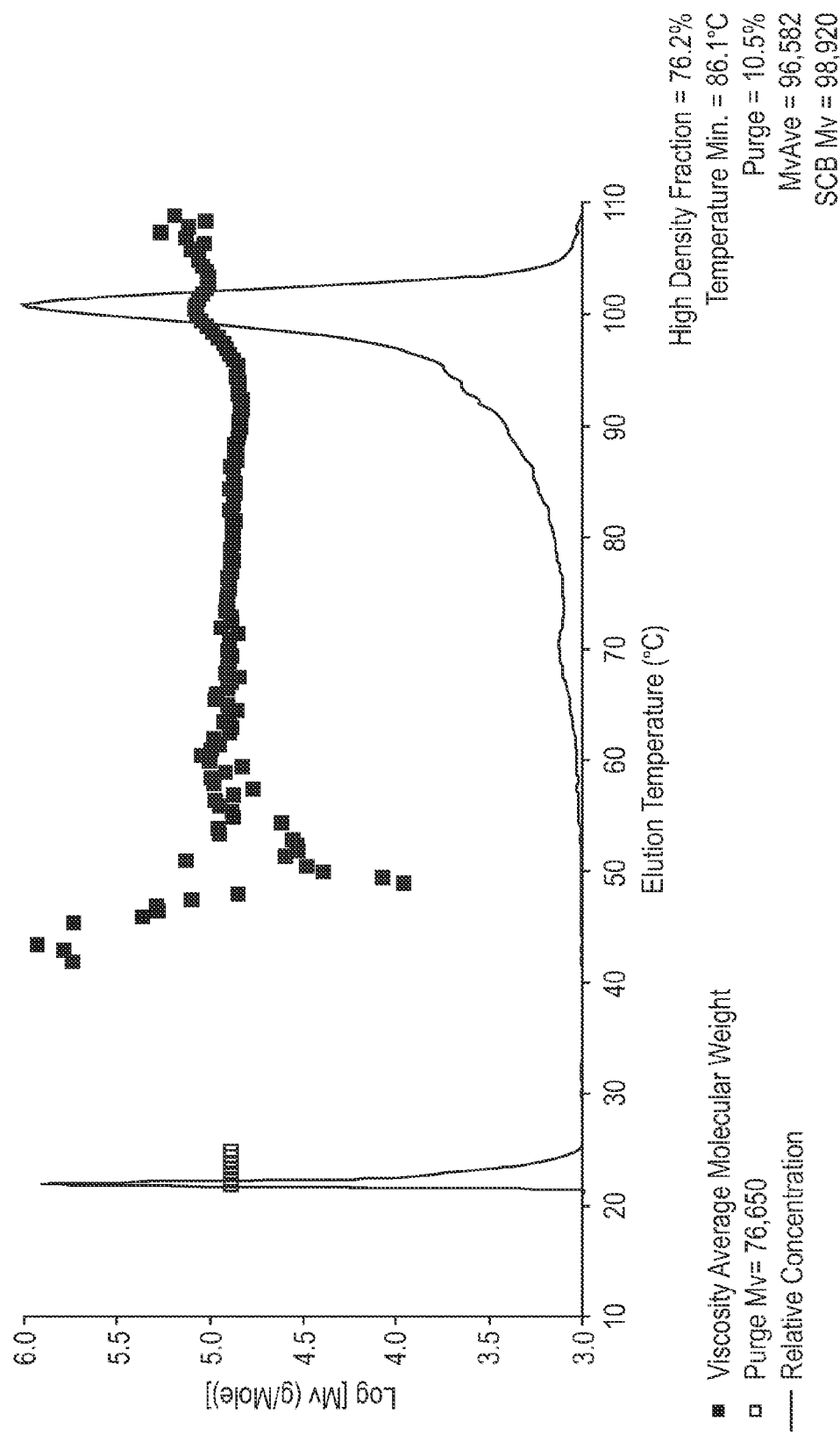
Figure 11:
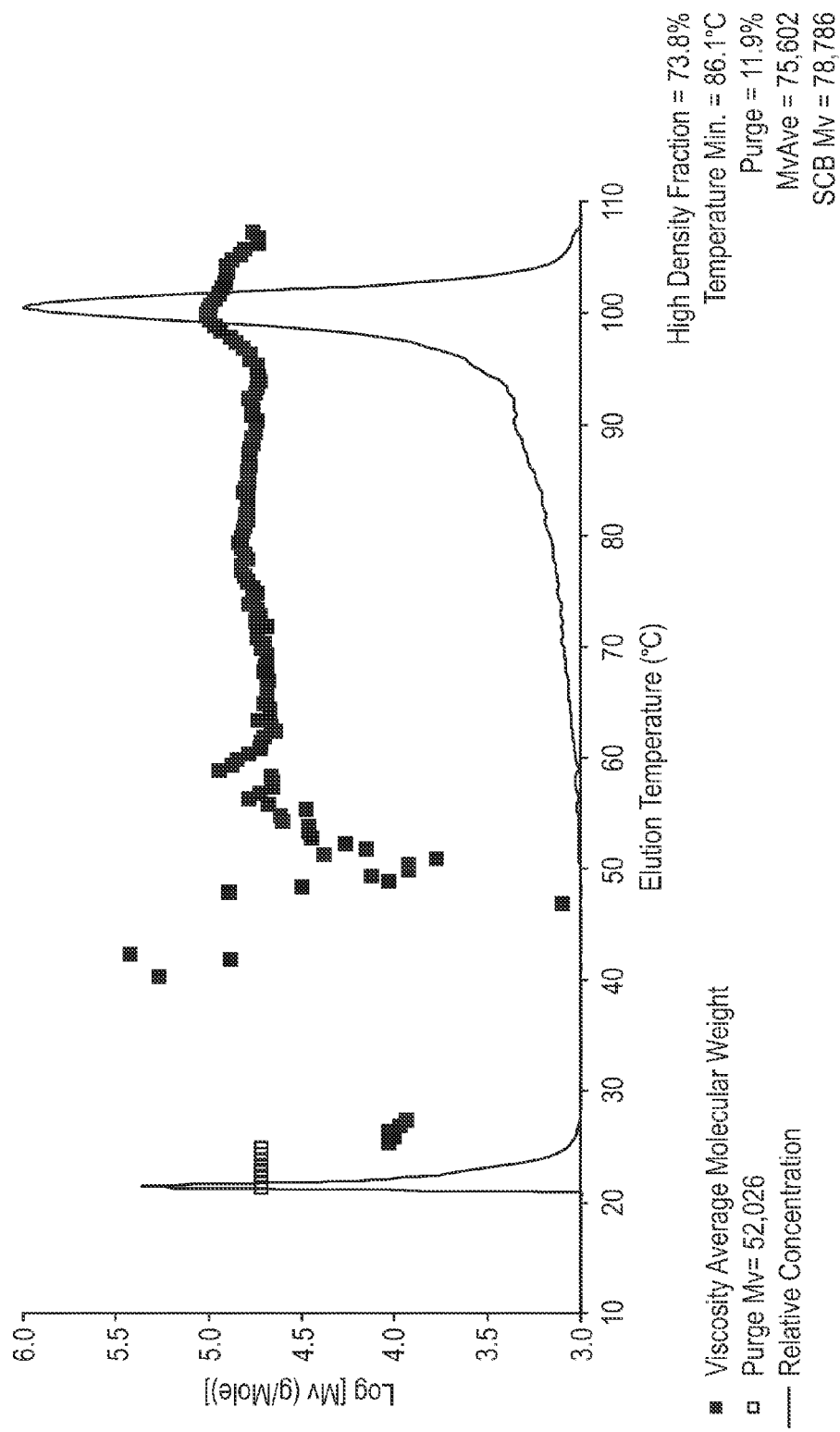
Figure 12:
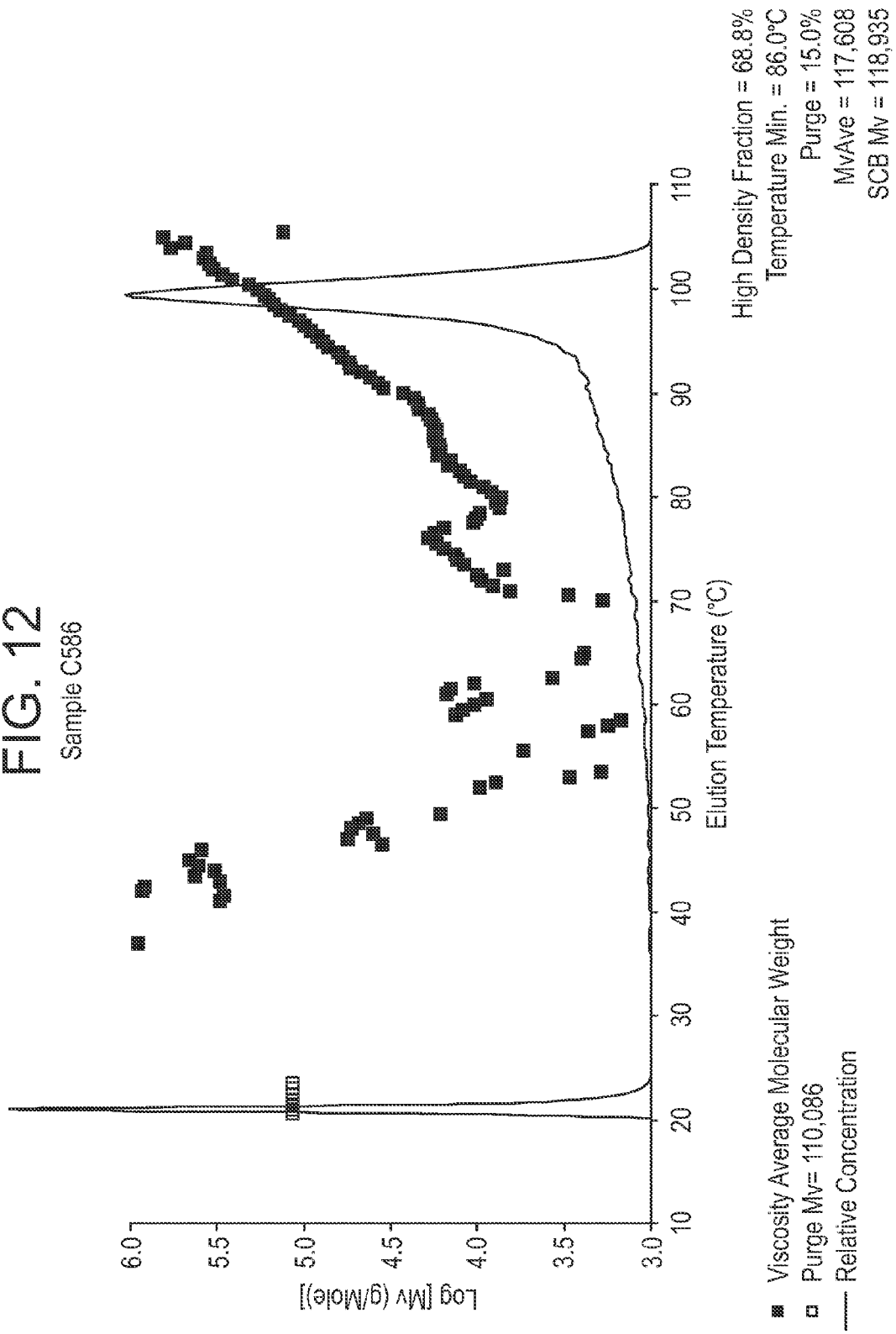
Figure 13:
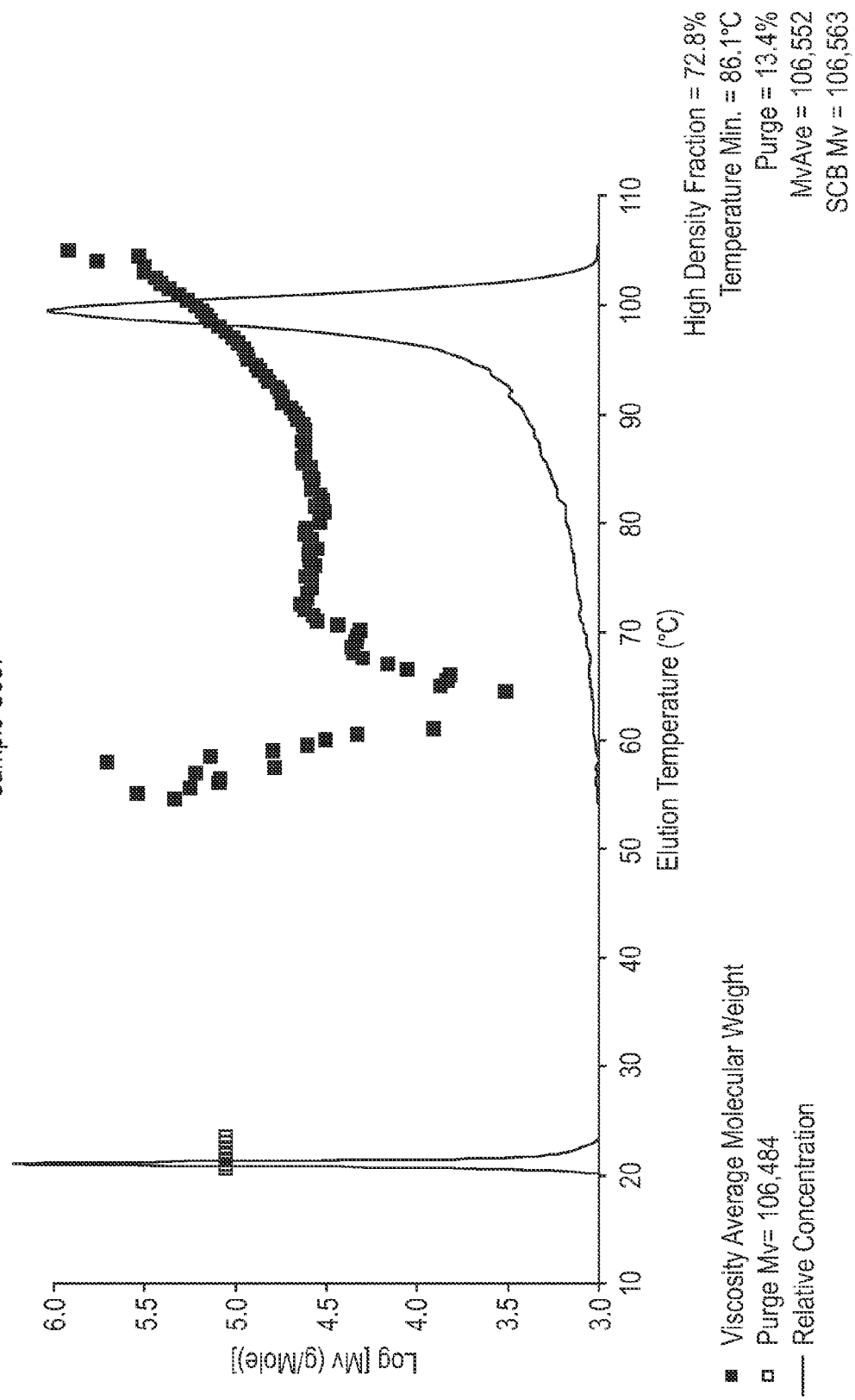
Figure 14:
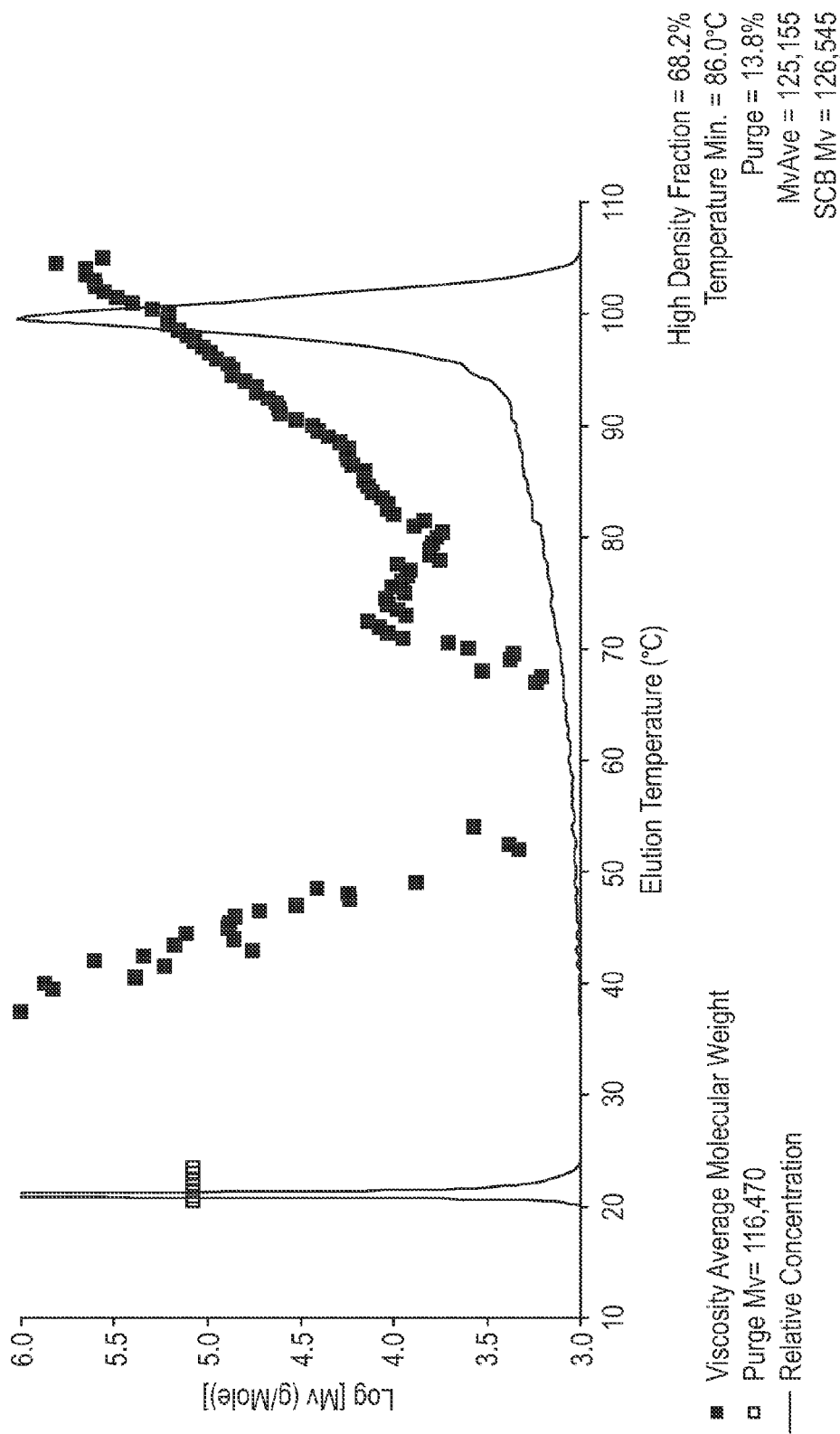
Figure 15:
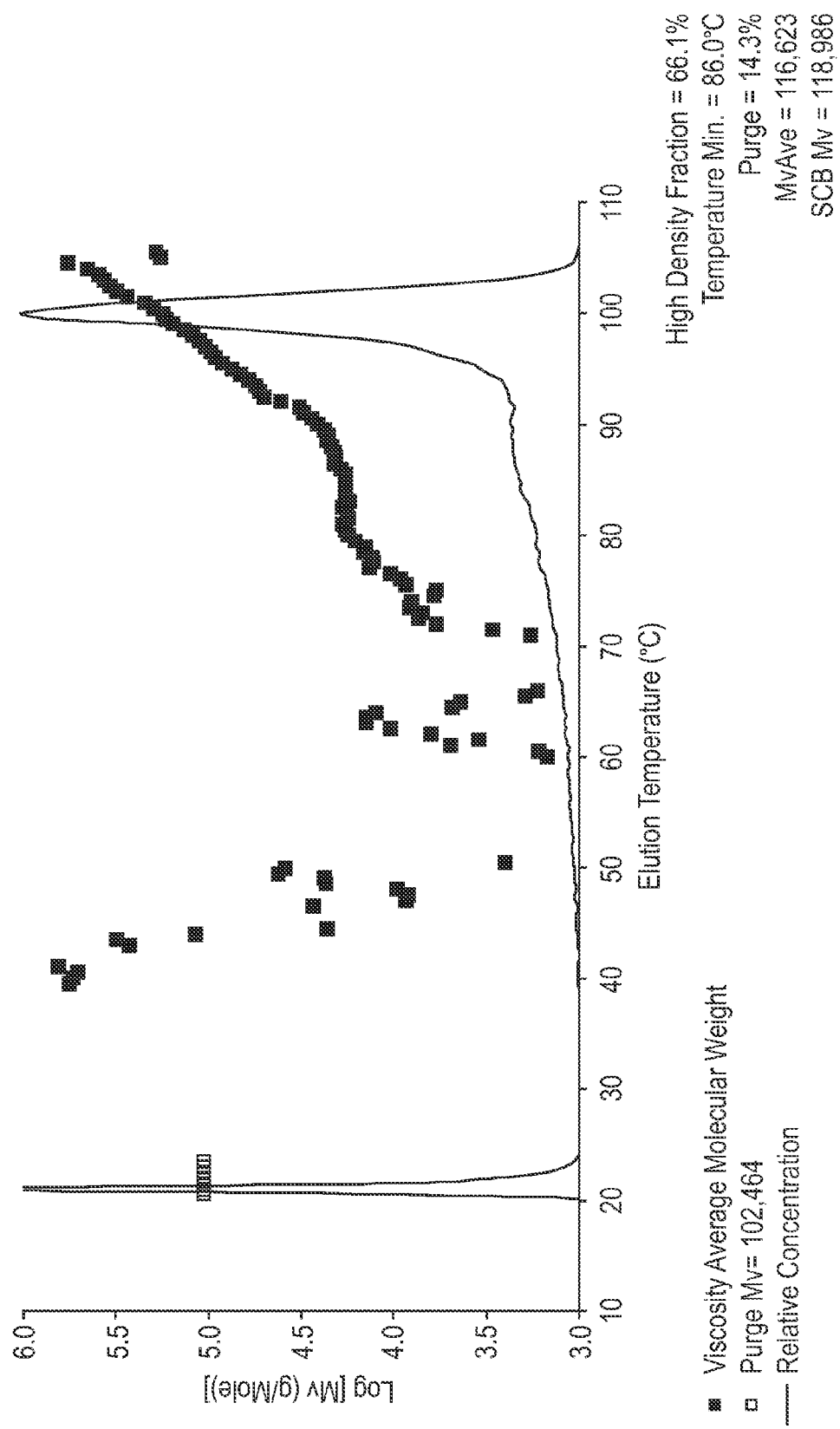
Figure 16:
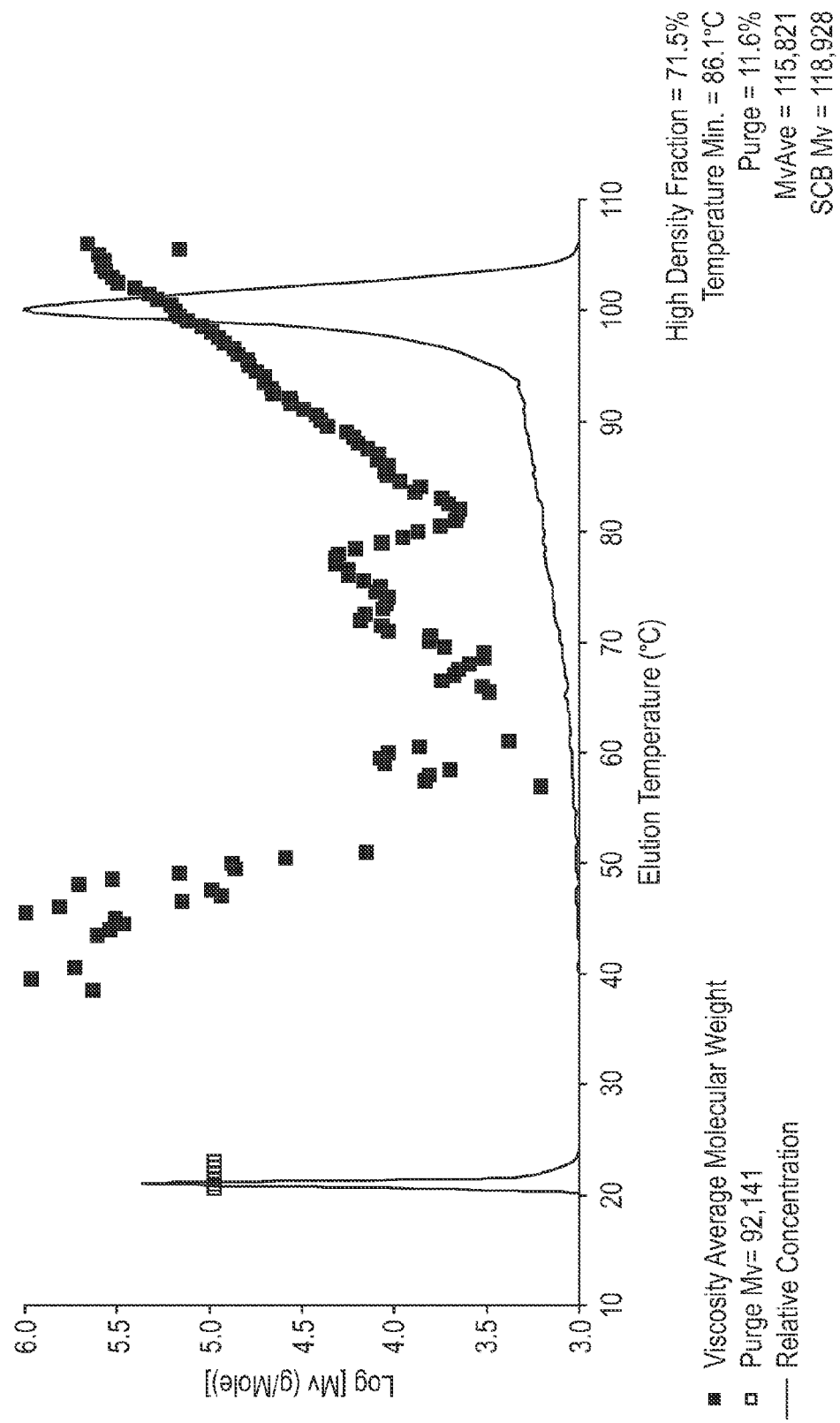
Figure 17:
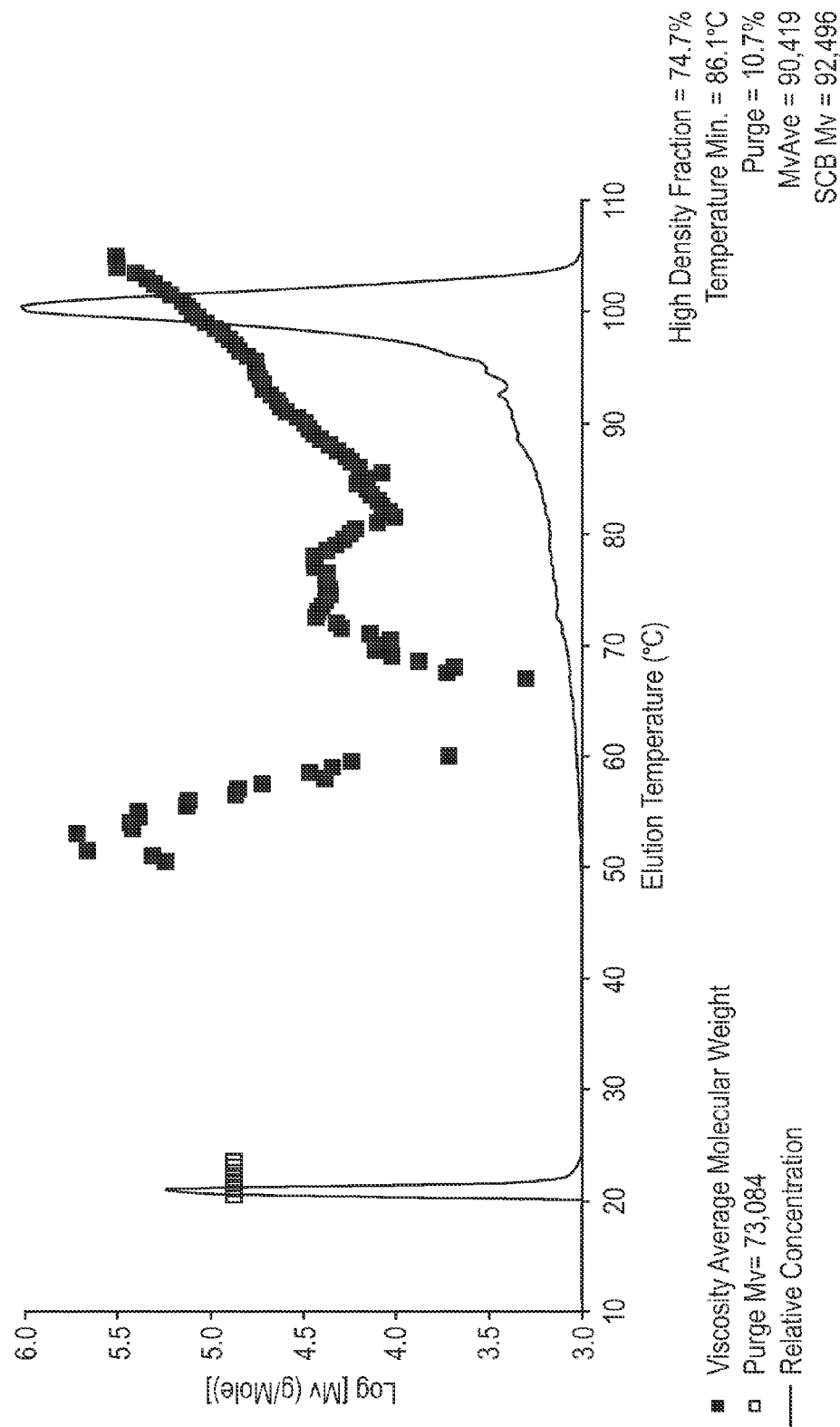
Figure 18:
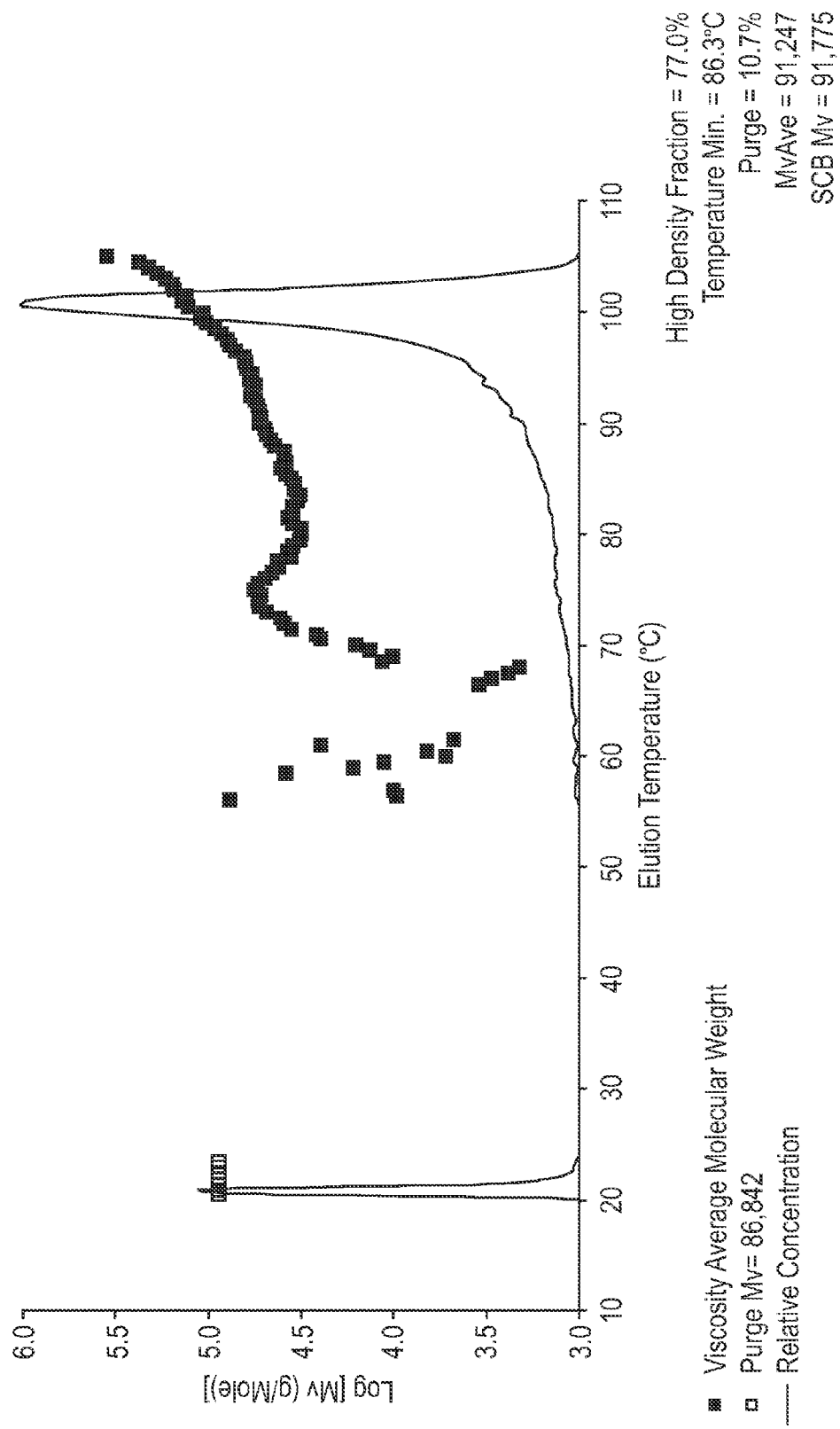
Figure 19:
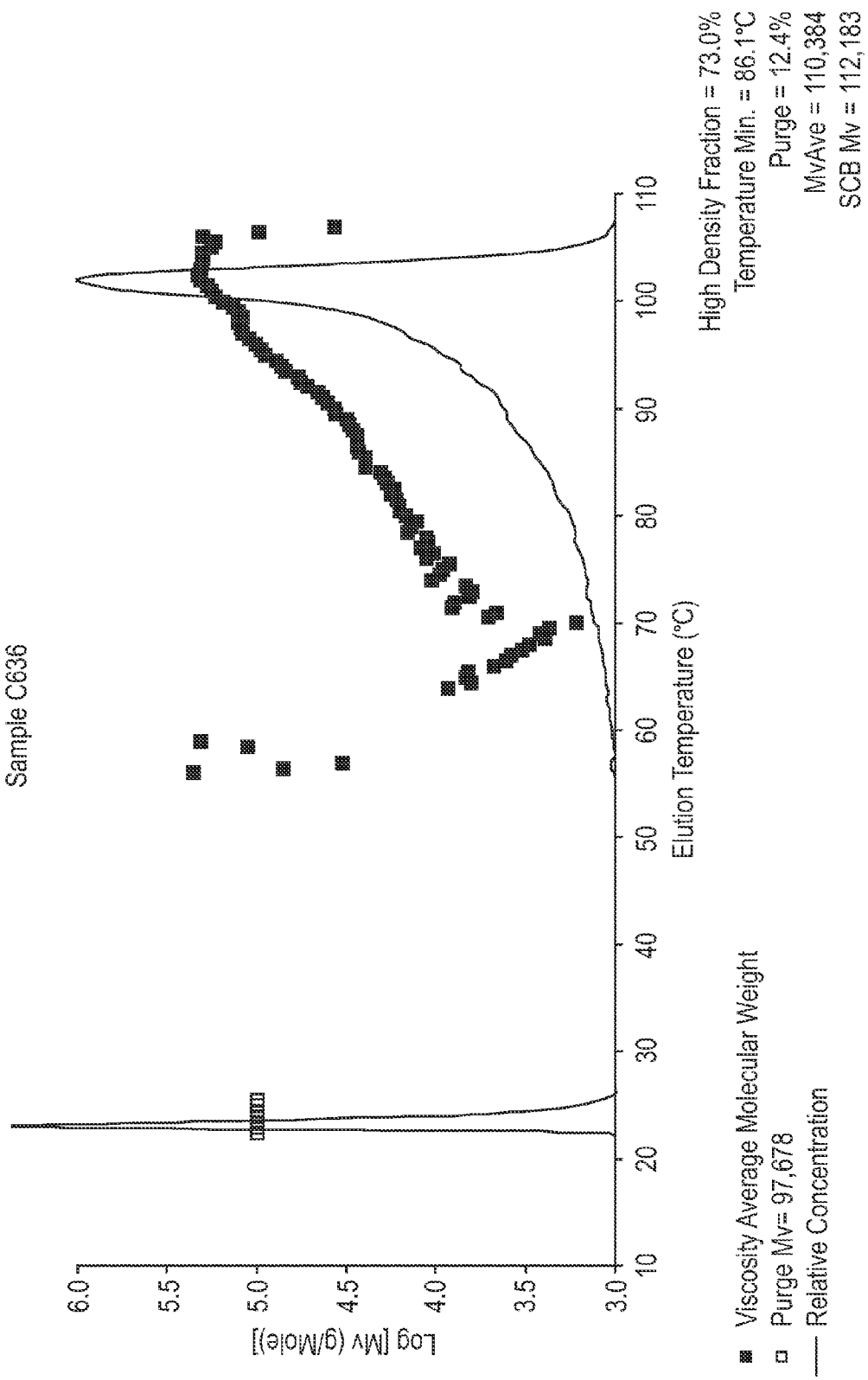
Figure 20:
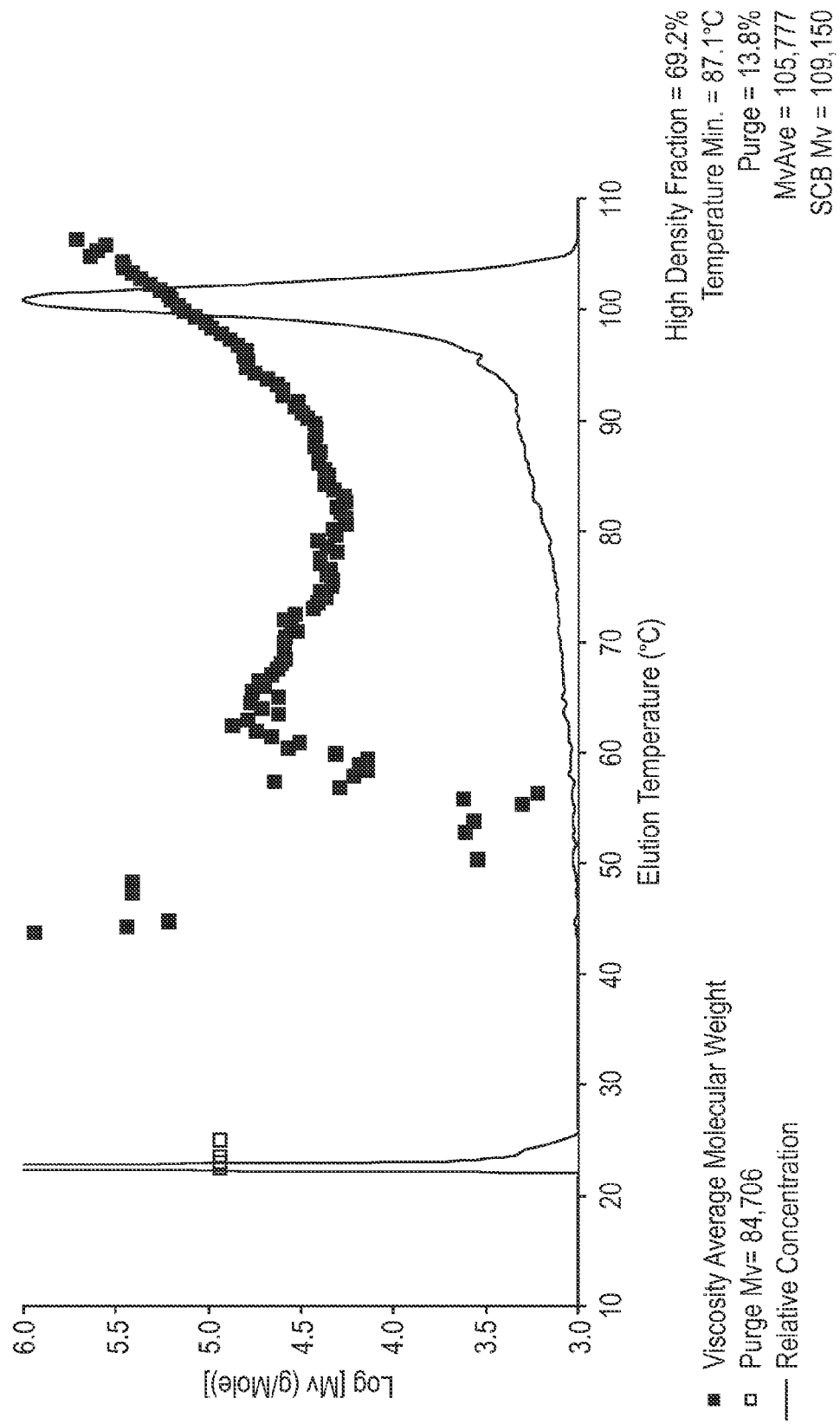
Figure 21:
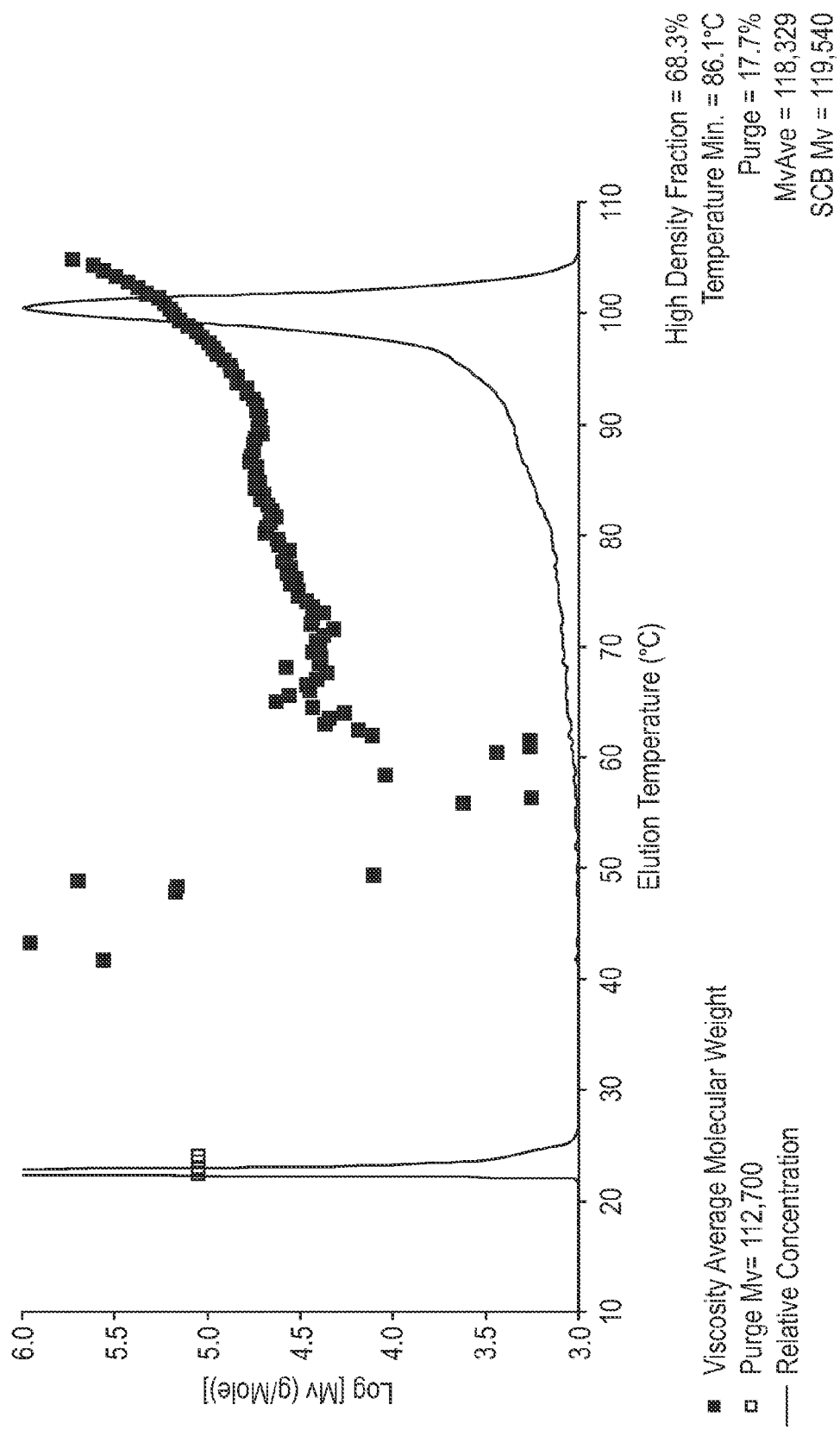
Figure 22:
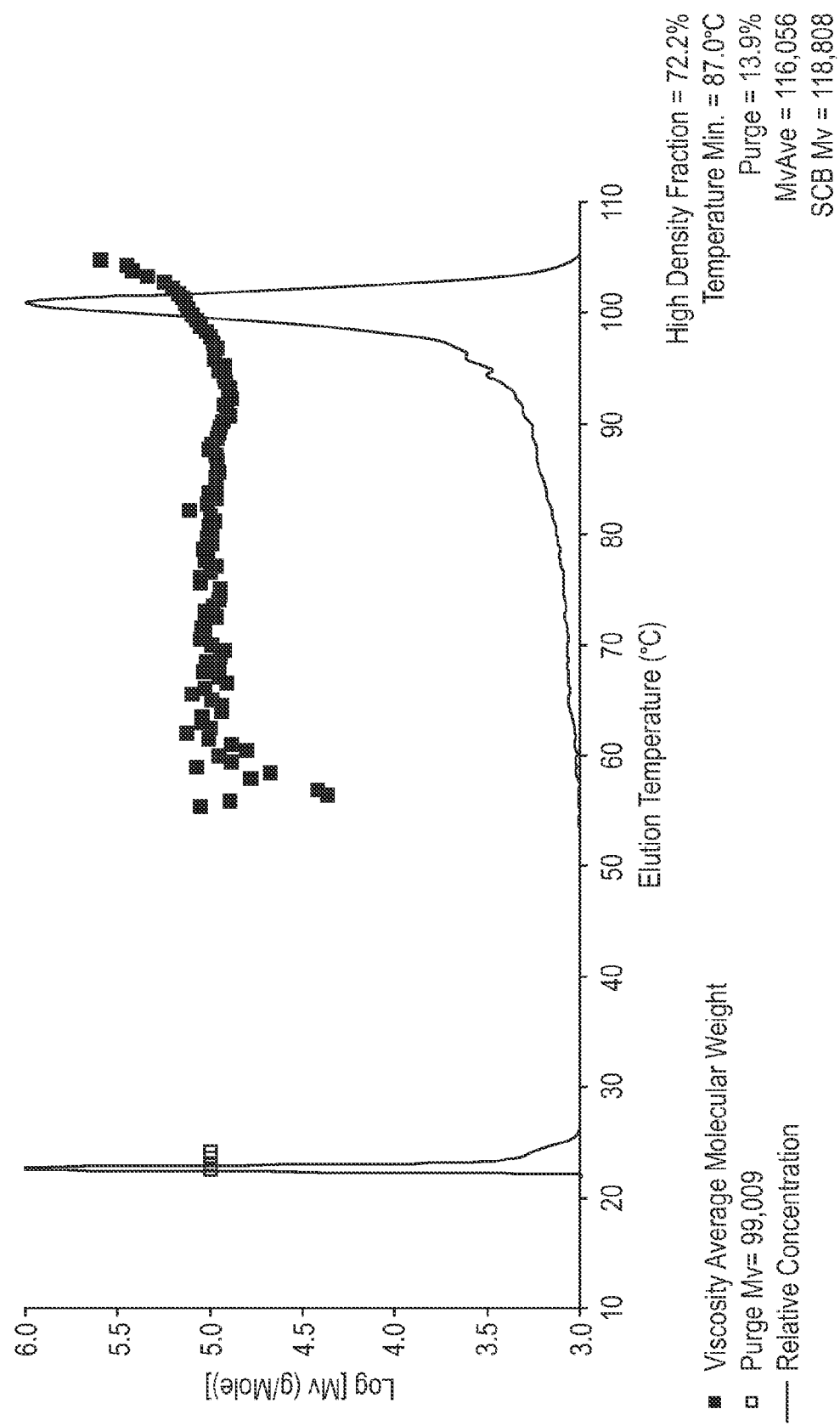
Figure 23:
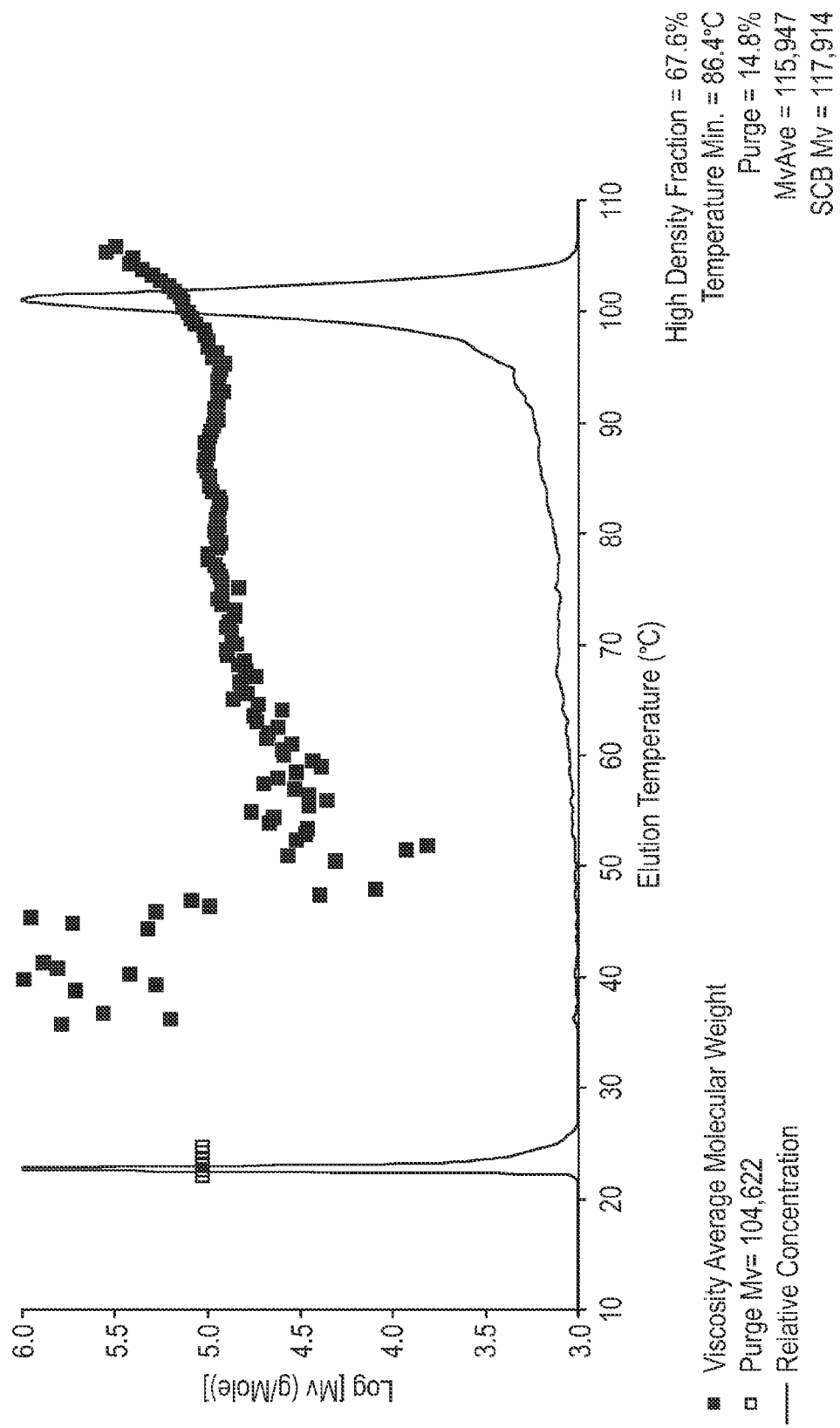
Figure 24:
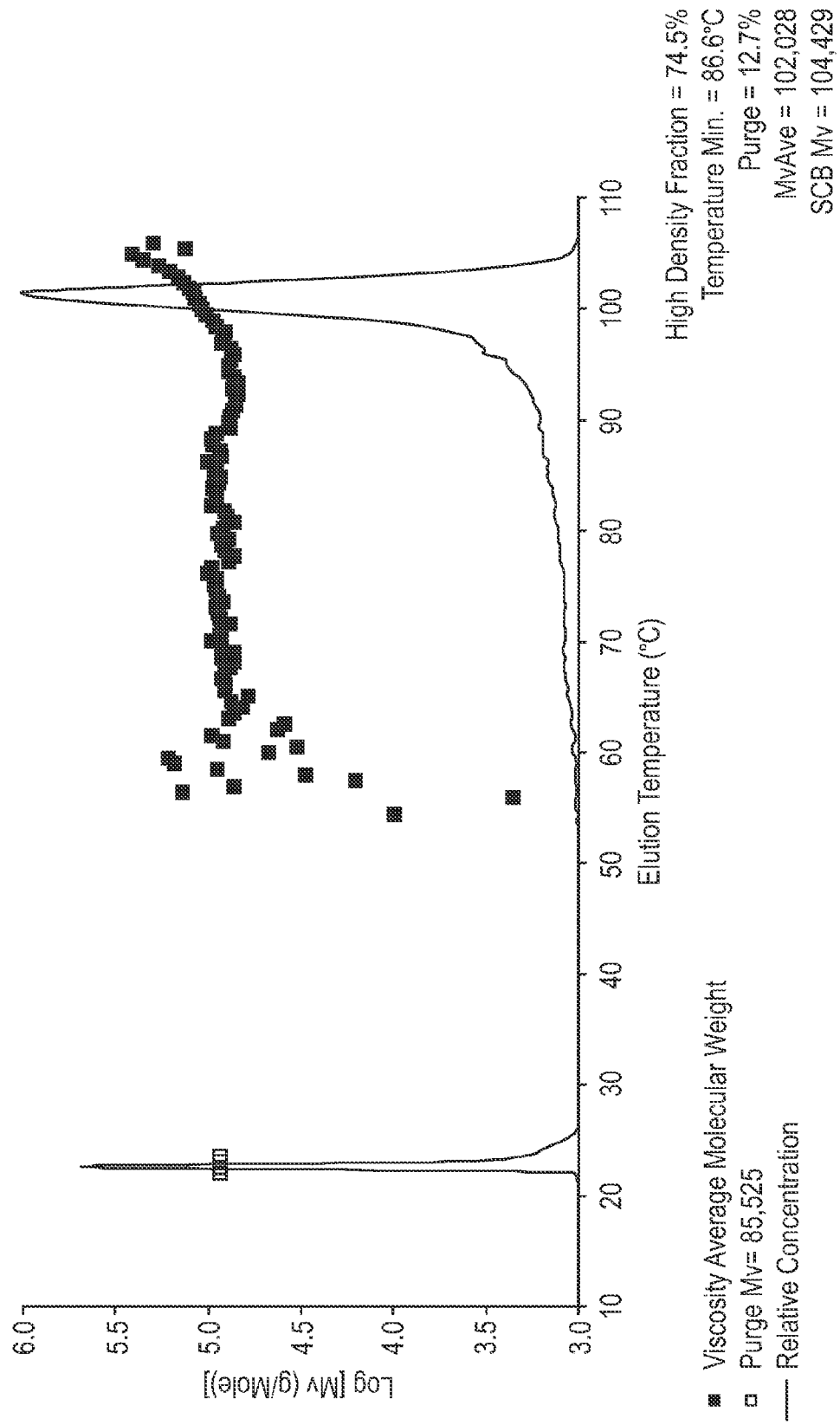
Figure 25:
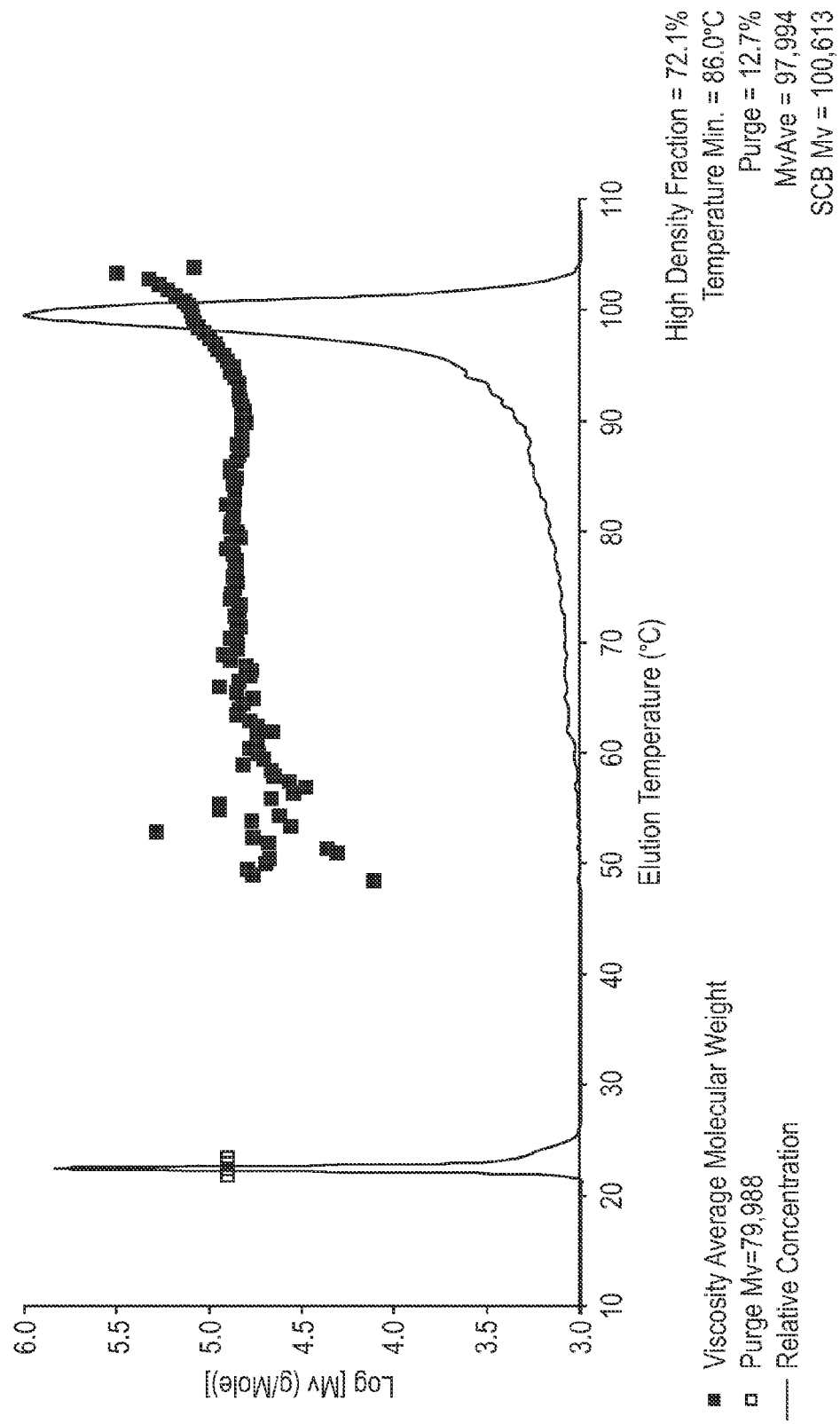
Figure 26:
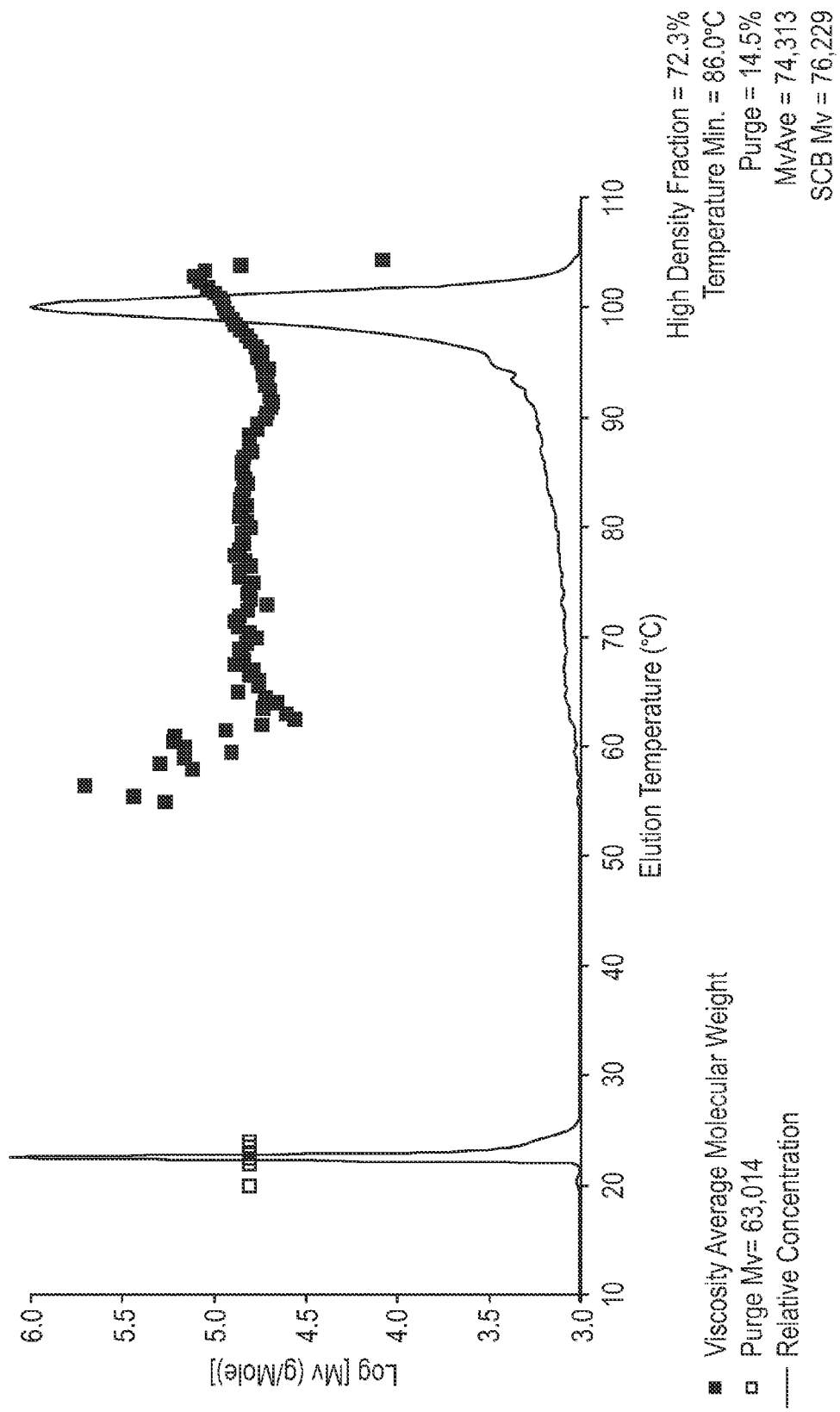
Figure 27:
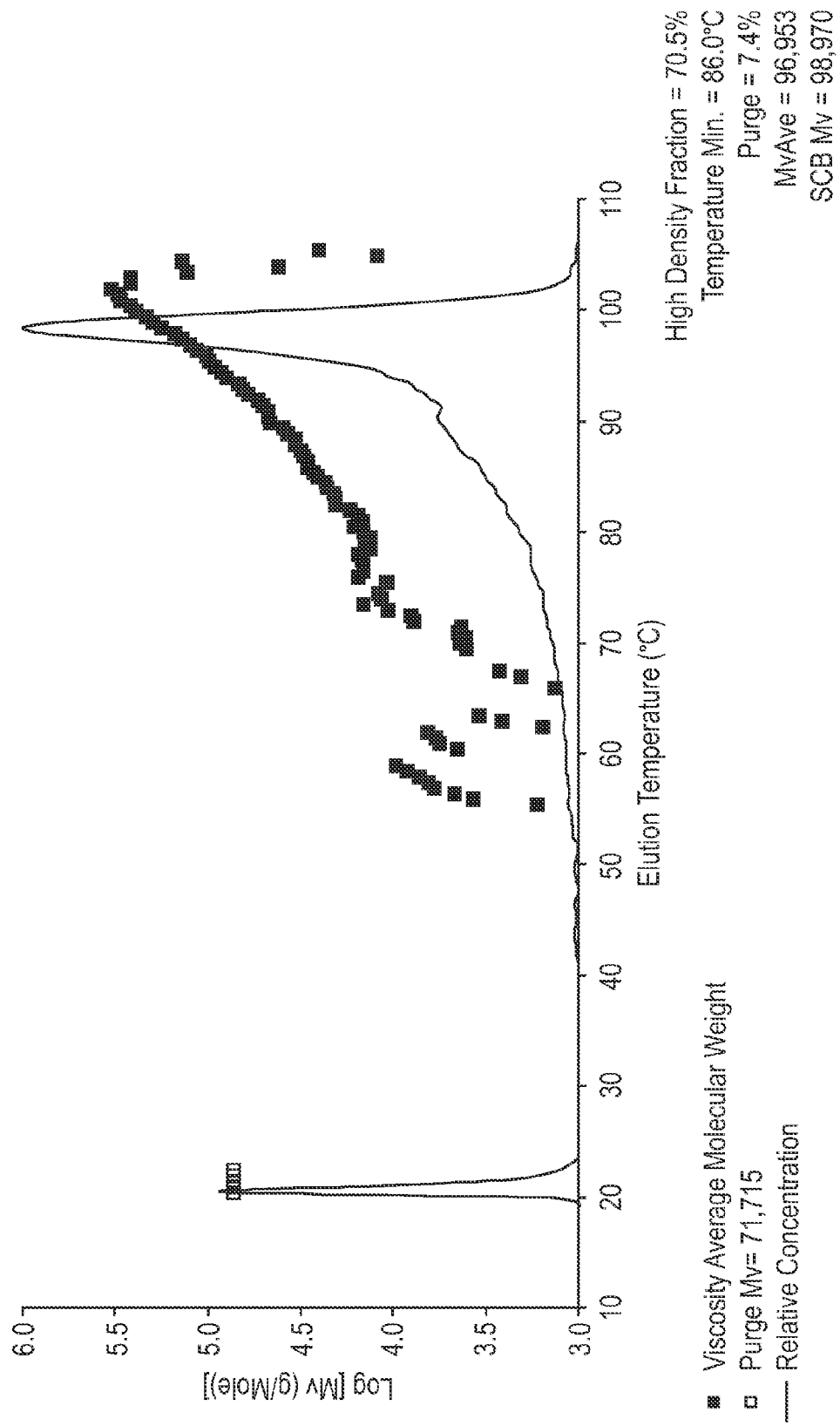
Figure 28:
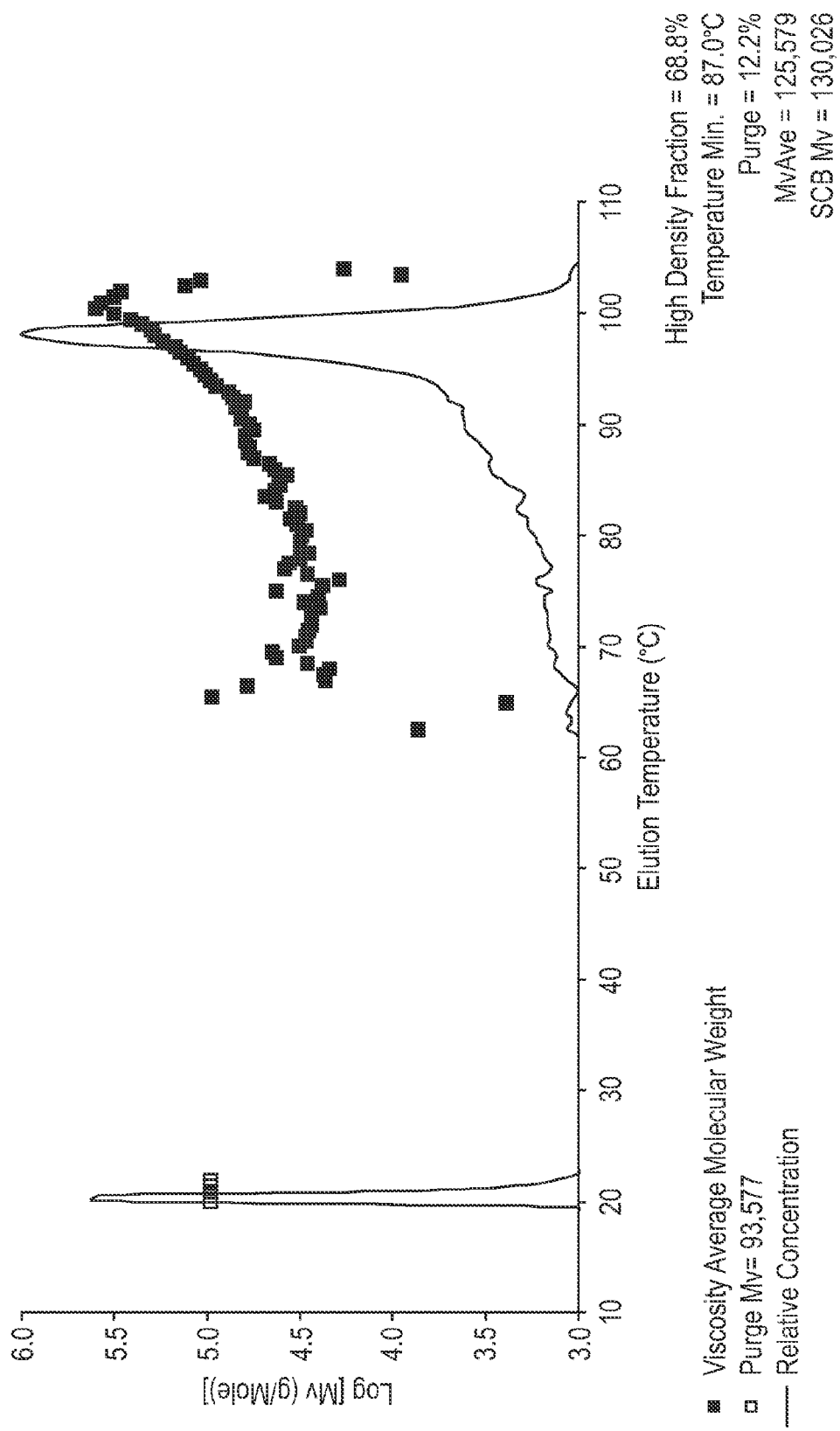

The invention provides for a film comprising at least one component formed from a composition comprising a blend of ethylene-based interpolymers, in which the comonomer and molecular weight distribution are adjusted to provide a final blend, which shows a single peak in an ATREF profile eluting above 30° C., and which has a coefficient of viscosity average molecular weight (CMv) less than −0.0032 in the log(calculated Mv) versus elution temperature, said CMv calculated in the range of elution temperatures from 70° C. to 90° C. Here Mv is the viscosity average molecular weight.

The inventive compositions have several potential uses, including, but not limited to, films and sheets, as discussed above, and drip tape for agricultural use, and geomembranes. In addition, the inventive compositions can be azide modified to form articles of manufacture, such as geomembranes, with better sag and SCG resistance, over conventional Cr based resins.

As discussed above, the invention provides a film comprising at least one component formed from a composition, comprising a blend, wherein said blend comprises a high molecular weight ethylene-based interpolymer and a low molecular weight ethylene-based interpolymer, and wherein the high molecular weight ethylene-based interpolymer is a linear interpolymer, and preferably, a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and wherein the low molecular weight ethylene-based interpolymer is a linear interpolymer, and preferably a heterogeneously branched linear or a homogeneously branched linear ethylene-based interpolymer, and has a density from 0.940 g/cc to 0.955 g/cc, and a melt index (I2) from 6 g/10 min to 50 g/10 min; and wherein the blend has a single peak in an ATREF profile eluting above 30° C., and has a coefficient of viscosity average molecular weight (CMv) less than −0.0032 in the log (calculated Mv) versus elution temperature, said CMv calculated in the range of elution temperatures from 70° C. to 90° C., and wherein Mv is the viscosity average molecular weight. In a further embodiment, the blend is an in-situ blend.

In one embodiment, the high molecular weight ethylene-based interpolymer is present in an amount from 45 to 55 weight percent, based on the sum weight (calculated split %) of the high molecular weight ethylene-based interpolymer and the low molecular weight ethylene-based interpolymer.

In another embodiment, the high molecular weight ethylene-based interpolymer is a heterogeneously branched linear ethylene-based interpolymer.

In another embodiment, the low molecular weight ethylene-based interpolymer is a heterogeneously branched linear ethylene-based interpolymer.

In another embodiment, the high molecular weight ethylene-based interpolymer is a heterogeneously branched linear ethylene-based interpolymer, and the low molecular weight ethylene-based interpolymer is a heterogeneously branched linear ethylene-based interpolymer.

In another embodiment, the high molecular weight ethylene-based interpolymer has a density from 0.9229 g/cc to 0.9271 g/cc.

In another embodiment, the CMv is less than −0.0036. In another embodiment, the CMv is less than −0.0040. In another embodiment, the CMv is less than −0.0090.

In another embodiment, the composition has a density from 0.930 g/cc to 0.945 g/cc. In another embodiment, the composition has a density less than 0.945 g/cc. In another embodiment, the composition has a density less than, or equal to, 0.942 g/cc.

In another embodiment, the low molecular weight ethylene-based interpolymer has a melt index (I2) from 10 g/10 min to 40 g/10 min. In another embodiment, the low molecular weight ethylene-based interpolymer has a melt index (I2) from 15 g/10 min to 35 g/10 min.

In another embodiment, the composition has a melt index, I2, from 0.15 to 0.8 g/10 min, and a density greater than 0.9375 g/cc. In another embodiment, the composition has a melt index, I2, from 0.4 to 0.8 g/10 min.

In another embodiment, the low molecular weight ethylene-based interpolymer has a density less than 0.955 g/cc. In another embodiment, the low molecular weight ethylene-based interpolymer has a density less than 0.954 g/cc. In another embodiment, the low molecular weight ethylene-based interpolymer has a density less than 0.953 g/cc. In another embodiment, the low molecular weight ethylene-based interpolymer has a density less than 0.950 g/cc. In certain embodiments, the density of the low molecular weight component may be up to 0.957 g/cc.

In another embodiment, the composition has a melt index, I2, from 0.05 g/10 min to 0.5 g/10 min. In yet another embodiment, the composition has an I21/I2 ratio from 30 to 80. In a further embodiment, the composition has an I21/I2 ratio from 40 to 75 or from 45 to 75.

In another embodiment, the blend has less than 0.5 vinyls/1000 carbon, preferably less than 0.4 vinyls/1000 carbon, and more preferably less than 0.3 vinyls/1000 carbon.

In another embodiment, the high molecular weight ethylene-based interpolymer has a g' value of one or greater.

In yet another embodiment, the high molecular weight ethylene-based interpolymer is an ethylene/α-olefin interpolymer. In a further embodiment, the α-olefin is selected from the group consisting of C3 to C10 α-olefins. In yet a further embodiment, the α-olefin is preferably propylene, 1-butene, 1-pentene, 1-hexene, 1-heptene, 1-octene, 1-nonene and 1-decene, and more preferably propylene, 1-butene, 1-hexene and 1-octene, and even more preferably 1-hexene.

In another embodiment, the low molecular weight ethylene-based interpolymer is an ethylene/α-olefin interpolymer. In a further embodiment, the α-olefin is selected from the group consisting of C3 to C10 α-olefins. In yet a further embodiment, the α-olefin is selected from the group consisting propylene, 1-butene, 1-pentene, 1-hexene, 1-heptene, 1-octene, 1-nonene and 1-decene, and more preferably propylene, 1-butene, 1-hexene and 1-octene, and even more preferably 1-hexene.

In another embodiment, the composition further comprising one or more additives. In a further embodiment, the one or more additives are selected from the group consisting of hindered amines, hindered phenols, metal deactivators, UV absorbers, phosphites, acid neutralizers, processing aids, and combinations thereof. In another embodiment, the one or more additives are selected from the group consisting of Cyasorb 3529, Irganox 1010, Irganox 1076, Irganox 1330, Irganox MD1024, Irgafos 168, calcium stearate, Dynamar FX 5911, and combinations thereof. In another embodiment, the one or more additives are selected from the group consisting of Cyasorb 3529, Irganox 1010, Irganox 1076, Irganox 1330, Irganox MD1024, Doverphos 9228, calcium stearate, Dynamar FX 5911, and combination thereof. In another embodiment, the one or more additives are selected from the group consisting of UV N30, Irganox 1330, Doverphos 9228, Irganox MD1024, HO3, calcium stearate, Dynamar FX 5911, and combinations thereof.

An inventive film may be formed from a composition that comprises a combination of two or more embodiments as described herein.

In another embodiment, the film is a multi-layered film. In another embodiment, the film is a single layered film. In yet another embodiment, the film has a thickness from 2 mils to 50 mils, preferably from 3 mils to 30 mils, and more preferably from 4 mils to 20 mils. In another embodiment, the film has a thickness from 1 mil to 100 mils.

In another embodiment, an inventive film is formed using a blown film process. In another embodiment, an inventive film is formed using a cast film process.

The invention also provides a sheet comprising at least one component formed from an inventive film as described herein. In a further embodiment, the sheet has a thickness from 2 mils to 200 mils, preferably from 10 mils to 150 mils, and more preferably from 20 mils to 100 mils. In another embodiment, the sheet has a thickness from 2 mils to 500 mils.

In another embodiment, the sheet is formed using a blown film process. In another embodiment, the sheet is formed using a cast film process.

In another embodiment, the film has an Elmendorf Tear Strength, in the machine direction (MD), greater than, or equal to, 100 g/mil, preferably greater than, or equal to, 120 g/mil, and more preferably greater than, or equal to 140 g/mil.

In another embodiment, the film has an Elmendorf Tear Strength, in the traverse direction (TD), greater than, or equal to, 220 g/mil, preferably greater than, or equal to, 240 g/mil, and more preferably greater than, or equal to 260 g/mil.

In another embodiment, the film has a Normalized Dart Impact (B scale) greater than, or equal to, 60 grams, preferably greater than, or equal to, 80 grams, and more preferably greater than, or equal to 100 grams.

An inventive film may comprise a combination of two or more embodiments as described herein.

The invention also provides an article comprising at least one component formed from an inventive film. In one embodiment, the article is a shipping sack. In another embodiment, the article is a geomembrane. In another embodiment, the article is a drip tape (for example an agricultural tape).

An inventive article may comprise a combination of two or more embodiments as described herein.

Polymer Composition

As discussed above, the inventive compositions comprise a blend containing a high molecular weight ethylene-based interpolymer and a low molecular weight polyethylene-based interpolymer. Additional features of these components are described below.

The High Molecular Weight (HMW) Component

The high molecular weight ethylene-based interpolymer has a density greater than, or equal to, 0.922 g/cc, preferably greater than, or equal to, 0.9225 g/cc, and more preferably greater than, or equal to, 0.923 g/cc. In another embodiment, the high molecular weight ethylene-based interpolymer has a density less than, or equal to, 0.929 g/cc, preferably less than, or equal to, 0.928 g/cc, and more preferably less than, or equal to 0.927 g/cc. In another embodiment, the density of the high molecular weight ethylene-based interpolymer is in the range from 0.922 to 0.928 g/cc, and preferably in the range from 0.9229 to 0.9271 g/cc.

The high molecular weight ethylene-based interpolymer has a high load melt index, I21, (190° C., 21.6 kg weight, ASTM 1238-03) greater than, or equal to, 0.20, preferably greater than, or equal to, 0.25, and more preferably greater than, or equal to, 0.30 (units of grams per 10 minutes). In another embodiment, the high molecular weight ethylene-based interpolymer has a high load melt index, I21 less than, or equal to, 1.0, preferably less than, or equal to, 0.9, and more preferably less than, or equal to, 0.8. In yet another embodiment, the I21 ranges from 0.20 to 1.0 grams per 10 minutes, and preferably from 0.25 to about 1.0 grams per 10 minutes.

In another embodiment, the high molecular weight ethylene-based interpolymer is an ethylene/α-olefin interpolymer. In a preferred embodiment, the α-olefin is a C3-C20 α-olefin, a C4-C20 α-olefin, and more preferably a C4-C12 α-olefin, and even more preferably a C4-C8 α-olefin, and most preferably C6-C8 α-olefin.

The term "interpolymer," as used herein, refers to a polymer having polymerized therein at least two monomers. It includes, for example, copolymers, terpolymers and tetrapolymers. As discussed above, it particularly includes a polymer prepared by polymerizing ethylene with at least one comonomer, typically an alpha olefin (α-olefin) of 3 to 20 carbon atoms (C3-C20), or 4 to 20 carbon atoms (C4-C20), or 4 to 12 carbon atoms (C4-C12) or 4 to 8 carbon atoms (C4-C8), or 6 to 8 carbon atoms (C6-C8). The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3C10 α-olefin, and more desirably a C3C8 α-olefin, and most desirably C6-C8 α-olefin.

Interpolymers include ethylene/butene (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferably EH and EO copolymers.

In a preferred embodiment, the high molecular weight ethylene-based interpolymer is an ethylene/1-hexene interpolymer. In a further embodiment, the ethylene/1-hexene copolymer has a hexene/ethylene (C6/C2) ratio from 0.03:1 to 0.105:1. In yet a further embodiment, the ethylene/1-hexene copolymer has a hydrogen/ethylene (H2/C2) ratio from 0.01 to 0.09. In another embodiment, the high molecular weight ethylene-based interpolymer has a g' of 1 signifying a linear polymer.

The high molecular weight component may comprise a combination of two or more embodiments as described herein.

The Low Molecular Weight (LMW) Component

The low molecular weight ethylene-based interpolymer has a density greater than, or equal to, 0.940 g/cc, preferably greater than, or equal to, 0.942 g/cc, and more preferably greater than, or equal to, 0.945 g/cc. In another embodiment, the low molecular weight ethylene-based interpolymer has a density less than, or equal to, 0.957 g/cc, preferably less than, or equal to, 0.955 g/cc. In another embodiment, the low molecular weight ethylene-based interpolymer has a density less than, or equal to, 0.953 g/cc. In another embodiment, the density ranges from 0.940 to 0.955 g/cc, and preferably from 0.946 to 0.955 g/cc.

The low molecular weight ethylene-based interpolymer has a melt index, I2, (190° C., 2.16 kg weight, ASTM 1238-03) greater than, or equal to, 6, preferably greater than, or equal to, 7, and more preferably greater than, or equal to, 8 (units of grams per 10 minutes). In another embodiment, the low molecular weight ethylene-based interpolymer has a melt index, I2, less than, or equal to, 50, preferably less than, or equal to, 47, and more preferably less than, or equal to, 45. In another embodiment, the melt index range from 6 to 50 grams per 10 minutes, preferably in the range from 8 to 47 grams per 10 minutes, more preferably in the range from 10 to 45 grams per 10 minutes, and even more preferably from 15 to 25 grams per 10 minutes.

In another embodiment, the low molecular weight ethylene-based interpolymer is an ethylene/α-olefin interpolymer. In another embodiment, the α-olefin is a C3-C20 α-olefin, a preferably a C4-C20 α-olefin, and more preferably a C4-C12 α-olefin, and even more preferably a C4-C8 α-olefin and most preferably C6-C8 α-olefin. The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C8 α-olefin, and more desirably a C4-C8 α-olefin and most desirably a C6-C8 α-olefin.

Interpolymers include ethylene/butene-1 (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferred copolymers are EH and EO.

In a preferred embodiment, the low molecular weight component is an ethylene/1-hexene copolymer. In a further embodiment, the ethylene/1-hexene copolymer has a hexene/ethylene (C6/C2) ratio from 0.01 to 0.065. In yet a further embodiment, the ethylene/1-hexene copolymer has a hydrogen/ethylene (H2/C2) ratio from 0.1 to 1.0. The LMW component is a linear polymer.

The low molecular weight component may comprise a combination of two or more embodiments as described herein.

In a preferred embodiment, the LMW component is determined by operating at a known set of reactor conditions to produce the desired component melt index and density. These conditions are determined by producing that product alone to determine the appropriate reactor temperature, H2/C2 and C6/C2 ratios, which are then used when operating the LMW component, as the second reactor, in series, to produced the desired Melt Index and Density.

One preferred process for producing the LMW component alone is as follows. Ethylene is copolymerized with 1-hexene in a fluidized bed reactor. The polymerization is continuously conducted after equilibrium is reached, under the respective conditions, as set forth in the tables (see Tables 1A and 1B) below. Polymerization is initiated by continuously feeding the catalyst and cocatalyst into a fluidized bed of polyethylene granules, together with ethylene, 1-hexene and hydrogen. Inert gases, nitrogen and isopentane, make up the remaining pressure in the reactors. A model of this data could then be developed, and used to control this second reactor component.

TABLE 1A

Reaction Conditions

| | Sample | | | | | | |
|---|---|---|---|---|---|---|---|
| | 1 | 2 | 3 | 4 | 5 | 6 | 7 |
| Temp. °C. | 95.0 | 95.0 | 95.0 | 95.0 | 95.0 | 95.0 | 95.0 |
| Pressure, psig | 399 | 398 | 399 | 399 | 299 | 299 | 299 |
| C2 Part. Pressure, psi | 90.0 | 90.0 | 89.9 | 90.0 | 73.3 | 73.5 | 52.3 |
| H2/C2 Molar Ratio | 0.60 | 0.40 | 0.90 | 0.83 | 0.600 | 0.614 | 0.584 |
| C4/C2 Molar Ratio | 0.000 | 0.000 | 0.000 | 0.000 | 0.000 | 0.000 | 0.000 |
| C6/C2 Molar Ratio | 0.033 | 0.034 | 0.031 | 0.032 | 0.033 | 0.020 | 0.060 |
| IC5% | 0.867 | 0.820 | 0.860 | 0.842 | 0.283 | 0.329 | 0.383 |
| Cat Feed Rate ul/hr | 4.8 | 3.5 | 5.4 | 5.4 | 3 | 3 | 3 |
| Cocatalyst | 2.5% TEAL | 2.5% TEAL | 2.5% TEAL | 2.5% TEAL | 2.5% TEAL | 2.5% TEAL | 2.5% TEAL |
| Cocat. Feed Rate, cc/hr | 210 | 183 | 231 | 210 | 128 | 130 | 134 |
| Production Rate, lb/hr | 28.3 | 28.3 | 24.6 | 26.5 | 25.0 | 24.9 | 24.9 |
| Bed Weight, lbs | 83.7 | 83.7 | 83.3 | 83.1 | 66.4 | 66.8 | 66.6 |
| FBD (lb/ft^3) | 13.2 | 12.2 | 14.5 | 14.2 | 11.9 | 11.8 | 11.7 |
| Bed Volume, ft^3 | 6.3 | 6.9 | 5.7 | 5.9 | 5.6 | 5.7 | 5.7 |
| Residence Time, hr | 3.0 | 3.0 | 3.4 | 3.1 | 2.7 | 2.7 | 2.7 |
| STY, lb/hr/ft^3 | 4.5 | 4.1 | 4.3 | 4.5 | 4.5 | 4.4 | 4.4 |

TABLE 1B

Resin Properties

| | Sample | | | | | | |
|---|---|---|---|---|---|---|---|
| | 1 | 2 | 3 | 4 | 5 | 6 | 7 |
| Melt Index, dg/min I2 | 21.3 | 7.4 | 65.6 | 48.5 | 19.73 | 17.80 | 22.93 |
| Melt Index, dg/min I5 | 61.0 | 21.1 | 187.1 | 137.9 | 56.6 | 51.2 | 66.0 |
| Flow Index, dg/min I21 | 548 | 182 | 1688 | 1238 | 517 | 461 | 604 |
| Density, g/cc | 0.9508 | 0.9474 | 0.9535 | 0.9525 | 0.9497 | 0.9537 | 0.9418 |
| MFR (I21/I2) | 25.7 | 24.6 | 25.7 | 25.5 | 26.2 | 25.9 | 26.3 |
| MFR (I21/I5) | 9.0 | 8.6 | 9.0 | 9.0 | 9.1 | 9.0 | 9.2 |
| Residual Ti., ppm | 1.74 | 1.42 | 2.14 | 2.18 | 2.36 | 2.34 | 3.28 |
| Residual Al, ppm | 57.0 | 48.5 | 59.1 | 62.0 | 74.0 | 110.0 | 71.0 |
| Al/Ti molar | 58.6 | 61.0 | 49.6 | 50.1 | 56.0 | 83.0 | 38.8 |
| Bulk Density, lb/ft^3 | 22.2 | 19.1 | 24.2 | 23.6 | 22.2 | 22.5 | 21.7 |
| APS, inches | 0.023 | 0.028 | 0.021 | 0.021 | 0.023 | 0.026 | 0.019 |
| Fines, Wt % LT 120 Mesh | 2.40 | 1.06 | 2.20 | 2.93 | 2.04 | 1.80 | 4.52 |

Linear Ethylene-Based Interpolymers

As discussed above the high molecular weight ethylene-based interpolymer and the low molecular weight ethylene-based interpolymer are each a linear ethylene-based interpolymer, and preferably a heterogeneously branched linear or a homogeneously branched linear ethylene-based interpolymer. The term "linear ethylene-based interpolymer," as used herein, refers to an interpolymer that lacks long-chain branching, or lacks measurable amounts of long chain branching, as determined by techniques known in the art, such as NMR spectroscopy (for example 1C NMR as described by Randall, Rev. Macromal. Chem. Phys., C29 (2&3), pp. 285-293, incorporated herein by reference). Long-chain branched interpolymers are described in U.S. Pat. Nos. 5,272,236 and 5,278,272. As known in the art, the heterogeneously branched linear and homogeneously branched linear interpolymers have short chain branching due to the incorporation of comonomer into the growing polymer chain.

The terms "homogeneous" and "homogeneously-branched" are used in reference to an ethylene/α-olefin polymer (or interpolymer), in which the α-olefin comonomer is randomly distributed within a given polymer molecule, and substantially all of the polymer molecules have the same ethylene-to-comonomer ratio. These interpolymers are typically prepared using a metallocene catalyst system.

The homogeneously branched linear ethylene interpolymers are ethylene interpolymers, which lack long chain branching (or measurable amounts of long chain branching), but do have short chain branches, derived from the comonomer polymerized into the interpolymer, and in which the comonomer is homogeneously distributed, both within the same polymer chain, and between different polymer chains. Homogeneously branched linear ethylene interpolymers lack long chain branching, just as is the case for the linear low density polyethylene polymers or linear high density polyethylene polymers, made using uniform branching distribution polymerization processes as described, for example, by Elston in U.S. Pat. No. 3,645,992.

Commercial examples of homogeneously branched linear ethylene/α-olefin interpolymers include TAFMER™ polymers supplied by the Mitsui Chemical Company and EXACT™ and EXCEED™ polymers supplied by ExxonMobil Chemical Company.

In a preferred embodiment, the ethylene-based interpolymer is a heterogeneously branched linear ethylene interpolymer. Heterogeneously branched linear ethylene interpolymers include, but are not limited to, interpolymers of ethylene and one or more $C_3$ to $C_8$ α-olefins. Heterogeneously branched ethylene interpolymers can be prepared using Ziegler-Natta catalyst systems. Both the molecular weight distribution, and the short chain branching distribution, each arising from α-olefin (or comonomer) copolymerization, are relatively broad compared to homogeneously branched linear and homogeneously branched linear substantially linear ethylene interpolymers. Heterogeneously branched linear ethylene interpolymers can be made in a solution, slurry, or gas phase process using a Ziegler-Natta catalyst. For example, see U.S. Pat. No. 4,339,507, which is fully incorporated herein by reference.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene).

As discussed above, heterogeneously branched ethylene-based interpolymers are typically prepared with a Ziegler/Natta catalyst system. These linear interpolymers lack long chain branching, or measurable amounts of long chain branching, as discussed above.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE). Commercial polymers include DOWLEX™ polymers, ATTANE™ polymer, TUFLIN™ polymers, and FLEXOMER™ polymers (all from The DOW Chemical Company), and ESCORENE™ LLDPE polymers (from Exxon Mobil).

In preferred embodiment, the high molecular weight ethylene-based interpolymer is prepared using a Ziegler/Natta catalyst system, and the low molecular weight ethylene-based interpolymer is prepared using a Ziegler/Natta catalyst system.

In another embodiment, the high molecular weight ethylene-based interpolymer is a heterogeneously branched linear ethylene-based interpolymer, and the low molecular weight ethylene-based interpolymer is a heterogeneously branched linear ethylene-based interpolymer.

Polyethylene Blend

As discussed above, the blend of the invention comprises a high molecular weight ethylene-based interpolymer and a low molecular weight ethylene-based interpolymer. In a preferred embodiment, the blend is an in-situ blend. An in-situ blend is formed in a polymerization reactor (or reactor blend), as opposed to a post-reactor blend formed by mixing polymer components after the separate polymerization of each component.

The inventive blend has a single peak in an ATREF profile eluting above 30° C., and has a coefficient of viscosity average molecular weight (CMv) less than −0.0032, and preferably less than −0.0036, and more preferably less than −0.0040, in the log(calculated Mv) versus elution temperature, said CMv calculated in the range of elution temperatures from 70° C. to 90° C. Here Mv is the viscosity average molecular weight.

ATREF

General Overview

The inventive blend is characterized by ATREF (Analytical Temperature Rising Elution Fractionation), as described, for example, in Wild et al., *Journal of Polymer Science*, Poly. Phys. Ed., Vol. 20, p. 441 (1982); in U.S. Pat. No. 4,798,081 (Hazlitt et al.); or in U.S. Pat. No. 5,089,321 (Chum et al.), the disclosures of all of which are fully incorporated herein by reference. See also L. G. Hazlitt, J. Appl. Polym. Sci.: Appl. Poly. Symp., 45, 25-37 (1990), which is fully incorporated herein by reference.

In the technique of Analytical Temperature Rising Elution Fractionation (as described in U.S. Pat. No. 4,798,081), the polymer composition to be analyzed is dissolved in a suitable hot solvent (for example, 1,2,4-trichlorobenzene), and allowed to crystallized in a column containing an inert support (for example, stainless steel shot), by slowly reducing the temperature of the column. The column is equipped with both an (1) infra-red detector (for example, an IR-4 from Polymer ChAR, Valencia, Spain), or a refractive index, and (2) a differential viscometer (DV) detector. An ATREF-DV chromatogram curve is then generated by eluting the crystallized polymer sample from the column by slowly increasing the temperature of the column.

The ATREF curve is also frequently called the short chain branching distribution (SCBD), since it indicates how the comonomer (for example, hexene) is distributed throughout the sample, in that as elution temperature decreases, comonomer content increases. The IR detector provides concentration of polymer as a function of temperature, which can be used to generate the short chain branching distribution. The differential viscometer detector provides an estimate of the viscosity average molecular weight at each elution temperature (see U.S. Pat. No. 4,798,081). The generated curves that show data obtained from both the IR detector and the differential viscometer detector are known as, collectively, an ATREF-DV overlay profile.

The inventive blends show a characteristic decrease in the measured viscosity average molecular weight (Mv) as the column temperature increases. This decrease in the Mv is observed especially in the region from 70° C. to 90° C. In this region (70° C.-90° C.), a regression slope can be calculated from the log(Mv) versus elution temperature, using a linear regression technique, such as available in the EXCEL program LINEST (MicroSoft Corp., Redmond, Wash.). The regression slope is also denoted as the coefficient of the viscosity average molecular weight (CMv).

A more detailed description of the Analytical Temperature Rising Elution Fractionation-Differential Viscometry (ATREF-DV) analysis is described below.

Determination of the Coefficient of Viscosity Average Molecular Weight (CMv) Using ATREF-DV Fractionation by Analytical Temperature Rising Elution Fractionation-Differential Viscometry, ATREF-DV, was performed on the polymer samples, using the methods and apparatus described by Wild[1] and Hazlitt[2,3]. The column was constructed from 1/8"×18" thin-wall stainless-steel tubing, and packed with 0.023"×0.023" stainless-steel shot from Pellets Inc. (Tonawanda, New York). The column had a 1.5 ml interstitial volume.

[1] L. Wild, T. R. Ryle, D. C. Knobeloch, and I. R. Peat, *Journal of Polymer Science: Polymer Physics Edition*, Vol. 20, 441-455 (1982).
[2] L. Hazlitt and D. Moldovan, U.S. Pat. No. 4,798,081, 1989.
[3] L. Hazlitt, *Journal of Applied Polymer Science: Applied Polymer Symposia*, 45, 25-37 (1990).

A controlled GC (Gas Chromatography) oven was used to affect the temperature profiles. Two additional ovens provided high temperature thermal control, respectively, for the sample loading chamber, and a value section, which contained various valves for directing solvent flow. These later two ovens were maintained at 130° C.

As discussed above, the polymer sample was dissolved in a suitable solvent, such as 1,2,4-trichlorobenzene (containing 180 ppm BHT as an antioxidant) to form a polymer solution. The initial polymer concentration was between 50 mg and 200 mg in 50 ml (at room temperature) of the 1,2,4-trichlorobenzene (TCB), and this concentration was adjusted to accommodate the sharpness of the eluting peaks, so that it would not exceed the maximum response for the concentration and viscosity detection in the data collection hardware. Such adjustments can be made by one skilled in the art.

The polymer solution was deposited on the stainless steal column, at a column temperature of 130° C. Once deposited on the column, the temperature of the column was decreased at a maintained rate of −0.1° C./min, to a final column temperature of about 20° C. Next, the elution temperature was increased at a rate of 1.0° C./min, from 20° C. to 122° C. The solvent elution also began at this time, and the solvent (1,2,4-trichlorobenzene containing 180 ppm BHT as an antioxidant) flow rate was 1.0 ml/min. The elution was directed, via heated transfer lines, to, first, an IR-4[4] infrared detector, second, PD2040 low angle laser light scattering (LALLS) detector[5], and finally a Model H502C differential viscometer[6]. Each detector was maintained at a temperature of 140° C. A reservoir for solvent waste was provided after the sequence of detectors. Temperature control, valve sequencing and data collection were achieved using LabView[7] software[8] on a personal computer.

[4] Sold by PolymerChar of Valencia, Spain.
[5] Sold by Precision Detectors of Bellingham Mass.
[6] Sold by Viscotek of Houston, Tex.
[7] Trademark of National Instruments of Austin, Tex.
[8] Written under contract with Quantum Automation of Houston, Tex.

The data collected for each copolymer, during each elution of the ATREF-DV apparatus, consisted of the column elution temperature [RTD, $T_i$(° C.)], the mass or concentration response [infrared detector, $IR_i$(mv)], the differential viscosity response [differential viscometer, $DP_i$(mv)], the Inlet Pressure [differential viscometer, $IP_i$(mv)], and the light scattering response [LALLS detector, $LS_i$(mv)]. These are collected at five second intervals. The detector offsets or lag times are corrected in the data processing step. The various detectors are calibrated by using polymers of known weight average molecular weight and intrinsic viscosity[9]. The baseline subtracted data is used in the following equations, where the subscripted i represents an arbitrary data point.

[9] A. Degroot et al, *Waters International GPC Conference* (1998).

Equation 1 shows the relationship between the intrinsic viscosity, $[\eta]_0$, and the viscosity average molecular weight, $M_v$, for the whole polymer. The values of K and a are $6.3*10^{-4}$ and 0.7, respectively.

$$M_v = \left\{\frac{1}{K} \cdot [\eta]_0\right\}^{1/a} \quad \text{(Equation 1)}$$

Equation 2 describes how the differential viscosity, $\eta_i$, and the inlet pressure, Inlet, $P_i$, is used to estimate $[\eta]_{0,i}$ for an arbitrary data point using the concentration, $c_i$.

$$[\eta]_{0,i} = \frac{4 \cdot \eta_i}{\text{Inlet}\_P_i - 2 \cdot \eta_i} \Big/ c_i \quad \text{(Equation 2)}$$

Equation 3 describes how to calculate the viscosity average molecular weight, $M_{v,i}$.

$$M_{v,i} = \left[\frac{1}{K} \cdot \frac{4 \cdot \eta_i}{IP_i - 2 \cdot \eta_i}\right]^{1/a} \quad \text{(Equation 3)}$$

Equations 4 and 5 describe how to use the signals from the viscometer, $DP_i$ and $IP_i$ to estimate the differential viscosity, $\eta_i$, and the inlet pressure, Inlet_$P_i$.

$$\eta_i = k_{DP} \cdot DP_i \quad \text{(Equation 4)}$$

$$\text{Inlet}\_P_i = k_{IP} \cdot IP \quad \text{(Equation 5)}$$

Equation 6 describes how to calculate the concentration, $c_i$, for an arbitrary point from the IR response, $IR_i$.

$$c_i = k_{IR} \cdot IR_i \quad \text{(Equation 6)}$$

Equation 7 shows the normalization step needed to calculate the overall moments, $M_v$ and $M_w$.

$$C_{total} = \sum_i c_i \cdot w_i \quad \text{(Equation 7)}$$

Equation 8 shows how to calculate the weight average molecular weight for an arbitrary point.

$$M_{w,i} = \frac{k_{LS} \cdot LS_i}{c_i} \quad \text{(Equation 8)}$$

Equations 9 and 10 are used to estimate the values of the various detector constants, $k_{DP}$, $k_{IP}$, $k_{IR}$ and $k_{LS}$, using at least two different polymers, for which the intrinsic viscosity and the weight average molecular weight are known, and adjusting the detector constants, until the proper moments are obtained.

$$M_v = \left[\frac{\sum_i c_i \cdot M_{v,i}^a}{C_{total}}\right]^{1/a} \quad \text{(Equation 9)}$$

$$M_w = \frac{\sum_i c_i \cdot M_{w,i}}{C_{total}} \quad \text{(Equation 10)}$$

Alternatively, the viscometer can be calibrated using methods described by the manufacturer, and the remaining coefficients, $k_{IR}$, and $k_{LS}$, can be obtained as described above. For the purposes of the current invention, only the viscosity average molecular weight, $M_{v,i}$, is required.

As discussed above, the viscosity average molecular weights, $M_{v,i}$, and the elution temperatures, $T_i$, are used to calculate the coefficient of viscosity average molecular weight, CMv, using simple linear regression. This coefficient is the slope for the regression line (log(Mv) vs. elution temperature) using the points between 70° C. and 90° C. in the ATREF-DV data. The values of the logarithm of the viscosity average molecular weights, Log $M_{v,i}$, are treated as the y values, and the elution temperatures, $T_i$, are treated as the x values. As discussed above, the regression slope can be obtained using commercially available routines, such as the function LINEST in EXCEL[10].

[10] Sold by Microsoft Corp.

Polyethylene Composition

In one embodiment, the composition has a density greater than, or equal to, 0.930 g/cc, preferably greater than, or equal to, 0.932 g/cc, and more preferably greater than, or equal to, 0.935 g/cc and most preferably greater than or equal to 0.9375 g/cc. In another embodiment, composition has a density less than, or equal to, 0.945 g/cc, preferably less than, or equal to, 0.942 g/cc. In another embodiment, the composition has a density from 0.930 to 0.945 g/cc, and preferably from 0.932 to 0.943 g/cc, and more preferably from 0.935 to 0.942 g/cc, and most preferably from 0.9375-0.942 g/cc.

In a preferred embodiment, composition has a high load melt index, I21, (190° C., 21.6 kg weight, ASTM 1238-03) greater than, or equal to, 5, preferably greater than, or equal to, 6, and more preferably greater than, or equal to, 7 (units of grams per 10 minutes). In another embodiment, composition has a high load melt index, I21 less than, or equal to, 18, preferably less than, or equal to, 16, and more preferably greater than, or equal to, 14. In yet another embodiment, the I21 ranges from 5 to 18 grams per 10 minutes, and preferably in the range from 7 to 15 grams per 10 minutes, and more preferably in the range from 7.5 to 12 grams per 10 minutes. A composition with a high load melt index less than 5 will be more difficult to extrude.

In another embodiment, the high molecular weight ethylene-based interpolymer is present in an amount less than, or equal to 60 weight percent, preferably less than, or equal to 58 weight percent, and more preferably less than, or equal to 55 weight percent, based on the sum weight of the high molecular weight ethylene-based interpolymer and the low molecular weight ethylene-based interpolymer. In another embodiment, the low molecular weight ethylene-based interpolymer is present in an amount greater than, or equal to 40 weight percent, preferably greater than, or equal to 42 weight percent, and more preferably greater than, or equal to 45 weight percent, based on the sum weight of the high molecular weight ethylene-based interpolymer and the low molecular weight ethylene-based interpolymer. In another embodiment, the weight ratio of the high molecular weight component to the low molecular weight component (HMW/LMW) is from 60/40 to 45/55, and more preferably from 55/45 to 45/55.

The composition may comprise a combination of two or more embodiments as described herein.

Catalysts

Typical transition metal catalyst systems, which can be used to prepare the inventive blend, are Ziegler-Natta catalyst systems, such as magnesium/titanium based catalyst systems, which can be exemplified by the catalyst system described in U.S. Pat. No. 4,302,565, incorporated herein by reference. See also WO 2006/023057, and WO 2005/012371, each incorporated herein by reference.

In some embodiments, preferred catalysts used in the process to make the blends of the present invention are of the magnesium/titanium type. In particular, for gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent, producing a high viscosity mixture, which is then used as catalyst precursor. Exemplary catalyst types are described in U.S. Pat. No. 6,187,866 and U.S. Pat. No. 5,290,745, the entire contents of both are herein incorporated by reference. Precipitated/crystallized catalyst systems, such as those described in U.S. Pat. No. 6,511,935 and U.S. Pat. No. 6,248,831, the entire contents of both are herein incorporated by reference, may also be used.

In one embodiment, the catalyst precursor has the formula $Mg_dTi(OR)_eX_f(ED)_g$, wherein R is an aliphatic or aromatic hydrocarbon radical having 1 to 14 carbon atoms or COR', wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. Such a precursor is prepared from a titanium compound, a magnesium compound, and an electron donor.

The electron donor is an organic Lewis base, liquid at temperatures in the range of about 0° C. to about 200° C., and in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, and each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains about 1 to about 20 moles of electron donor per mole of titanium compound, and preferably about 1 to about 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support, and dried to form a solid catalyst, it is preferred that the solution be converted into a solid catalyst via spray drying. Each of these methods thus forms a "supported catalyst precursor." The spray dried catalyst product is then, preferentially placed into mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump, is typically used in commercial reaction systems, while a dual piston syringe pump is typically used in pilot scale reaction systems, where the catalyst flows are less than, or equal to, 10 cm$^3$/hour (2.78×10-9 m$^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483, incorporated herein by reference, may also be used.

The cocatalysts, which are reducing agents, are typically comprised of aluminum compounds, but compounds of lithium, sodium and potassium, alkaline earth metals, as well as compounds of other earth metals, other than aluminum are possible. The compounds are usually hydrides, organometal or halide compounds. Butyl lithium and dibutyl magnesium are examples of useful compounds.

An activator compound, which is generally used with any of the titanium based catalyst precursors, can have the formula $AlR_aX_bH_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms, and the trialkylaluminums. Examples are diethylaluminum chloride and tri-n-hexylaluminum. About 0.10 moles to about 10 moles, and preferably about 0.15 moles to about 2.5 moles, of activator are used per mole of electron donor. The molar ratio of activator to titanium is in the range of about 1:1 to about 10:1, and is preferably in the range of about 2:1 to about 5:1.

The hydrocarbyl aluminum cocatalyst can be represented by the formula $R_3Al$ or $R_2AlX$, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, tri-isopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used, instead of an activator, the modifiers are usually dissolved in an organic solvent, such as isopentane. Where a support is used, the modifier is typically impregnated into the support, following impregnation of the titanium compound or complex, after which the supported catalyst precursor is dried. Otherwise, the modifier solution is added by itself directly to the reactor. Modifiers are similar in chemical structure and function to the activators, as are cocatalysts. For variations, see for example, U.S. Pat. No. 5,106,926, incorporated herein by reference in its entirety. The cocatalyst is preferably added separately neat, or as a solution in an inert solvent, such as isopentane, to the polymerization reactor at the same time as the flow of ethylene is initiated.

In those embodiments that use a support, the precursor is supported on an inorganic oxide support, such as silica, aluminum phosphate, alumina, silica/alumina mixtures, silica that has been modified with an organoaluminum compound, such as triethyl aluminum, and silica modified with diethyl zinc. In some embodiments silica is a preferred support. A typical support is a solid, particulate, porous material essentially inert to the polymerization. It is used as a dry powder having an average particle size of about 10 µm to about 250µ, and preferably about 30 µm to about 100 µm; a surface area of at least 200 m2/g and preferably at least about 250 m²/g; and a pore size of at least about 100×10-10 m and preferably at least about 200×10-10 m. Generally, the amount of support used, is that which will provide about 0.1 millimole to about 1.0 millimole of titanium per gram of support, and preferably about 0.4 millimole to about 0.9 millimole of titanium per gram of support. Impregnation of the above mentioned catalyst precursor into a silica support can be accomplished by mixing the precursor and silica gel in the electron donor solvent, or other solvent, followed by solvent removal under reduced pressure. When a support is not desired, the catalyst precursor can be used in liquid form.

Polymerization

The novel composition can be made by a variety of methods. For example, it may be made by blending or mixing the high molecular weight interpolymer and the low molecular weight interpolymer, or by melt-blending the individually melted components. Alternatively, it may be made in situ, in one or more polymerization reactors, including, but not limited to, a dual reactor configuration.

In a preferred dual reactor configuration of the process of the present invention, the catalyst precursor and the cocatalyst are introduced in the first reactor, and the polymerizing mixture is transferred to the second reactor for further polymerization. Insofar as the catalyst system is concerned, only cocatalyst, if desired, is added to the second reactor from an outside source. Optionally the catalyst precursor may be partially activated prior to the addition to the reactor (preferably the first reactor), followed by further "in reactor activation" by the cocatalyst.

In the preferred dual reactor configuration, a relatively high molecular weight (low melt flow index) copolymer is prepared in the first reactor. Alternatively, the low molecular weight copolymer can be prepared in the first reactor, and the high molecular weight copolymer can be prepared in the second reactor. For purposes of the present disclosure, the reactor, in which the conditions are conducive to making a high molecular weight polymer, is known as the "high molecular weight reactor". Alternatively, the reactor, in which the conditions are conducive to making a low molecular weight polymer, is known as the "low molecular weight reactor." Irrespective of which component is made first, the mixture of polymer and an active catalyst is preferably transferred from the first reactor to the second reactor, via an interconnecting device, using nitrogen, or second reactor recycle gas, as a transfer medium.

The polymerization in each reactor is preferably conducted in the gas phase using a continuous fluidized bed process. In a typical fluidized bed reactor, the bed is usually made up of the same granular resin that is to be produced in the reactor. Thus, during the course of the polymerization, the bed comprises formed polymer particles, growing polymer particles, catalyst particles fluidized by polymerization, and modifying gaseous components, introduced at a flow rate or velocity sufficient to cause the particles to separate and act as a fluid. The fluidizing gas is made up of the initial feed, make-up feed, and cycle (recycle) gas, that is, comonomers, and, if desired, modifiers and/or an inert carrier gas.

A typical fluid bed system includes a reaction vessel, a bed, a gas distribution plate, inlet and outlet piping, a compressor, cycle gas cooler, and a product discharge system. In the vessel, above the bed, there is a velocity reduction zone, and, in the bed, a reaction zone. Both are above the gas distribution plate. A typical fluidized bed reactor is further described in U.S. Pat. No. 4,482,687, the entire contents of which are herein incorporated by reference.

The gaseous feed streams of ethylene, other gaseous alpha-olefins, and hydrogen, when used, are preferably fed to the reactor recycle line, as well as liquid or gaseous alpha-olefins and the cocatalyst solution. Optionally, the liquid catalyst can be fed directly to the fluidized bed. The partially activated catalyst precursor is preferably injected into the fluidized bed as a mineral oil slurry. Activation is generally completed in the reactors by the cocatalyst. The product composition can be varied by changing the molar ratios of the monomers introduced into the fluidized bed. The product is continuously discharged in granular or particulate form from the reactor, as the bed level builds up with polymerization. The production rate is controlled by adjusting the catalyst feed rate and/or the ethylene partial pressures in both reactors.

A preferred mode is to take batch quantities of product from the first reactor, and transfer these to the second reactor using the differential pressure generated by the recycle gas compression system. A system similar to that described in U.S. Pat. No. 4,621,952, the entire contents of which are herein incorporated by reference, is particularly useful.

The pressure is about the same in both the first and second reactors. Depending on the specific method used to transfer the mixture of polymer and contained catalyst from the first reactor to the second reactor, the second reactor pressure may be either higher than, or somewhat lower than, that of the first. If the second reactor pressure is lower, this pressure differential can be used to facilitate transfer of the polymer catalyst mixture from Reactor 1 to Reactor 2. If the second reactor pressure is higher, the differential pressure across the cycle gas compressor may be used as the motive force to move polymer. The pressure, that is, the total pressure in either reactor, can be in the range of about 200 to about 500 psig (pounds per square inch gauge), and is preferably in the range of about 270 to about 450 psig (1.38, 3.45, 1.86 and 3.10 MPa, respectively). The ethylene partial pressure in the first reactor can be in the range of about 10 to about 150 psig, and is preferably in the range of about 20 to about 80 psig, and more preferably is in the range of about 25 to about 60 psig, (68.9, 1034, 138, 552, 172 and 414 MPa, respectively). The ethylene partial pressure in the second reactor is set according to the amount of copolymer to be produced in this reactor, to achieve the appropriate split. It is noted that increasing the ethylene partial pressure in the first reactor leads to an increase in ethylene partial pressure in the second reactor. The balance of the total pressure is provided by alpha-olefin other than ethylene and an inert gas such as nitrogen. Other inert hydrocarbons, such as an induced condensing agent, for example, isopentane or hexane, also contribute to the overall pressure in the reactor, according to their vapor pressure, under the temperature and pressure experienced in the reactor.

The hydrogen:ethylene mole ratio can be adjusted to control average molecular weights. The alpha-olefins (other than ethylene) can be present in a total amount of up to 15 percent by weight of the copolymer, and, if used, are preferably included in the copolymer in a total amount from about 0.5 to about 10 percent by weight, or more preferably from about 0.8 to about 4 percent by weight, based on the weight of the copolymer.

The residence time of the mixture of reactants including gaseous and liquid reactants, catalyst, and resin, in each fluidized bed can be in the range from about 1 to about 12 hours, and is preferably in the range from about 1.5 to about 5 hours. The reactors can be run in the condensing mode, if desired. The condensing mode is described in U.S. Pat. No. 4,543,399, U.S. Pat. No. 4,588,790 and U.S. Pat. No. 5,352,749, the entire content of each is herein incorporated by reference.

While the polyethylene blends of subject invention are preferably produced in the gas phase by various low pressure processes, the blend can also be produced in the liquid phase in solutions or slurries by conventional techniques, again at low pressures. Low pressure processes are typically run at pressures below 1000 psi, whereas high pressure processes are typically run at pressures above 15,000 psi (6.89 and 103 MPa, respectively).

As discussed above, in a dual reactor system, the high molecular weight component or the low molecular weight component can be prepared in the first reactor or second reactor. Dual reactor systems include, but are not limited to, two gas phase fluidized bed reactors in series, two stirred tank reactors in series, two loop reactors in series, two solution spheres or loops in series, or a suitable combination of two reactors. For the reaction of interest, appropriate comonomer amounts, ethylene partial pressures, and temperatures will be adjusted to produce the desired composition. Such adjustments can be made by those skilled in the art.

High Molecular Weight Reactor Operation Conditions

In an embodiment suitable for pipes, operating temperature can range from about 70° C. to about 110° C. The mole ratio of alpha-olefin to ethylene in this reactor can be in the range of from about 0.03:1 to about 0.105:1, and is preferably in the range of from about 0.04:1 to about 0.1:1 and most preferably from about 0.050:1 to about 0.095:1. The mole ratio of hydrogen (if used) to ethylene in this reactor can be in the range of from about 0.01:1 to about 0.09:1, preferably of from about 0.02 to about 0.05:1.

In an embodiment suitable for blown films, the high molecular weight reactor operating temperature is generally in the range from about 70° C. to about 110° C. The operating temperature is preferably varied with the desired density to avoid product stickiness in the reactor. The mole ratio of alpha-olefin to ethylene can be in the range from about 0.03 to about 0.105:1, preferably in the range from about 0.04:1 to about 0.1:1. The mole ratio of hydrogen to ethylene can be in the range from about 0.01:1 to about 0.09:1, and is preferably in the range from about 0.02:1 to about 0.05:1.

In an embodiment suitable for blow molding, the high molecular weight reactor operating temperature is generally in the range from about 70° C. to about 110° C. The operating temperature is preferably varied with the desired density to avoid product stickiness in the reactor. The mole ratio of alpha-olefin to ethylene can be in the range from about 0.03:1 to about 0.105:1, preferably in the range from about 0.04:1 to about 0.1:1. The mole ratio of hydrogen to ethylene can be in the range from about 0.01:1 to about 1:1, and is preferably in the range from about 0.02:1 to about 0.05:1.

Low Molecular Weight Reactor Operation Conditions

In an embodiment suitable for pipes, blown films and blow molding, the operating temperature is generally in the range from about 70° C. to about 110° C. The mole ratio of alpha-olefin to ethylene can be in the range from about 0.01 to about 0.065:1, preferably in the range from about 0.015:1 to about 0.055:1. The mole ratio of hydrogen to ethylene can be in the range from about 0.1:1 to about 1:1, and is preferably in the range from about 0.2:1 to about 0.95:1.

Additives

The inventive compositions may contain one or more additional components or additives. Suitable additional components include, for example, other polymers, fillers or additives, with the proviso that these additional components do not adversely interfere with the desired advantageous properties of the compositions of the invention. Rather, the additional components are selected such as to support the advantageous properties of an inventive composition and/or to support, or enhance, the composition's particular suitability for a desired application. "Other polymers," comprised in the composition of the invention, means polymers which do not qualify as a HMW interpolymer or a LMW interpolymer, as defined herein. Advantageously, such polymers are compatible with the inventive composition.

Preferred additional components are non polymeric. Additives include processing aids, acid neutralizers, UV stabilizers, antioxidants, process stabilizers, metal de-activators, additives to improve oxidative or chlorine resistance, pigments or colorants.

Effective additive packages are needed to protect the excellent mechanical properties during the life time of the fabricated parts, where the parts are exposed to UV or chlorine environment. A mixture of hindered amines, such as Cyasorb UV 3529, Chemisorb™ 944, 2020, 622, Hostavin™ N30, and the like, and UV absorbers, such as Cyasorb™ 531, Tinuvin™ 327, 328, 329, Cyasorb™ THT, and the like, can be used to stabilizer the polymer against the degradation by UV light. The preferred UV additive composition is the mixture of Cyasorb™ UV 531 and Cyasorb™ UV-3529. For domestic pipe applications, where chlorine resistance is needed, a synergetic antioxidant system comprising two or more hindered phenols is used. The first class of hindered phenols comprises the hindered phenols that exhibit excellent antioxidant reactivity (oxidation by oxygen or chlorine), such as IRGANOX™ I-1010, IRGANOX™ I-1076, or/and Hostanox™ O3. The second class of hindered phenol comprises the hindered phenols that have a good water extraction resistance, such as IROGANOX I-1330. In addition metal deactivators, like IROGANOX I-1024 or Naugard XL1, are employed in pipe installations where metal fittings maybe used.

In a preferred embodiment, the total range for UV stabilizers is from 100 to 8000 ppm, with a preferred range from 1000 ppm to 4000 ppm. In another embodiment, the total range of antioxidant/chlorine resistance additives is from 100 to 9000 ppm, with a preferred range from 1000 ppm to 6000 ppm. The preferred range for metal deactivators is from 300 to 2000 ppm.

Stabilizers to protect against degradation or consumption of additives during conversion from granular form to pellets, and in the extrusion of the pipe resin include phosphites. These act to prevent degradation of the phenolic type stabilizers so they are not consumed prior to the pipe being put into long term usage. Stabilizers include TNPP, Irgafos 168, Doverphos 9228, PEPQ, and others. A preferred phosphite is Irgafos 168 or Doverphos 9228. Preferred ranges are from 250 to 2000 ppm levels, more preferred levels are from 750 to 1800 ppm.

In one embodiment, an inventive composition contains one or more additives are selected from hindered amines, hindered phenols, metal deactivators, UV absorbers, phosphites, acid neutralizers, processing aids, and combinations thereof. In a further embodiment, the one or more additives are selected from Cyasorb 3529, Irganox 1010, Irganox 1076, Irganox 1330, Irganox MD1024, Irgafos 168, calcium stearate, Dynamar FX 5911, and combinations thereof. In yet another embodiment, the one or more additives are selected from Cyasorb 3529, Irganox 1010, Irganox 1076, Irganox 1330, Irganox MD1024, Doverphos 9228, calcium stearate, Dynamar FX 5911, and combination thereof. In yet another embodiment, the one or more additives are selected from the group consisting of UV N30, Irganox 1330, Doverphos 9228, Irganox MD1024, HO3, calcium stearate, Dynamar FX 5911, and combinations thereof.

Fabricated Articles

The compositions of the present invention can be used to manufacture a shaped article, or one or more components of a shaped article. Such articles may be single-layer or a multi-layer articles, which are typically obtained by suitable known conversion techniques, applying heat, pressure, or a combination thereof, to obtain the desired article. Suitable conversion techniques include, for example, blown film, cast film, co-extrusion, lamination, blow-molding, co-extrusion blow-molding, injection molding, injection stretch blow molding, compression molding, extrusion, pultrusion, calendering and thermoforming. Shaped articles provided by the invention include, for example, films, pipes, drip tapes and tubings, geomembranes, sheets, fibers, laminates, profiles and moldings. Inventive films include, but are not limited to, blown films, cast films and co-extruded films.

Film and film structures can be made using the novel compositions as described herein using conventional blown film fabrication techniques or other, biaxial, orientation processes, such as tenter frames or double bubble processes. Conventional hot blown film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192; incorporated herein by reference. Biaxial orientation film manufacturing process, such as described in a "double bubble" process, as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The disclosure of each is incorporated herein by reference. The film structures can also be made as described in a tenter-frame technique, such as that used for oriented polypropylene. Polymer compositions may be rheology modified to improve bubble stability.

Other multi-layer film manufacturing techniques for food packaging applications are described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by the TAPPI Press (1992)); the disclosure of each is incorporated herein by reference.

The films may be monolayer or multilayer films. The film made from an inventive composition can also be coextruded with the other layer(s), or the film can be laminated onto another layer(s) in a secondary operation, such as that described in Packaging Foods With Plastics, by Wilmer A. Jenkins and James P. Harrington (1991) or that described in "Coextrusion For Barrier Packaging" by W. J. Schrenk and C. R. Finch, Society of Plastics Engineers RETEC Proceedings, Jun. 15-17, 1981, pp. 211-229; the disclosure of each is incorporated herein by reference. If a monolayer film is produced via tubular film (i.e., blown film techniques, preferably on grooved barrel extruders) or flat die (i.e., cast film), as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as radiation induced cross-linking of the polymer and a biaxial orientation process.

The films and film layers of this invention are especially useful in vertical form-fill-seal (VFFS) applications. Patents describing improvements for VFFS applications, especially polymer improvements, include U.S. Pat. No. 5,228,531; U.S. Pat. No. 5,360,648; U.S. Pat. No. 5,364,486; U.S. Pat. No. 5,721,025; U.S. Pat. No. 5,879,768; U.S. Pat. No. 5,942,579; U.S. Pat. No. 6,117,465; each incorporated herein by reference.

Generally for a multilayer film structure, the novel compositions described herein comprise at least one layer of the total multilayer film structure. Other layers of the multilayer structure include, but are not limited to, barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE (linear low density polyethylene), HDPE (high density polyethylene), LDPE (low density polyethylene), nylon, graft adhesive polymers (e.g., maleic anhydride grafted polyethylene), and paper. Generally, the multilayer film structures comprise from 2 to 7 layers.

The invention also provides a film comprising at least one component formed from an inventive composition. The film may be a multi-layered film or a single layered film. Preferably, the film has a thickness from 2 mils to 50 mils, preferably from 3 mils to 30 mils, and more preferably from 4 mils to 20 mils. In yet a further embodiment, the composition can also be made into a sheet, via either the blown or cast film process. The sheet can be from 2 to 200 mils or 10 to 150 mils or 20 to 100 mils thick.

In another embodiment, the film has an Elmendorf Tear Strength, in the machine direction (MD), greater than, or equal to, 100 g/mil, preferably greater than, or equal to, 120 g/mil, and more preferably greater than, or equal to 140 g/mil.

In another embodiment, the film has an Elmendorf Tear Strength, in the traverse direction (TD), greater than, or equal to, 220 g/mil, preferably greater than, or equal to, 240 g/mil, and more preferably greater than, or equal to 260 g/mil.

In another embodiment, the film has a Normalized Dart Impact (B scale) greater than, or equal to, 60 g, preferably greater than, or equal to, 80 g, and more preferably greater than, or equal to 100 g. The invention also provides an article comprising an inventive film or sheet. Preferably, the article is a shipping sack, a geomembrane, or a drip tape.

DEFINITIONS

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to density, melt index, weight percent of component and other properties.

The term "polymer" is used herein to indicate, a homopolymer, a copolymer, or a terpolymer. The term "polymer" as used herein includes interpolymers, such as those made by the copolymerization of ethylene with C3-C10 alpha olefins or polypropylene with C4-C10 alpha olefins.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene-based interpolymer," as used herein, refers to an interpolymer that contains at least a majority mole percent ethylene (greater than 50 mole percent, based on total amount (moles) of polymerizable monomer), and one or more additional comonomers.

The term "ethylene/α-olefin interpolymer," as used herein, refers to an ethylene-based interpolymer that contains at least a majority mole percent ethylene (greater than 50 mole percent, based on total amount (moles) of polymerizable monomer), an α-olefin, and optionally, one or more additional comonomers.

The term "single peak," in reference to an ATREF profile, refers to a peak which does not exhibit two or more distinct maxima. Such a peak may have a leading tail.

The term "unimodal" as used herein in reference to the overall MWD of comparative examples, or in reference to the MWD of a component polymer of the inventive composition, means the MWD in a Gel Permeation Chromatography (GPC) curve does not substantially exhibit multiple component polymers, that is, no humps, shoulders or tails exist or are substantially discernible in the GPC curve. In other words, the DOS (Degree of Separation) is zero or substantially close to zero.

The term "bimodal" as used herein means that the MWD in a GPC curve exhibits two component polymers wherein one component polymer may even exist as a hump, shoulder or tail relative to the MWD of the other component polymer.

The term "multimodal" as used herein means that the MWD in a GPC curve exhibits more than two component polymers wherein one component polymer may even exist as a hump, shoulder or tail relative to the MWD of the other component polymer.

The term "distinct" as used in reference to the MWD of the LMW component and the HMW component means there is no substantial overlapping of the two corresponding molecular weight distributions in the resulting GPC curve. That is, each molecular weight distribution is sufficiently narrow and their average molecular weights are sufficiently different that the MWD of both components substantially exhibits a baseline on its HMW side as well as on its LMW side. In other words, the DOS is at least 1, preferably at least 2, 4, 5, 7, 9, or 10.

The term "catalyst precursor" as used herein means a mixture comprising titanium and magnesium compounds and a Lewis Base electron donor.

The term "inertly substituted" refers to substitution with atoms or groups which do not undesirably interfere with the desired reaction(s) or desired properties of the resulting coupled polymers.

The term LTD used herein refers to the distribution of the lamella thickness, Lc, of a polymer.

The term "substantially singular peak" is used herein with reference to LTD curves to mean that a peak does not substantially exhibit two or more peaks. But a "substantially single peak" may not follow a Gaussian distribution, may be broader than a Gaussian distribution would indicate, or have a flatter peak than a Gaussian distribution. Some substantially singular peaks may have a tail on either side of the peak. In some embodiments it may be possible to mathematically resolve a "substantially single peak" in an LTD curve into two or more components by various methods. In some embodiments a "substantially single peak" in an LTD curve follows the equation:

$$\frac{P_H - P_L}{P_i} \times 100\% \leq 10\% \quad (1)$$

where $P_i$ is a point in the LTD curve having a value for the percent weight fraction between that of the highest weight fraction value, $P_H$, of the LTD trace and the lowest point, $P_L$, having an Lc value between the Lc value of $P_i$ and the Lc value of $P_H$. In some instances, this percent difference is less than about 8%, or less than about 7%. In some embodiments a substantially single peak has a difference of about 5% or less or about 2.5% or less. Of course in some embodiments, there is no point $P_L$ between $P_i$ and $P_H$ so the percent difference is zero.

As used herein, the term "rheology modification" means change in melt viscosity of a polymer as determined by creep measurements and Dynamic Mechanical spectroscopy (DMS).

The term "melt processing" is used to mean any process in which the polymer is softened or melted, such as extrusion, pelletizing, film blowing and casting, thermoforming, compounding in polymer melt form, and the like.

The term "extruder" is used for its broadest meaning to include such devices, as a device which extrudes pellets or pelletizer.

The terms "blend" or "polymer blend," as used herein, mean a blend of two or more polymers. Such a blend may or may not be miscible. Such a blend may or may not be phase separated. Such a blend may or may not contain one or more domain configurations, as determined from transmission electron microscopy, light scattering, x-ray scattering, and other methods known in the art.

Test Methods

Density

Resin density was measured by the Archimedes displacement method, ASTM D 792-03, Method B, in isopropanol. Specimens were measured within 1 hour of molding, after conditioning in the isopropanol bath at 23° C. for 8 minutes to achieve thermal equilibrium prior to measurement. The specimens were compression molded according to ASTM D-4703-00, Annex A, with a 5 min initial heating period at about 190° C. (±2° C.) and a 15° C./min cooling rate per Procedure C. The specimen was cooled to 45° C. in the press, with continued cooling until "cool to the touch."

Flexural and Secant Modulus Properties

The resin stiffness is characterized by measuring the Flexural Modulus at 5% strain and Secant Modulii at 1% and 2% strain, and a test speed of 0.5 inch/min (13 mm/min) per ASTM D 790-03 Method B. The specimens are compression molded according to ASTM D-4703-00 Annex 1, with a 5 min initial heating period at about 190° C. (±2° C.), and a 15° C./min cooling rate per Procedure C. The specimen is cooled to 45° C. in the press with continued cooling until "cool to the touch."

Tensile Properties

Tensile strength at yield, elongation at yield, tensile strength at break, and elongation at break are measured according to ASTM D-638-03, with a test speed of two inches per minute. All measurements are performed at 23° C. on rigid type IV specimens, which are compression molded per ASTM D 4703-00, Annex A-1, with a 5 minute initial heating period at about 190° C. (±2° C.), and a 15° C./min cooling rate per Procedure C. The specimen is cooled to 45° C. in the press, with continued cooling until "cool to the touch."

Melt Flow Rate by Extrusion Plastomer

Melt flow rate measurements were performed according to ASTM D-1238-04, Condition 190° C./2.16 kg and Condition 190° C./21.6 kg, which are known as I2 and I21, respectively. Melt flow rate is inversely proportional to the molecular weight of the polymer. Thus, the higher the molecular weight, the lower the melt flow rate, although the relationship is not linear. Melt Flow Ratio (MFR) is the ratio of melt flow rate (I21) to melt flow rate (I2), unless otherwise specified.

When polymers are tested with fluoroelastomer processing aide, the melt indexer should be thoroughly cleaned after each use.

Polymer Fines

The amount of polymer fines in a given sample was determined using the following method: 500 grams of polymer were added to a standard sieve set consisting of the following US mesh sizes: 10, 18, 35, 60, 120, 200 (2000 µm, 1000 µm, 500 µm, 250 µm, 125 µm, 75 µm) and pan. A Rotap or Gradex 2000 shaker was used to separate the particles. The materials which pass through the 120 mesh screen and remain on the pan were classified as fines. The geometric mean is used to calculate the particle average particle size (APS).

Bulk Density

Bulk density of the polymer was determined using ASTM D1895-96 (re-approved 2003).

Film Appearance Rating (FAR)

A FAR value is obtained by comparing the extruded film to a set of reference film standards, both at 1.5 mil (38 µm) thickness for the pipe and blow molding resins. The film resin is fabricated to 1 mil thickness (25 µm) and compared to the 1.5 mil (38 µm) film standards. The standards are available from The Dow Chemical Company (Test Method PEG #510 FAR). For all resins except film resins, the following method is used. The resin extruded is pelleted resin which includes the stabilizer(s). A Model CE-150-20, 38 mm (1.5 in) 20:1 L/D, MPM Custom Equipment electrically heated air-cooled extruder with 7 heating zones (3 barrel, 1 gate, 3 die) is used to make the film specimens.

A more detailed extruder description is as follows:
Extruder Manufacturer: MPM Polymer Systems, Inc.
    Type: Low Boy [610 mm (24 in) Center Line]
    Heating: Electrical 425° C. controllers
    Cooling: Only on hopper (water)
    Speed: Variable
Screw Manufacturer: MPM Polymer Systems, Inc.
    Type: 20:1 standard low density polyethylene screw bored to midway of transition section.
    Diameter: 38 mm (1.5 in)
    L to D: 20/1

Die Manufacturer: MPM Polymer Systems, Inc.
  Diameter: 100 mm (4 in)
  Gap: 30 mil (0.762 mm)
  Type: Deep Side Fed
Blower Manufacturer: Buffalo Forge
  Air flow control damper on suction
  Air flow control valving on discharge
  Motor: 1.5 hp (1120 W), 2 speeds
  Air equalizing chamber between blower and air
Air Ring Manufacturer: MPM Polymer Systems, Inc.
  Layout 708
  Diameter: 172 mm (6.75 in) I.D.
  Type: Adjustable lip
Tower Height: 914 mm (36 in)
Collapsing Frame Length: 343 mm (13.5 in)
The extrusion conditions for the FAR test were as follows:
Screw Neutral
Hopper Water Full Flow
Temperatures (° C.)

| | |
|---|---|
| Zone 1 | 210 |
| Zone 2 | 210 |
| Zone 3 | 210 |
| Gate | 225 |
| Adapter | 225 |
| Die Zone 1 | 225 |
| Die Zone 2 | 225 |
| Screen Pack, stainless steel, mesh | 40/40 |

Output:

| Output: | |
|---|---|
| Screw Speed | 65 rpm |
| Blow up Ratio | 2/1 |
| Lay flat width | 12 in (304.8 mm) |
| Frost Line Height | 103 in (254 mm) |
| Tower Height | 36 in (914.4 mm) |
| Film Rating Test: | |
| Nip Roll Speed | 254 ft/min (1.29 m/s) |
| Film Gauge | 1.5 mil (0.038 mm) |
| Range for Film Gauge | 1.3-1.7 mil (33-43.2 μm) |

The screw speed can be adjusted to give proper throughput rates. Frost line is measured from the lower level of the air ring. The nip roll speed is varied until a film thickness of 1.5 mil (38 μm) was obtained. Film thickness is measured using a Federal dial indicator gauge according to ASTM D 374.

After the extruder has reached thermal equilibrium, and uniform film is being produced, a film sample of 3 m length is taken. Ratings are based upon the worst section viewed in each sample. This rating is based on the level of gels observed in the film, a general term for a discrete imperfection in polyethylene film. Gels may be formed from high molecular weight material, either clear or discolored, lint or other foreign contamination, or resin cross contamination. Gels are the most common defect encountered in films, and account for a large portion of the film rating. Other defects were noted, but normally are not included in the film appearance value. If needed, reference is made to a set of high density film standards during this evaluation. The values given are in increments of 10 units ranging from +50 (best) to −50 (worst).

Lamellar Thickness Distribution (LTD)

An LTD curve refers to a plot of the weight percent as a function of the lamellar thickness (Lc). Additional information can be found in U.S. Pat. No. 4,981,760 and U.S. Publication 2004/0034169 A1, which are incorporated by reference herein in their entireties.

The LTD data are obtained and analyzed in the following manner. Samples are cut directly from the fabricated polyethylene products. DSC samples are taken from the pipe wall, film, or plaques used for PENT measurements. Samples can also be taken from the pellets to gain an insight into the effect of pelletizing conditions on LTD. If the fabrication process did not yield a uniform cooling/solidification profile, samples are taken from different parts of the product to reflect these differences. This may be important in extruded pipes if the pipe was cooled from the outside to the inside by cold water such that the cooling rate therefore decreased from the outside to the inside of the pipe wall. To reflect these differences, at least three samples are taken from the outside, middle and inside layer of the pipe wall. About 10 mg of sample is analyzed by DSC using a heating rate of 10° C./min. To better compare the differences caused by molecular variables, the solidification history of the sample is standardized as follows: the specimen is recrystallized by melting the specimen in the DSC sample holder at 190° C., and then cooled down to 30° C. at the rate of 20° C./min to eliminate artifacts in the DSC curve that might otherwise be observed due to previous fabrication processes.

A three step procedure is used. First, the LTD in products, such as pipes or film, is determined by scanning the sample from 30° C. to 190° C. at the heating rate of 10° C./min. The characteristic of the resultant LTD is associated with both the material variables and the processing condition. The sample is maintained at 190° C. for one minute to completely relax the molecular chains. Second, the sample is cooled at the cooling rate of 20° C./min, from 190° C. to 30° C., to allow the sample to re-crystallize under controlled conditions. The temperature is maintained at 30° C. for one minute. Third, the sample is heated at a rate of 10° C./min to determine LTD in the re-crystallized sample. This LTD is used to investigate the effect of material variables by eliminating the fabrication factors. First, the DSC melting peak is integrated. The melting temperature and the corresponding integrated partial area of the melting peak were recorded. The melting temperature is then used to calculate the lamella thickness, 1, of polyethylene crystal according to the well-known Thomson-Gibbs equation from the melting point, Tm.

$$T_m = T_m^\circ \left(1 - \frac{2\sigma_e}{l \cdot \Delta h_m}\right), \quad (1)$$

where $T_m^\circ$ is the equilibrium melting point of an infinite crystal, $\sigma_e$ is the surface free energy of the basal plane, and $\Delta h_m$ is the enthalpy of fusion per unit volume. In *Die Makromolekulare Chemie*, 1968, 113, 1-22, Illers and Hendus experimentally determined the constants in equation (1). The lamella thickness, Lc (nm), then can be calculated from the melting point, Tm (K).

$$L_c = \frac{0.62 - 414.2}{414.2 - T_m}. \quad (2)$$

For a given melting temperature from the DSC melting peak, the corresponding lamella thickness is obtained from equation (2). Lamellar thickness distributions are also discussed in *Polymer* vol. 38, issue 23 (1997) by Zhou, Hongi, and Wilkes, the disclosure of which is hereby incorporated by reference. The integrated partial area of the melting peak is used to calculate the differentiated weight percent of the crystal for a given lamella thickness. The partial area, $\Delta H_i$, of a DSC melting peak is assumed to be proportional to the weight percent of the lamella crystal within this partial area. The differentiated weight percent, wt %, of the lamellae at the thickness $L_{c,i}$ is therefore determined by equation (3).

$$\text{wt \%} (L_{c,i}) = \frac{d(\Delta H_i)/\Delta H_{total}}{d(L_c)} \quad (3)$$

The plot of the weight percent from the integrated partial area as a function of the lamella thickness gives the LTD curve. In addition, the total heat fusion of the melting peak can be used to determine the crystallinity. The detailed data analysis process is discussed in the following. Analysis of the LTD curve obtained from the procedure described above can be analogized to the analysis of (MWD) or polydispersity index (PDI) based on the weight (Mw) and number (Mn) average molecular weight, the thickness average, Lt, and number average, Ln, lamella thickness are therefore defined by equation (4) and (5).

$$L_t = \frac{\sum_{i=1}^{\infty} L_{c,i}^2 n_i}{\sum_{i=1}^{\infty} L_{c,i} n_i} = \sum_{i=1}^{\infty} L_{c,i} \Delta H_i / \Delta H \quad (4)$$

$$L_c = \frac{\sum_{i=1}^{\infty} L_{c,i} n_i}{\sum_{i=1}^{\infty} n_i} = \frac{1}{\sum_{i=1}^{\infty} \left(\frac{\Delta H_i}{\Delta H}\right)/L_{c,i}} \quad (5)$$

Similar to the polydispersity index (PDI=MWD=Mw/Mn) which gives information regarding the molecular weight distribution, the lamella dispersity index, LDI, is hence given by equation $$LDI = \frac{L_t}{L_n}. \quad (6)$$

Thus, the LDI is a quantitative characteristic of the breadth of the LTD curve.

Differential Scanning Calorimetry (DSC)

Thermal measurements, Tm and Tc, are generated via a TA Instruments Model Q1000 DSC, equipped with an RCS (refrigerated cooling system) cooling accessory and an auto sampler. A nitrogen purge gas flow of 50 ml/min is used throughout. The sample is pressed into a thin film, using a press at 175° C. and 1500 psi (10.3 MPa) maximum pressure, for about 15 seconds, then air-cooled to room temperature at atmospheric pressure. About 3 to 10 mg of material is then cut into a 6 mm diameter disk using a paper hole punch, weighed to the nearest 0.001 mg, placed in a light aluminum pan (ca 50 mg) and then crimped shut.

The thermal behavior of the sample is investigated with the following temperature profile. The sample was rapidly heated to 180° C., and held isothermal for 3 minutes, in order to remove any previous thermal history. The sample is then cooled to −40° C. at 10° C./min cooling rate, and is held at −40° C. for three minutes. The sample is then heated to 150° C. at 10° C./min heating rate. The cooling and second heating curves are recorded.

Gel Permeation Chromatography (GPC)

The following procedure was used to determine the molecular architecture of various polymer compositions. The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories.

The carousel compartment was operated at 140° C., and the column compartment was operated at 150° C. The columns used were four Shodex HT 806M 300 mm, 13 μm columns and one Shodex HT803M 150 mm, 12 μm column. The solvent used was 1,2,4-trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters and the flow rate was 0.67 milliliters/min.

Calibration of the GPC column set was performed with 21 narrow molecular weight distribution polystyrene standards with molecular weights ranging from 580 to 8,400,000 g/mol which were arranged in six "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component to minimize degradation. The polystyrene standard peak molecular weights were converted to polyethylene molecular weights using equation 8 (as described in Williams and Ward, J. Polym. Sci., Polym. Let., 6, 621 (1968)):

$$M\text{polyethylene}=A\times(M\text{polystyrene})^B \quad (8),$$

where M is the molecular weight, A has a value of 0.41 and B is equal to 1.0.

The Systematic Approach for the determination of multi-detector offsets was done in a manner consistent with that published by Balke, Mourey, et al. (Mourey and Balke, Chromatography Polym. Chpt 12, (1992) and Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software.

The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2nd Virial coefficient effects (concentration effects on molecular weight).

Molecular weight calculations were performed using in-house software. The calculation of the number-average molecular weight, weight-average molecular weight, and z-average molecular weight were made according to the following equations assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (9) below:

$$a) \overline{Mn} = \frac{\sum_i Wf_i}{\sum_i (Wf_i/M_i)}$$

$$b) \overline{Mw} = \frac{\sum_i (Wf_i * M_i)}{\sum_i Wf_i}$$

$$c) \overline{Mz} = \frac{\sum_i (Wf_i * M_i^2)}{\sum_i (Wf_i * M_i)}.$$

(9)

The term "bimodal," as used herein, means that the MWD in a GPC curve exhibits two component polymers, wherein one component polymer may even exist as a hump, shoulder or tail relative to the MWD of the other component polymer. A bimodal MWD can be deconvoluted into two components: LMW component and HMW component. After deconvolution, the peak width at half maxima (WAHM) and the average molecular weight (Mw) of each component can be obtained. Then the degree of separation (DOS) between the two components can be calculated by equation 10:

$$DOS = \frac{\log(M_w^H) - \log(M_w^L)}{WAHM^H + WAHM^L},$$

(10)

wherein $M_w^H$ and $M_w^L$ are the respective weight average molecular weight of the HMW component and the LMW component; and $WAHM^H$ and $WAHM^L$ the respective peak width at the half maxima of the deconvoluted molecular weight distribution curve for the HMW component and the LMW component.

The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to about 100, between about 100 to 500, or between about 500 to 1,000. It should be noted that DOS can be any number in the above range. In other embodiments, DOS exceeds 1,000.

Swell

The resin swell is measured by the Dow Lab Swell method which consists of measuring the time required by an extruded polymer strand to travel a pre-determined distance of 230 mm. The Göttfert Rheograph 2003 with, 12 mm barrel, and equipped with a 10 L/D capillary die is used for the measurement. The measurement was carried out at 190° C., at two fixed shear rates, 300 s$^{-1}$ and 1,000 s$^{-1}$, respectively. The more the resin swells, the slower the free strand end travels and, the longer it takes to cover 230 mm. The swell is reported as t300 and t1000 (s) values.

Rheology

The sample is compression molded into a disk for rheology measurement. The disks are prepared by pressing the samples into 0.071" (1.8 mm) thick plaques, and were subsequently cut into 1 in (25.4 mm) disks. The compression molding procedure is as follows: 365° F. (185° C.) for 5 min at 100 psi (689 kPa); 365° F. (185° C.) for 3 min at 1500 psi (10.3 MPa); cooling at 27° F. (15° C.)/min to ambient temperature (about 23° C.).

The resin rheology is measured on the ARES I (Advanced Rheometric Expansion System) Rheometer. The ARES is a strain controlled rheometer. A rotary actuator (servomotor) applies shear deformation in the form of strain to a sample. In response, the sample generates torque, which is measured by the transducer. Strain and torque are used to calculate dynamic mechanical properties such as modulus and viscosity. The viscoelastic properties of the sample are measured in the melt using a parallel plate set up, at constant strain (5%) and temperature (190° C.), and as a function of varying frequency (0.01 to 100 or 500 s$^{-1}$). The storage modulus (G'), loss modulus (G"), tan delta, and complex viscosity (eta*) of the resin are determined using Rheometrics Orchestrator software (v. 6.5.8).

Low shear rheological characterization is performed on a Rheometrics SR5000 in stress controlled mode, using a 25 mm parallel plates fixture. This type of geometry is preferred to cone and plate because it requires only minimal squeezing flow during sample loading, thus reducing residual stresses.

Creep measurements are carried out at 170° C. and 190° C. After zeroing the gap between the parallel plates, the temperature is increased to 220° C. for sample loading (about 5 min) in order to accelerate the relaxation of normal stresses, and then decreased to the measuring temperature. Creep test was performed under a stress of 20 Pa, which is the best compromise to have a good signal to noise (S/N) ratio, while remaining in the linear (low deformation) regime. The deformation is recorded with time up to 30,000 s, or until the viscosity leveled off, indicating that the steady state is reached. The steady-state viscosity is determined using the automatic feature of the Rheometrics Orchestrator software (v. 6.5.8). Several repeats were run, until the standard deviation on the steady-state viscosity decreased below 4%.

A Dynamic Mechanical Spectroscopy (DMS), also called frequency sweep, test in stress-controlled mode is performed before and after the first creep run to check for degradation. The angular frequency is varied from 0.1 to 100 rad/s with a stress amplitude of 1000 Pa, which corresponds to strain amplitudes between 0.1% (at 100 rad/s) and 10% (at 0.1 rad/s). It is concluded that stability is good. On the subsequent runs, the DMS test is run only after the creep test to avoid introducing perturbations due to shear history.

The steady-state data point from creep is combined with the viscosity curve from DMS to extend the accessible range of shear rates down to 10-61/s, and fitted with the 4-parameter Carreau-Yasuda model:

$$\eta = c_1(1+(c_2 x)^{c_3})^{(c_4-1)/c_3} \quad (11).$$

Antioxidant Content by High Pressure Liquid Chromatography (HPLC)

Antioxidants, such as Irgafos 168 and Irganox 1010, are commonly used to protect the polymer from thermal and or oxidative degradation. Irganox 1010 is tetrakis (methylene (3,5 di tert-butyl-4-hydroxyhydrocinnamate) available from Ciba Geigy Inc. Irgafos 168 is tris-(2,4-di-tert-butylphenyl) phosphite available from Aldrich Chemical Company.

Sample Preparation: Polyolefin pellets are powdered using a Retsch Model ZM100 Grinder fitted with a 1.0 mm sieve. The 1.0 mm sieve produces particles with an average size of 0.5 mm. The pellets and grinder are chilled with liquid nitrogen prior to grinding. About 2 grams of polymer is placed in a polystyrene cup, and about 50 mL of liquid nitrogen is added to cool the polymer. About 50 mL of liquid nitrogen is poured into the funnel of the grinder to cool the mechanical parts, followed by pouring the liquid and the pellets from the polystyrene cup into the grinder.

Extraction: Five grams of the powder is extracted with 40 mls of carbon disulfide (C2S) by shaking with an automated shaker for 72 hours. Five mls of the extract ware taken from the clear, transparent lower layer of the CS2 extract and dried under a gently flowing dry nitrogen stream. The resulting residue is dissolved in 5 ml of isopropanol, with gentle heating on a steam bath, cooled and filtered using a 0.2 m syringe filter into a HPLC sample vial, and analyzed by HPLC according to the following procedure.

The HPLC instrument is a HP 1090 available from Hewlett-Packard, Inc., with a Thermo Hypersil column from Keystone Scientific. The column packing is Waters Spherisorb ODS 2. Column size was 150×4.6 mm, pore size 80 ångströms, and particle size 3 μm. The initial solvent is a mixture consisting of 30% water and 70% acetonitrile. At 10 minutes, 100% acetonitrile is introduced, then at 15 minutes a mixture consisting of 80% acetonitrile and 20% isopropanol is introduced. Total run time is 20 minutes at a flow rate of 1 ml per minute. The 276 nm wavelength is monitored.

Calibration for each additive is performed by making up a known concentration of the additive in isopropanol (about 0.03 g per 100 ml). For oxidized Irgafos 168 the calibration is performed by oxidizing a standard isopropanol solution of Irgafos 168 with excess hydrogen peroxide for one hour.

Brittleness Temperature

Brittleness temperature is measured according to ASTM D-746, Procedure A, using a Tinius Olsen Brittle Point Tester, with specimen Type 1, for fixture type A, tightened with torque per Note 8. Heat transfer medium is methanol or isopropanol.

Thermal Stability

Thermal Stability is measured according to ASTM D-3350-02, section 10.1.9, by a DSC technique. Thermal Stability is also called Oxidation Induction Time, with the time to failure measured at 210° C. Test specimens taken from pipe or fittings made from the virgin material are measured using differential scanning calorimeter (DSC). The directions of the instrument (DSC) manufacturer regarding calibration and operation is followed, except when in conflict with other parts of section 10.1.9. The polyethylene-based resin contains sufficient antioxidant, so that the minimum induction temperature is 220° C., when tested in accordance with section 10.1.9.

The g' Average

The g' is expressed as the ratio of intrinsic viscosity of the instant high-density polyethylene composition to the intrinsic viscosity of a linear polymer reference. The g' average was determined according to the following procedure.

The chromatographic system consisted of a Waters (Millford, Mass.) 150° C. high temperature chromatograph, equipped with a Precision Detectors (Amherst, Mass.) t-angle laser light scattering detector Model 2040, an IR4 infra-red detector from Polymer Char (Valencia, Spain), and a Viscotek (Houston, Tex.) 150R 4-capillary viscometer. The 15-degree angle of the light scattering detector was used for calculation purposes. Data collection was performed using Viscotek TriSEC software, version 3, and a 4-channel Viscotek Data Manager DM400. The system was equipped with an on-line solvent degas device from Polymer Laboratories. The carousel compartment was operated at 140° C., and the column compartment was operated at 150° C. The columns used were 4, 20-micron mixed-bed light scattering "Mixed A-LS" columns from Polymer Laboratories. The solvent used was 1,2,4-trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters, and the flow rate was 1 milliliters/minute.

Calibration of the GPC column set was performed with 21 narrow molecular weight distribution polystyrene standards, with molecular weights ranging from 580 to 8,400,000, and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000, and 0.05 grams in 50 milliliters of solvent for molecular weights less than 1,000,000. The polystyrene standards were dissolved at 80° C., with gentle agitation for 30 minutes. The narrow standards mixtures were run first, and in order of decreasing highest molecular weight component to minimize degradation. The polystyrene standard peak molecular weights were converted to polyethylene molecular weights using the following equation (as described in Williams and Ward, J. Polym. Sci., Polym. Let., 6, 621 (1968)).:

$$M \text{polyethylene} = A \times (M \text{polystyrene})^B$$

Where M is the molecular weight, A has a value of 0.43 and B is equal to 1.0.

The Systematic Approach for the determination of multi-detector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log(MW and IV) results from Dow Broad Polystyrene 1683 to the narrow standard column calibration results from the narrow standards calibration curve using a software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the refractive index detector calibration from a linear polyethylene homopolymer of 115, 000 molecular weight. The chromatographic concentrations were assumed low enough to eliminate addressing 2nd Virial coefficient effects (concentration effects on molecular weight).

The g' average was calculated for the samples as follow:

1. Calibrated the light scattering, viscosity, and concentration detectors with NBS1475 homopolymer polyethylene (or equivalent reference);
2. Corrected the light scattering and viscometer detector offsets relative to the concentration detector as described in the calibration section;
3. Subtracted baselines from the light scattering, viscometer, and concentration chromatograms and set integration windows making certain to integrate all of the low molecular weight retention volume range in the light scattering chromatogram that were observable from the refractometer chromatogram;
4. Established a linear homopolymer polyethylene Mark-Houwink reference line by injecting a standard with a polydispersity of at least 3.0, calculated the data file (from above calibration method), and recorded the intrinsic viscosity and molecular weight from the mass constant corrected data for each chromatographic slice;
5. Injected the HDPE sample of interest and calculated the data file (from above calibration method), and recorded the intrinsic viscosity and molecular weight from the mass constant corrected data for each chromatographic slice;
6. Shifted the homopolymer linear reference intrinsic viscosity by the following factor: IV=IV+1/(1+2*SCB/1,000C*branch point length) where IV is the intrinsic viscosity of the HDPE sample of interest, SCB/1,000C was determined from C13 NMR, and the branch point length is 2 for butene, 4 for hexene, or 6 for octene);
7. Calculated g' average according to the following equation.

$$g' = \frac{\sum_{j=WhereM>40,000}^{HighestM}\left[c_j \times \left(\frac{IV_j}{IV_{Lj}}\right)_M\right] + \sum_{j=LowestM}^{WhereM>40,000} c_j}{\sum_{j=LowestM}^{HighestM} c_j}$$

In the above equation, c is the concentration of the slice, IV is the intrinsic viscosity of the HDPE, and $IV_L$ is the intrinsic viscosity of the linear homopolymer polyethylene reference (corrected for SCB of the HDPE sample of interest) at the same molecular weight (M). The IV ratio was assumed to be one, at molecular weights less than 40,000 to account for natural scatter in the light scattering data.

The polyethylene composition may have a g' average of equal, or greater than, 1, as measured by Triple Detector GPC, as described above. As discussed above, the g' is expressed as the ratio of intrinsic viscosity of the instant high-density polyethylene composition to the intrinsic viscosity of a linear polymer reference. If the g' is equal, or greater than, 1, then the sample being analyzed is considered linear, and if g' is less than 1, it is, then, by definition a branched polymer as compared to a linear polymer. However, current testing methods may be subject to errors in their precision and accuracy; thus, proper steps must be taken to account for such precision errors. Therefore, small deviations, for example values of less than, or equal to, 0.012, from unity, i.e. 0.988 would still be defined as linear polymers.

Film Property Measurements

Tear resistance values were obtained using an Elmendorf Tear Tester in compliance with the ASTM D-1922-06a. For each film sample, ten to fifteen specimens were tested in both machine (MD) and transverse/cross (TD/CD) direction.

Dart impact testing was measured according to ASTM D 1709-04, Method A, and Method B, if there were no failures via Method A, by the staircase technique, with the dart dropped around the circumference of the film sample, using film specimens with the appropriate thickness. The specimens were taken from a blown film line, after at least three minutes of blowing the film with a clean die lip to avoid scratches. The films were aged at standard laboratory conditions of 23° C. and 50% relative humidity, for a period of at least 40 hours. Test Methods A and B are used to establish the weight of the dart when 50% of the test specimens fail under the specified conditions.

Test Method A employs a dart with a 38.10±0.13 mm (1.500±0.005 in) diameter hemispherical head, dropped from a height of 0.66±0.01 m (26.0±0.4 in). This test method may be used for films, whose impact resistance requires masses of about 50 g, or less, to about 2 kg, to impart fracture.

Test Method B employs a dart with a 50.80±0.13 mm (2.000±0.005 in) diameter hemispherical head, dropped from a height of 1.50±0.03 m. Its range of applicability is from about 0.3 kg to about 2 kg.

The impact resistance cannot be normalized over a range of thickness, since no simple correlation exists between film thickness and impact resistance. Data from these test methods are comparable only for test specimens that vary by no more than ±25% from the nominal or average thickness of the specimens tested.

Film tensile properties were measured according to ASTM D-882-02.

Film gloss was measured according to ASTM D-2457-03 (45 degree gloss).

Film haze was measured according to ASTM D-1003-00 (Method A).

Film puncture resistance was measured according to ASTM D-5748-07.

Film COF O/I was measured according to ASTM D-1894-06.

The following examples are provided for the purpose of illustrating the invention, and are not to be construed as limiting the scope of the invention.

Examples of the Invention

The following examples are to illustrate this invention and to not limit it. Ratios, parts, and percentages are by weight, unless otherwise stated.

Inventive Samples: I922; I515; I516; I513; I514; I517; and D20.

Comparative Samples: C918; C919; C920; C921; C923; C924; C636; C024; C025; C453; C454; C586; C587; C588; C589; C590; C591; C592; C510; C512.

Competitive Samples: COM049; and COM769.

ATREF-DV profiles of several compositions are shown in FIGS. 1-29.

Catalyst Preparation

Preparation of Catalyst Precursor

For the inventive and comparative examples, a titanium trichloride catalyst precursor was prepared in an approximately 7,500 liter glass lined vessel, equipped with pressure and temperature control, and a turbine agitator. A nitrogen atmosphere (<5 ppm $H_2O$) was maintained at all times. Tetrahydrofuran (10,500 lbs, 4,800 kg, <400 ppm $H_2O$) was added to the vessel. The tetrahydrofuran was recovered from a closed cycle dryer, and contained approximately 0.1 percent Mg and 0.3 percent Ti. An "11 percent THF solution" of triethylaluminum was added to scavenge residual water. The reactor contents were heated to 40° C., and 13.7 lbs (6 kg) of granular magnesium metal (particle size 0.1-4 mm) was added, followed by 214.5 lbs (97.3 kg) of titanium tetrachloride added over a period of one-half hour.

The mixture was continuously agitated. The exotherm resulting from the addition of titanium tetrachloride caused the temperature of the mixture to rise to approximately 44° C. The temperature was then raised to 70° C., and held at that temperature for approximately four hours, then cooled to 50° C. At the end of this time, 522 pounds (238 kg) of magnesium dichloride were added, and heating initiated to raise the temperature to 70° C. The mixture was held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lbs, 368 kg) was added to the above precursor solution over a period of one hour. The mixture was stirred by means of a turbine agitator during this time, and for 4 hours thereafter, to thoroughly disperse the silica. The temperature of the mixture was held at 40° C. throughout this period, and a dry nitrogen atmosphere was maintained at all times. The resulting slurry was spray dried using an 8-foot diameter closed cycle spray dryer, equipped with a rotary atomizer. The rotary atomizer was adjusted to give catalyst particles with a D50 on the order of 20-30 μm. The scrubber section of the spray dryer was maintained at approximately +5 to −5° C.

Nitrogen gas was introduced into the spray dryer at an inlet temperature of 140 to 165° C., and was circulated at a rate of approximately 1000-1800 kg/hour. The catalyst slurry was fed to the spray dryer at a temperature of about 35° C., and a rate of 65-150 kg/hour, or sufficient to yield an outlet gas temperature in the range of 100-125° C. The atomization pressure was maintained at slightly above atmospheric. The resulting catalyst particles were mixed with mineral oil (Kaydol™ 350, available from Witco Corporation), under a nitrogen atmosphere in a 400 liter glass lined vessel, equipped with a turbine agitator, to form a slurry containing approximately 28 percent of the catalyst precursor.

Catalyst Precursor Partial Pre-activation

In some of the polymerizations (noted 0017 reduction), the catalyst precursor was partially pre-activated. The mineral oil slurry of precursor was partially activated by contact at room temperature with a 30 percent mineral oil solution of diethylaluminum chloride (DEAC), a 50 percent mineral oil solution of tri-n-hexyl aluminum (TNHA), or a sequential mixture of both activators. The catalyst precursor slurry was added to a mixing vessel at room temperature in an amount less than a stoichiometric amount, based on Lewis base present in the precursor. An appropriate amount of activator was added while stirring. If both activators were used, the DEAC solution was added first, and the slurry was stirred for one hour, followed by addition of the TNHA solution, followed by stirring for another two hours. If only DEAC or TNHA activator was used, addition was followed by stirring for at least one hour prior to use. Following partial activation, the slurry containing the partially activated precursor was retained at room temperature prior to use.

Representative Polymerization

For the inventive and comparative examples, ethylene was copolymerized with 1-hexene in two fluidized bed reactors. Each polymerization was continuously conducted after equilibrium was reached, under the respective conditions, as set forth in the respective tables of Tables 2A-6I, as shown below. Polymerization was initiated in the first reactor by continuously feeding the catalyst (Ziegler/Natta catalyst) and cocatalyst (trialkyl aluminum) into a fluidized bed of polyethylene granules, together with ethylene, 1-hexene and hydrogen. The resulting copolymer, mixed with active catalyst, was withdrawn from the first reactor and transferred to the second reactor, using second reactor gas as a transfer medium. The second reactor also contained a fluidized bed of polyethylene granules. Ethylene, 1-hexene, and hydrogen were introduced into the second reactor, where the gases come into contact with the polymer and catalyst from the first reactor. Inert gases, nitrogen and isopentane, make up the remaining pressure in both the first and second reactors. In the second reactor, the cocatalyst was again introduced. The final product blend was continuously removed. As known in the art, 1 kPa is 0.145 psi, 1 kg is 2.205 lb and 1 in is 25.4 mm.

TABLE 2A

INVENTIVE SAMPLES

| | SAMPLE NO. | | | | | |
|---|---|---|---|---|---|---|
| | I513 | I514 | I515 | I516 | I517 | I922 |
| Type | 0017 reduction | 0017 reduction | 0017 reduction | 0017 reduction | 0017 reduction | Precursor |
| REACTION CONDITIONS (First Reactor) | | | | | | |
| Temp. ° C. | 80.0 | 80.0 | 80.0 | 80.0 | 80.0 | 80.0 |
| C2 Part. Pressure, psi | 32.2 | 30.9 | 31.3 | 28.2 | 27.6 | 35.6 |
| H2/C2 Molar Ratio | 0.034 | 0.034 | 0.034 | 0.034 | 0.035 | 0.034 |
| C6/C2 Molar Ratio | 0.070 | 0.070 | 0.062 | 0.080 | 0.081 | 0.087 |
| Ethylene lb/hr | 22.1 | 20.4 | 20.5 | 21.1 | 19.6 | 27.3 |
| Hexene lb/hr | 1.0 | 0.9 | 0.8 | 1.1 | 1.1 | 1.3 |
| Hydrogen mlb/hr | 6.3 | 5.8 | 6.0 | 5.6 | 5.1 | 6.4 |
| Nitrogen lb/hr | 6.1 | 6.2 | 6.1 | 6.0 | 5.8 | 4.5 |
| Ethylene Mol % | 10.3 | 9.9 | 10.0 | 9.0 | 8.8 | 11.4 |
| Hexene Mol % | 0.7 | 0.7 | 0.6 | 0.7 | 0.7 | 1.0 |
| Hydrogen Mol % | 0.3 | 0.3 | 0.3 | 0.3 | 0.3 | 0.4 |
| Isopentane Mol % | 7.8 | 6.5 | 6.7 | 8.0 | 6.7 | 8.0 |
| Nitrogen Mol % | 80.3 | 82.9 | 82.6 | 81.9 | 83.9 | 78.9 |
| Cat cc/hr | 2.2 | 2.2 | 2.2 | 2.2 | 2.2 | 14.4 |

TABLE 2A-continued

INVENTIVE SAMPLES

| | SAMPLE NO. | | | | | |
|---|---|---|---|---|---|---|
| | I513 | I514 | I515 | I516 | I517 | I922 |
| E.B. Production Rate, lb/hr | 25.1 | 24.0 | 23.9 | 24.0 | 24.1 | 34.8 |
| Bed Weight, lbs | 68.8 | 69.6 | 69.6 | 70.4 | 70.4 | 68.5 |
| FBD (lb/ft3) | 21.5 | 22.4 | 22.6 | 22.7 | 23.2 | 11.8 |
| Bed Volume, ft3 | 9.64 | 10.64 | 10.64 | 10.64 | 10.64 | 11.64 |
| Residence Time, hr | 2.7 | 2.9 | 2.9 | 2.9 | 2.9 | 2.0 |
| STY, lb/hr/ft3 | 2.6 | 2.3 | 2.3 | 2.3 | 2.3 | 3.0 |
| SGV (ft/sec) | 2.6 | 3.6 | 4.6 | 5.6 | 6.6 | 11.6 |

TABLE 2B

INVENTIVE SAMPLES continued

| | SAMPLE NO. | | | | | |
|---|---|---|---|---|---|---|
| | I513 | I514 | I515 | I516 | I517 | I922 |
| RESIN PROPERTIES (First Reactor) | | | | | | |
| Flow Index, dg/min I21 | 0.59 | 0.56 | 0.50 | 0.62 | 0.57 | 0.55 |
| Melt Index, dg/min I2 | — | — | — | — | — | — |
| Density, g/cm3 | 0.9250 | 0.9246 | 0.9257 | 0.9235 | 0.9232 | 0.9231 |
| MFR | — | — | — | — | — | — |
| Titanium, ppmw | 1.9 | 2.0 | 2.1 | 1.9 | 2.0 | 1.8 |
| Aluminum ppmw | 87.5 | 93.2 | 97.7 | 93.9 | 94.9 | 70.1 |
| Al/Ti | 83.7 | 81.3 | 81.3 | 87.9 | 84.8 | 70.9 |
| Bulk Density, lb/ft3 | 17.7 | 17.5 | 17.4 | 17.0 | 17.1 | 15.5 |
| APS, inches | 0.032 | 0.030 | 0.029 | 0.031 | 0.028 | 0.038 |
| Fines, Wt % LT 120 Mesh | 1.5 | 1.3 | 1.5 | 1.6 | 2.8 | 0.7 |
| GPC Analysis Conventional | | | | | | |
| Mn | 73300.0 | 70700.0 | 71100.0 | 66200.0 | 65500.0 | |
| Mw | 323000.0 | 320000.0 | 315000.0 | 306000.0 | 270000.0 | |
| Mw/Mn | 4.41 | 4.53 | 4.43 | 4.62 | 4.12 | |
| Mz | 911000.0 | 930000.0 | 849000.0 | 842000.0 | 711000.0 | |
| Absolute | | | | | | |
| Mn | 83100.0 | 81300.0 | 84400.0 | 76400.0 | 75800.0 | |
| Mw | 367000.0 | 361000.0 | 360000.0 | 350000.0 | 310000.0 | |
| Mz | 1031000.0 | 1008000.0 | 1000000.0 | 1000000.0 | 854000.0 | |
| Mz/Mw | 2.81 | 2.79 | 2.78 | 2.86 | 2.75 | |
| g' | 1.03 | 1.03 | 1.03 | 1.03 | 1.03 | |

TABLE 2C

INVENTIVE SAMPLES continued

| | SAMPLE NO. | | | | | |
|---|---|---|---|---|---|---|
| | I513 | I514 | I515 | I516 | I517 | I922 |
| REACTION CONDITIONS (Second Reactor) | | | | | | |
| Temp. °C. | 95.0 | 95.0 | 95.0 | 94.9 | 95.0 | 94.9 |
| Pressure, psig | 397.1 | 397.1 | 397.0 | 396.8 | 397.1 | 342.1 |
| C2 Part. Pressure, psi | 95.2 | 94.0 | 92.7 | 101.8 | 85.5 | 108.8 |
| H2/C2 Molar Ratio | 0.4 | 0.7 | 0.5 | 0.3 | 0.9 | 0.5 |
| C6/C2 Molar Ratio | 0.03 | 0.03 | 0.03 | 0.03 | 0.03 | 0.03 |
| Ethylene lb/hr | 31.1 | 26.4 | 27.0 | 37.8 | 14.4 | 36.6 |
| Hexene lb/hr | 0.9 | 0.9 | 0.8 | 0.8 | 0.5 | 1.1 |
| Isopentane lb/hr | 0.3 | 0.0 | 0.0 | 0.0 | 0.7 | 1.0 |
| Nitrogen lb/hr | 20.5 | 15.4 | 17.4 | 21.6 | 14.3 | 14.5 |

TABLE 2C-continued

INVENTIVE SAMPLES continued

| | SAMPLE NO. | | | | | |
|---|---|---|---|---|---|---|
| | I513 | I514 | I515 | I516 | I517 | I922 |
| Ethylene Mol % | 23.1 | 22.8 | 22.5 | 24.7 | 20.7 | 30.5 |
| Hexene Mol % | 0.7 | 0.7 | 0.7 | 0.7 | 0.5 | 1.0 |
| Hydrogen Mol % | 9.0 | 15.6 | 10.9 | 7.4 | 18.0 | 15.3 |
| Isopentane Mol % | 1.0 | 0.8 | 0.8 | 1.0 | 1.0 | 0.3 |
| Nitrogen Mol % | 63.9 | 59.1 | 63.7 | 64.1 | 58.8 | 52.2 |
| E.B. Production Rate, lb/hr | 17.9 | 14.7 | 17.2 | 21.3 | 13.6 | 24.4 |
| Bed Weight, lbs | 107.4 | 107.9 | 107.3 | 107.6 | 107.1 | 100.1 |
| Fluidized Bed Density (lb/ft3) | 13.4 | 13.5 | 13.5 | 12.8 | 13.4 | 13.4 |
| Bed Volume, ft3 | 11.0 | 12.0 | 12.0 | 12.0 | 12.0 | 13.0 |
| Residence Time, hr | 2.50 | 2.79 | 2.61 | 2.38 | 2.84 | 1.69 |
| Space Time Yield, lb/hr/ft3 | 3.9 | 3.2 | 3.4 | 3.8 | 3.1 | 4.6 |
| Superficial gas velocity (ft/sec) | 1.7 | 1.6 | 1.7 | 1.7 | 1.6 | 1.7 |

TABLE 2D

INVENTIVE SAMPLES continued

| | SAMPLE NO. | | | | | |
|---|---|---|---|---|---|---|
| | I513 | I514 | I515 | I516 | I517 | I922 |
| RESIN PROPERTIES (Blend) | | | | | | |
| Flow Index, dg/min I21 (G) | 8.1 | 9.0 | 8.4 | 8.4 | 10.1 | 9.4 |
| Melt Index, dg/min I2 (G) | 0.16 | 0.15 | 0.14 | 0.18 | 0.15 | 0.17 |
| Density, g/cm3 (G) | 0.9394 | 0.9406 | 0.9407 | 0.9390 | 0.9406 | 0.9392 |
| MFR (MI21/MI2) (G) | 51.3 | 59.3 | 57.8 | 46.0 | 68.3 | 56.0 |
| Titanium, ppmw (G) | 1.0 | 1.6 | 1.1 | 1.0 | 1.2 | 0.9 |
| Aluminum ppmw (G) | 60.7 | 66.1 | 65.1 | 56.3 | 72.2 | 45.6 |
| Al/Ti (G) | 112.4 | 75.1 | 105.1 | 98.5 | 106.8 | 89.1 |
| Bulk Density, lb/ft3 (G) | 20.2 | 20.6 | 20.1 | 19.6 | 20.6 | 18.0 |
| APS, inches (G) | 0.030 | 0.027 | 0.027 | 0.030 | 0.028 | 0.035 |
| Fines, Wt % less than 120 Mesh (G) | 2.2 | 2.9 | 2.0 | 2.2 | 3.5 | 1.3 |
| Split % by Energy Balance (G) | 58.3 | 61.9 | 58.2 | 53.0 | 63.9 | 58.8 |
| Split % Calculated (G) [Split % = weight of HMW/(sum weight (HMW + LMW)) × 100] | 48.5 | 53.3 | 49.2 | 43.0 | 54.4 | 48.5 |
| MI2 - g/10 min (P) ASTM D-1238-04 | 0.16 | 0.17 | 0.16 | 0.18 | 0.14 | 0.19 |
| MI5 - g/10 min (P) ASTM D-1238-04 | 0.54 | 0.63 | 0.54 | 0.65 | 0.55 | 0.70 |
| MI10 - g/10 min (P) ASTM D-1238-04 | 1.80 | 2.26 | 1.88 | 2.07 | 1.96 | 2.34 |
| MI21 - g/10 min (P) ASTM D-1238-04 | 7.75 | 11.10 | 8.85 | 8.88 | 10.33 | 11.34 |
| MFR (I21/I2) (P) ASTM D-1238-04 | 49.9 | 67.2 | 56.6 | 48.4 | 72.9 | 59.8 |
| MFR (I21/I5) (P) ASTM D-1238-04 | 14.2 | 17.6 | 16.4 | 13.7 | 18.8 | 16.2 |
| MFR (I10/I2) (P) ASTM D-1238-04 | 11.6 | 13.7 | 12.0 | 11.3 | 13.8 | 12.3 |
| Density (g/cc) (P) ASTM D-792-00 | 0.9445 | 0.9464 | 0.946 | 0.9447 | 0.9457 | 0.945 |
| IR structure (P) | | | | | | |
| Trans/1000 carbons (P) ASTM D6248-2004 | 0.02 | 0 | 0.013 | 0.015 | 0.0012 | 0.024 |
| Vinyls/1000 carbons (P) ASTM D6248-2004 | 0.21 | 0.25 | 0.22 | 0.2 | 0.22 | 0.18 |
| Methyls/1000 carbons (P) ASTM D2238-1999 | 3 | 3.4 | 2.8 | 3.1 | 4.1 | 3.5 |

G = Granular Polymer
P = Pelletized Polymer with Additives and Pigments
[Split % (calculated) = (weight of HMW/(sum weight (HMW + LMW))) × 100]

TABLE 2E

| | INVENTIVE SAMPLES continued | | | | | |
|---|---|---|---|---|---|---|
| | SAMPLE NO. | | | | | |
| Additive analysis | I513 | I514 | I515 | I516 | I517 | I922 |
| Irganox 1010 ppm | 1372 | 1378 | 1309 | 1396 | 1484 | 1409 |
| Irgafos 168 ppm total | 1601 | 1523 | 1544 | 1608 | 1596 | 785 |
| Irgafos 168 ppm Active | 1108 | 1350 | 1196 | 1064 | 1339 | 815 |
| Irgafos 168 ppm Inactive | 492 | 173 | 348 | 544 | 257 | 1600 |
| Percent Active I-168 | 69.3 | 88.6 | 77.5 | 66.2 | 83.9 | 49.1 |
| RMS-100 Viscosity MPa at 0.01 sec−1 shear rate | 83172 | 81192 | 90984 | 68549 | 91009 | 784000 |
| RMS-800 Viscosity MPa at 100 sec−1 shear rate | 2653 | 2267 | 2547 | 2659 | 2296 | 24093 |
| G'/G" @ 0.01 sec−1 Shear Rate | 0.289 | 0.298 | 0.309 | 0.268 | 0.308 | 0.324 |
| G'/G" @ 0.1 sec−1 Shear Rate | 0.418 | 0.432 | 0.443 | 0.387 | 0.448 | 0.438 |
| Viscosity ratio 0.01/100 data | 31.4 | 35.8 | 35.7 | 25.8 | 39.6 | 32.5 |
| Rheotens melt strength (cN) | 10.5 | 9.1 | 10.5 | 9.5 | 10.5 | 9.5 |
| Rheotens Velocity (mm) | 125 | 125 | 145 | 140 | 125 | 145 |
| DSC Melting Point (Deg C.) ASTM D-3418-03 | 128.54 | 128.84 | 128.74 | 128.6 | 128.28 | 129.27 |
| Heat of Fusion (J/g) ASTM D-3418-03 | 187.2 | 192.1 | 189.5 | 187 | 190.2 | 177.3 |
| DSC Crystallization point (Deg C.) ASTM D-3418-03 | 117.08 | 117.03 | 117.34 | 117.09 | 116.91 | 115 |
| Heat of Crystallization (J/g) ASTM D-3418-03 | 184.1 | 191.3 | 188.8 | 187.1 | 192.1 | 172.4 |
| DSC Induction Time (min) ASTM D-3350-05 | 69.16 | 50.81 | 84.24 | ~40 | 85.46 | |
| DSC Induction Temp (Deg C.) ASTM D-3350-05 | 244.8 | 238.9 | 238.8 | 243.4 | 249.5 | |
| C13 NMR Wt % Hexene ASTM D-5017-91 | 2.3 | 2.2 | 2 | 2.2 | 2.5 | 2.5 |
| Branches/1000 C. in Backbone ASTM D-5017-91 | 3.7 | 3.6 | 3.3 | 3.3 | 3.8 | |
| Atref HD fraction (%) | 75.2 | 76.3 | 78.2 | 80.9 | 72.5 | 77 |
| Temperature Minimum (C.) | 86 | 86 | 86.1 | 86.1 | 86.1 | 86 |
| SCB portion | 13.9 | 11.6 | 9.7 | 10.3 | 15.6 | 11 |
| SCB portion minimum temperature (C.) | 52 | 52 | 58 | 62 | 51 | 60 |
| SCB distribution Mv | 93249 | 92200 | 97395 | 98596 | 80000 | 90569 |
| ATREF Purge (%) | 10.9 | 12.1 | 12.1 | 8.8 | 11.9 | 12.0 |

TABLE 2F

INVENTIVE SAMPLES continued

SAMPLE NO.

| | I513 | I514 | I515 | I516 | I517 | I922 |
|---|---|---|---|---|---|---|
| Purge Mv | 59223 | 52362 | 57004 | 39936 | 44738 | 74334 |
| ATREF Overall Mv Average | 89540 | 87380 | 92508 | 93434 | 75803 | 88621 |
| ATREF Dv viscosity - temperature slope (70-90 C. region) | −0.0041 | −0.015 | −0.019 | −0.015 | −0.0093 | −0.013 |
| Triple Detector Results | | | | | | |
| Conventional GPC | | | | | | |
| Mn | 30920 | 24880 | 28400 | 36700 | 24310 | 27380 |
| Mw | 201830 | 198560 | 198610 | 194360 | 199440 | 128890 |
| Mz | 801400 | 839800 | 800000 | 770200 | 804700 | 426900 |
| Mw/Mn | 6.5 | 8.0 | 7.0 | 5.3 | 8.2 | 4.7 |
| Absolute GPC | | | | | | |
| Mn | 29684 | 24615 | 28616 | 35350 | 23440 | 27980 |
| Mw | 219050 | 210860 | 214870 | 208740 | 211090 | 158820 |
| Mw (abs)/Mn abs | 7.4 | 8.6 | 7.5 | 5.9 | 9.0 | 5.7 |
| Mz (BB) | 815800 | 830100 | 813700 | 775900 | 854300 | 570600 |
| Mz (abs) | 898400 | 902100 | 886800 | 906300 | 953400 | 969800 |
| Mz + 1 (BB) | 1467700 | 1459100 | 1453200 | 1407700 | 1486600 | 1164800 |
| Mz (abs)/Mw | 4.1 | 4.3 | 4.1 | 4.3 | 4.5 | 6.1 |

TABLE 2G

INVENTIVE SAMPLES continued

SAMPLE NO.

| | I513 | I514 | I515 | I516 | I517 | I922 |
|---|---|---|---|---|---|---|
| Plaque Properties | | | | | | |
| PENT (2.4 MPa) Hrs ASTM D-1473-01 | >9,300 | >10,000 | >10,000 | >10,000 | >10,000 | >15,000 (on test) |
| RCP Gc @ 23 C. from PENT plaque milled to 2 mm thick samples (KJ/m2) Modified (2 mm) ASTM F-2231-02 | Incomplete break no reading available | 178 and Incomplete break | Incomplete break no reading available | Incomplete break no reading available | 221 and Incomplete break | 196 |
| RCP Gc @ 23 C. from PENT plaque milled to 3 mm thick samples (KJ/m2) ASTM F-2231-02 | 189 | 109.8 | 156 | 169 | 116 | |
| Flexural Modulus (psi) @ 0.5 inches/min ASTM D-790-03 | 136500 | 151400 | 144600 | 137000 | 138500 | 139200 |
| SD | 10400 | 4536 | 6700 | 9314 | 8660 | 8820 |
| Secant Modulus (psi) 2% @ 0.5 inches/min ASTM D-790-03 | 91300 | 98800 | 96800 | 92000 | 95200 | 98100 |
| SD | 2300 | 2178 | 2100 | 1624 | 1920 | 2162 |
| Secant Modulus (psi) 1% @ 0.5 inches/min ASTM D-790-03 | 109600 | 119400 | 116400 | 110200 | 114200 | 117400 |
| SD | 3440 | 2897 | 3000 | 2693 | 2500 | 3100 |
| Tensile Strength (PSI) ASTM D-638-03 | 5327 | 5070 | 5280 | 5565 | 5168 | 4920 |
| SD | 230 | 475 | 317 | 228 | 204 | 542 |
| % Elongation ASTM D-638-03 | 730 | 730 | 730 | 731 | 693 | 698 |
| SD | 13 | 25 | 20 | 12.6 | 15 | 35 |
| Yield Strength (psi) ASTM D-638-03 | 2460 | 2590 | 2570 | 2593 | 2700 | 2537 |

TABLE 2G-continued

INVENTIVE SAMPLES continued

| | SAMPLE NO. | | | | | |
|---|---|---|---|---|---|---|
| | I513 | I514 | I515 | I516 | I517 | I922 |
| SD | 53 | ~40 | 58 | 197 | 268 | 38 |
| Yield Strain (%) ASTM D-638-03 | 4.1 | 4 | 3.8 | 4.97 | 5.8 | 4.85 |
| SD | 0.17 | 0.1 | 0.1 | 1.84 | 2.8 | 0.28 |
| Burst Properties | | | | | | |
| 10**5 intercept at 23 C. (psi) ASTM D-1598-02 ASTM D-2837-04 | >1347 | >1333 | >1358 | >1334 | >1366 | 1338 |
| 10**5 intercept at 60 C., (psi) ASTM D-1598-02 ASTM D-2837-04 | >961* | >966* | >963* | >978* | >969* | 983 |
| Hours on test at 60 C. 90 C. validation test (690 psi Hoop stress for >3800 hours) PPI TR #3 Section F.4.2.1 | >12000* in progress | >12000* In progress | >12000* In progress | >12000* passed | >12000* in progress | >14084 Pass |

*Still on test.

TABLE 3A

COMPARATIVE SAMPLES

| | SAMPLE NO. | | | | |
|---|---|---|---|---|---|
| | C024 | C025 | C453 | C454 | C510 |
| Type | precursor | precursor | precursor | precursor | 0017 reduction |
| First Reactor REACTION CONDITIONS | | | | | |
| Temp. ° C. | 80 | 80 | 80 | 80 | 80 |
| C2 Part. Pressure, psi | 25 | 24 | 27 | 27 | 34.0 |
| H2/C2 Molar Ratio | 0.027 | 0.015 | 0.023 | 0.022 | 0.030 |
| C6/C2 Molar Ratio | 0.08 | 0.125 | 0.105 | 0.125 | 0.087 |
| Ethylene lb/hr | 21.3 | 22.4 | 23 | 24.3 | 20.7 |
| Hexene lb/hr | 1.2 | 2.2 | 2 | 2.4 | 1.3 |
| Hydrogen mlb/hr | | | | | 5.9 |
| Isopentane lb/hr | 0 | 0 | 2 | 2 | 0.0 |
| Nitrogen lb/hr | | | | | 5.9 |
| Ethylene Mol % | | | | | 10.8 |
| Hexene Mol % | | | | | 0.9 |
| Hydrogen Mol % | | | | | 0.3 |
| Isopentane Mol % | | | | | 7.5 |
| Nitrogen Mol % | | | | | 80.8 |
| Cat cc/hr | | | | | 2.2 |
| E.B. Production Rate, lb/hr | 26 | 28 | 28 | 30 | 25.0 |
| Bed Weight, lbs | | | | | 63.3 |
| FBD (lb/ft3) | | | | | 21.3 |
| Bed Volume, ft3 | | | | | 8.64 |
| Residence Time, hr | 3.88 | 3.47 | 3.66 | 2.88 | 2.5 |
| STY, lb/hr/ft3 | 2.6 | 2.9 | 2.2 | 3.3 | 2.9 |
| SGV (ft/sec) | | | | | 1.6 |

TABLE 3B

COMPARATIVE SAMPLES

| | SAMPLE NO. | | | | |
|---|---|---|---|---|---|
| | C024 | C025 | C453 | C454 | C510 |
| RESIN PROPERTIES (First reactor) | | | | | |
| Flow Index, dg/min I21 | 0.44 | 0.45 | 0.43 | 0.44 | 0.63 |
| Melt Index, dg/min I2 | | | | | — |
| Density, g/cm3 | 0.9238 | 0.9166 | 0.9187 | 0.9162 | 0.9230 |
| MFR | | | | | — |
| Titanium, ppmw | 2.73 | 2.28 | 2.21 | 2.43 | 1.7 |
| Aluminum ppmw | 76.5 | 68.3 | 99.7 | 90.9 | 82.7 |
| Al/Ti | | | | | 85.5 |
| Bulk Density, lb/ft3 | 18.8 | 17.9 | 18.1 | 17.5 | 15.0 |
| APS, inches | 0.0272 | 0.0316 | 0.031 | 0.0289 | 0.033 |
| Fines, Wt % LT 120 Mesh | 2.7 | 1.9 | 2.1 | 2.3 | 0.5 |
| GPC Analysis Conventional | | | | | |
| Mn | | | | | 66400.0 |
| Mw | | | | | 262300.0 |
| Mw/Mn | | | | | 3.95 |
| Mz | | | | | 714000.0 |
| Absolute | | | | | |
| Mn | | | | | 88900.0 |
| Mw | | | | | 316000.0 |
| Mz | | | | | 936000.0 |
| Mz/Mw | | | | | 2.96 |
| g' | | | | | 1.03 |
| Weight Fraction <1,000,000 | | | | | 0.957 |

TABLE 3C

COMPARATIVE SAMPLES

| | SAMPLE NO. | | | | |
|---|---|---|---|---|---|
| | C024 | C025 | C453 | C454 | C510 |
| REACTION CONDITIONS (Second reactor) | | | | | |
| Temp. ° C. | 100 | 100 | 100 | 100 | 95.0 |
| Pressure, psig | 397 | 398 | 373 | 393 | 397.1 |
| C2 Part. Pressure, psi | 79 | 86.4 | 82.5 | 92.3 | 104.6 |
| H2/C2 Molar Ratio | 1.75 | 1.75 | 1.75 | 1.75 | 0.5 |
| C6/C2 Molar Ratio | 0.053 | 0.025 | 0.015 | 0.025 | 0.02 |
| Ethylene lb/hr | 21.8 | 24.6 | 18.8 | 27.9 | 25.9 |
| Hexene lb/hr | 1.3 | 0.6 | 0.4 | 0.9 | 0.7 |
| Isopentane lb/hr | | | | | 0.5 |
| Nitrogen lb/hr | | | | | 14.6 |
| Ethylene Mol % | | | | | 25.4 |
| Hexene Mol % | | | | | 0.6 |
| Hydrogen Mol % | | | | | 12.7 |
| Isopentane Mol % | | | | | 1.0 |
| Nitrogen Mol % | | | | | 59.5 |
| E.B. Production Rate, lb/hr | 19.5 | 21 | 16.6 | 22.5 | 17.0 |
| Bed Weight, lbs | 132.4 | 133.7 | 116.9 | 117.5 | 108.3 |
| Fluidized Bed Density (lb/ft3) | | | | | 12.4 |
| Bed Volume, ft3 | | | | | 10.0 |
| Residence Time, hr | 5.99 | 5.36 | 4.88 | 3.86 | 2.58 |
| Space Time Yield, lb/hr/ft3 | 2.2 | 2.5 | 1.9 | 2.9 | 4.2 |
| Superficial gas velocity (ft/sec) | | | | | 1.7 |

TABLE 3D

COMPARATIVE SAMPLES

| RESIN PROPERTIES | SAMPLE NO. | | | | |
|---|---|---|---|---|---|
| (Blend) | C024 | C025 | C453 | C454 | C510 |
| Flow Index, dg/min I21 (G) | 13.2 | 14.3 | 9.5 | 20.9 | 9.6 |
| Melt Index, dg/min I2 (G) | 0.14 | 0.13 | 0.09 | 0.16 | 0.16 |
| Density, g/cm3 (G) | 0.9414 | 0.9395 | 0.9397 | 0.9403 | 0.9396 |
| MFR (MI21/MI2) (G) | 97.7 | 111.1 | 103.9 | 132.8 | 58.9 |
| Titanium, ppmw (G) | 1.49 | 1.3 | 1.36 | 1.29 | 1.0 |
| Aluminum ppmw (G) | 55.3 | 47 | 71.3 | 52.1 | 62.4 |
| Al/Ti (G) | | | | | 114.4 |
| Bulk Density, lb/ft3 (G) | 23 | 22.4 | 21.8 | 21.6 | 18.1 |
| APS, inches | 0.0271 | 0.0303 | 0.031 | 0.029 | 0.030 |
| Fines, Wt % less than 120 Mesh (G) | 3.3 | 3 | 2.7 | 3 | 1.4 |
| Split % by Energy Balance | 57.2 | 57.2 | 62.7 | 57.2 | 59.6 |
| Split % calculated (G) | 54.0 | 53.3 | 57.4 | 49.0 | 49.5 |

[Split % (calculated) = weight of HMW/(sum weight (HMW + LMW)) × 100]

TABLE 3E

COMPARATIVE SAMPLES

| | \multicolumn{5}{c|}{SAMPLE NO.} |
|---|---|---|---|---|---|
| | C024 | C025 | C453 | C454 | C510 |
| MI2 - g/10 min (P) ASTM D-1238-04 | 0.14 | 0.12 | 0.09 | 0.17 | 0.19 |
| MI5 - g/10 min (P) ASTM D-1238-04 | 0.48 | 0.61 | 0.39 | 0.66 | 0.69 |
| MI10 - g/10 min (P) ASTM D-1238-04 | 1.95 | 3.47 | 1.47 | 3.26 | 2.31 |
| MI21 - g/10 min (P) ASTM D-1238-04 | 27.4 | 15.1 | 10.16 | 19.9 | 10.77 |
| MFR (I21/I2) (P) | 195.7 | 125.8 | 112.9 | 117.1 | 56.5 |
| MFR (I21/I5) (P) | 57.1 | 24.8 | 26.1 | 30.2 | 15.6 |
| MFR (I10/I2) (P) | 13.9 | 28.9 | 16.3 | 19.2 | 12.1 |
| Density (g/cc) (P)ASTM D-792-00 | 0.942 | 0.9406 | 0.9406 | 0.9406 | 0.9448 |
| IR structure (P) | | | | | |
| Trans/1000 carbons (P) ASTM D-6248-2004 | 0.005 | 0.008 | 0.005 | 0.012 | 0.016 |
| Vinyls/1000 carbons (P) ASTM D-6248-2004 | 0.099 | 0.167 | 0.128 | 0.192 | 0.22 |
| Methyls/1000 carbons (P) ASTM D-2238-1999 | 5.1 | 6.23 | 5.21 | 5.22 | 3.7 |

TABLE 3F

COMPARATIVE SAMPLES

| | \multicolumn{5}{c|}{SAMPLE NO.} |
|---|---|---|---|---|---|
| Additive analysis | C024 | C025 | C453 | C454 | C510 |
| Irganox 1010 ppm | | | 1708 | 1866 | 1422 |
| Irgafos 168 ppm total | | | 1580 | 1838 | 1549 |
| Irgafos 168 ppm Active | | | 1459 | 1664 | 1178 |
| Irgafos 168 ppm Inactive | | | | | 371 |
| Percent Active I-168 | | | 0.92 | 0.91 | 76.0 |
| RMS-100 Viscosity MPa at 0.01 sec−1 shear rate | | | | | 72407 |
| RMS-800 Viscosity MPa at 100 sec−1 shear rate | | | | | 2360 |
| G'/G" @ 0.01 sec−1 Shear Rate | | | | | 0.279 |
| G'/G" @ 0.1 sec−1 Shear Rate | | | | | 0.41 |
| Viscosity ratio 0.01/100 data | | | | | 30.7 |
| Rheotens melt strength (cN) | | | | | 9.3 |
| Rheotens Velocity (mm) | | | | | 135 |
| DSC Melting Point (Deg C.) ASTM D-3418-03 | | | | | 128.83 |
| Heat of Fusion (J/g) ASTM D-3418-03 | | | | | 189.4 |
| DSC Crystallization point (Deg C.) ASTM D-3418-03 | | | | | 117.05 |
| Heat of Crystallization (J/g) ASTM D-3418-03 | | | | | 188.2 |
| DSC Induction Time (min) ASTM D-3350-05 | | | | | >90 |
| DSC Induction Temp (Deg C.) ASTM D-3350-05 | | | | | 247.5 |

TABLE 3G

COMPARATIVE SAMPLE

| | \multicolumn{5}{c|}{SAMPLE NO.} |
|---|---|---|---|---|---|
| | C024 | C025 | C453 | C454 | C510 |
| C13 NMR Wt % Hexene ASTM D-5017-91 | | | | | 2.4 |
| Branches/1000 C. in Backbone ASTM D-5017-91 | | | | | 3.9 |
| Atref HD fraction (%) | | | 59.2 | 59 | 76.2 |
| Temperature Minimum (C.) | | | 86 | 86.2 | 86.1 |
| SCB portion | | | 23.8 | 22 | 13.3 |
| SCB portion minimum temperature (C.) | | | 52 | 54 | 50 |
| SCB distribution Mv | | | 92376 | 90910 | 98920 |
| Aterf Purge (%) | | | 23.3 | 19 | 10.5 |
| Purge Mv | | | 140531 | 109153 | 76650 |
| Atref Overall Mv Average | | | 103596 | 94376 | 96582 |
| Atref Dv viscosity - temperature slope (70-90 C. region) | | | 0.0041 | 0.0011 | −0.0023 |
| Triple Detector Results | | | | | |
| Conventional GPC | | | | | |
| Mn | | | | | 26580 |
| Mw | | | | | 195000 |
| Mz | | | | | 829200 |
| Mw/Mn | | | | | 7.3 |
| Absolute GPC | | | | | |
| Mn | | | | | 27433 |
| Mw | | | | | 212800 |
| Mw (abs)/Mn Abs | | | | | 7.8 |
| Mz(BB) | | | | | 833100 |
| Mz (abs) | | | | | 921700 |
| Mz + 1 (BB) | | | | | 1490000 |
| Mz (abs)/Mw | | | | | 4.3 |

TABLE 3H

| | COMPARATIVE SAMPLE | | | | |
|---|---|---|---|---|---|
| | SAMPLE NO. | | | | |
| | C024 | C025 | C453 | C454 | C510 |
| Plaque Properties | | | | | |
| PENT (2.4 MPa) Hrs ASTM D-1473-01 | >4463 | >5498 @2.6 | >4844 @2.6 | >8909 @2.6 | >8549 |
| RCP Gc @ 23 C. from PENT plaque milled to 2 mm thick samples (KJ/m2) Modified (2 mm) ASTM F-2231-02 | 165 | 222 | 225 | 214 | Incomplete break no reading available |
| RCP Gc @ 23 C. from PENT plaque milled to 3 mm thick samples (KJ/m2) ASTM F-2231-02 | | | | | 214 |
| Flexural Modulus (psi) @ 0.5 inches/min ASTM D-790-03 | 148000 | 140000 | 151000 | 150000 | 136600 |
| SD | | | | | 7438 |
| Secant Modulus (psi) 2% @ 0.5 inches/min ASTM D-790-03 | 100700 | 96700 | 100000 | 97000 | 94900 |
| SD | | | | | 2515 |
| Secant Modulus (psi) 1% @ 0.5 inches/min ASTM D-790-03 | 120000 | 115000 | 120000 | 117000 | 112700 |
| SD | | | | | 3762 |
| Tensile Strength (PSI) ASTM D-638-03 | 4740 | 4680 | 4214 | 4335 | 5071 |
| SD | | | | | 441 |
| % Elongation ASTM D-638-03 | 720 | 675 | 730 | 710 | 710 |
| SD | | | | | 17.4 |
| Yield Strength (psi) ASTM D-638-03 | 3014 | 2849 | 2744 | 2718 | 2521 |
| SD | | | | | 141 |
| Yield Strain (%) ASTM D-638-03 | 5.4 | 6.4 | 7.4 | 7.1 | 5.97 |
| SD | | | | | 4.4 |

TABLE 3I

| | COMPARATIVE SAMPLE | | | | |
|---|---|---|---|---|---|
| | SAMPLE NO. | | | | |
| | C024 | C025 | C453 | C454 | C510 |
| Burst Properties 10**5 intercept at 23 C. (psi) ASTM D-1598-02 ASTM D-2837-04 | NA | NA | NA | NA | Failed Screening test @ 60 C. |
| 10**5 intercept at 60 C., (psi) ASTM D-1598-02 ASTM D-2837-04 | Failed | Failed | Failed | Failed | Failed Screening test |
| 90 C. validation test (690 psi Hoop stress for >3800 hours) | NA | NA | NA | NA | NA |

NA = Not Applicable

TABLE 4A

COMPARATIVE SAMPLES

| | SAMPLE NO. | | | | | |
|---|---|---|---|---|---|---|
| | C512 | C586 | C587 | C588 | C589 | C590 |
| Type | 0017 reduction | 0017 reduction | 0017 reduction | 0017 reduction | 0017 reduction | 0017 reduction |
| First Reactor REACTION CONDITIONS | | | | | | |
| Temp. °C. | 80.0 | 80.0 | 80.0 | 80.0 | 80.0 | 80.0 |
| C2 Part. Pressure, psi | 30.7 | 25.8 | 24.4 | 23.9 | 26.9 | 36.1 |
| H2/C2 Molar Ratio | 0.026 | 0.050 | 0.053 | 0.037 | 0.062 | 0.043 |
| C6/C2 Molar Ratio | 0.092 | 0.047 | 0.076 | 0.042 | 0.040 | 0.025 |
| Ethylene lb/hr | 21.9 | 21.3 | 22.8 | 21.7 | 22.3 | 21.7 |
| Hexene lb/hr | 1.3 | 0.7 | 1.2 | 0.6 | 0.6 | 0.5 |
| Hydrogen mlb/hr | 5.1 | | | | | |
| Isopentane lb/hr | — | 3.0 | 3.0 | 3.0 | 3.0 | 3.0 |
| Nitrogen lb/hr | 6.0 | | | | | |
| Ethylene Mol % | 9.8 | | | | | |
| Hexene Mol % | 0.9 | | | | | |
| Hydrogen Mol % | 0.3 | | | | | |
| Isopentane Mol % | 7.3 | | | | | |
| Nitrogen Mol % | 82.1 | | | | | |
| Cat cc/hr | 2.2 | | | | | |
| E.B. Production Rate, lb/hr | 25.0 | 26.0 | 26.9 | 26.1 | 25.9 | 26.0 |
| Bed Weight, lbs | 70.2 | | | | | |
| FBD (lb/ft3) | 22.5 | | | | | |
| Bed Volume, ft3 | 9.64 | | | | | |
| Residence Time, hr | 2.8 | 2.9 | 2.8 | 2.9 | 2.9 | 2.8 |
| STY, lb/hr/ft3 | 2.6 | 1.8 | 2.7 | 2.4 | 2.4 | 2.4 |
| SGV (ft/sec) | 2.6 | | | | | |

TABLE 4B

COMPARATIVE SAMPLES

| | SAMPLE NO. | | | | | |
|---|---|---|---|---|---|---|
| | C512 | C586 | C587 | C588 | C589 | C590 |
| RESIN PROPERTIES (First reactor) | | | | | | |
| Flow Index, dg/min I21 | 0.54 | 0.5 | 0.61 | 0.3 | 0.60 | 0.27 |
| Melt Index, dg/min I2 | — | — | — | — | — | — |
| Density, g/cm3 | 0.9212 | 0.9291 | 0.9248 | 0.9284 | 0.9306 | 0.9300 |
| MFR | — | — | — | — | — | — |
| Titanium, ppmw | 1.9 | 3.8 | 3.3 | 4.5 | 3.8 | 4.2 |
| Aluminum ppmw | 89.0 | 110.0 | 80.7 | 113.4 | 113.4 | 97.8 |
| Al/Ti | 85.2 | 51.6 | 44.5 | 45.2 | 53.9 | 41.3 |
| Bulk Density, lb/ft3 | 17.0 | 20.4 | 20.8 | 21.4 | 22.2 | 24.8 |
| APS, inches | 0.033 | 0.028 | 0.027 | 0.028 | 0.027 | 0.025 |
| Fines, Wt % LT 120 Mesh | 1.1 | 1.1 | 1.4 | 1.1 | 1.3 | 0.9 |
| GPC Analysis Conventional | | | | | | |
| Mn | 65900.0 | | | | | |
| Mw | 259000.0 | | | | | |
| Mw/Mn | 3.93 | | | | | |
| Mz | 659000.0 | | | | | |
| Absolute | | | | | | |
| Mn | 77600.0 | | | | | |
| Mw | 293000.0 | | | | | |
| Mz | 771000.0 | | | | | |

TABLE 4B-continued

| | COMPARATIVE SAMPLES | | | | | |
|---|---|---|---|---|---|---|
| | SAMPLE NO. | | | | | |
| | C512 | C586 | C587 | C588 | C589 | C590 |
| Mz/Mw | 2.63 | | | | | |
| g' | 1.03 | | | | | |
| Weight Fraction <1,000,000 | 0.962 | | | | | |

TABLE 4C

| | COMPARATIVE SAMPLES | | | | | |
|---|---|---|---|---|---|---|
| | SAMPLE NO. | | | | | |
| | C512 | C586 | C587 | C588 | C589 | C590 |
| REACTION CONDITIONS (Second reactor) | | | | | | |
| Temp. °C. | 95.0 | 94.9 | 94.9 | 95.3 | 99.9 | 94.9 |
| Pressure, psig | 397.3 | 392.6 | 392.6 | 392.5 | 392.8 | 393.0 |
| C2 Part. Pressure, psi | 102.9 | 63.0 | 68.8 | 65.5 | 61.6 | 76.9 |
| H2/C2 Molar Ratio | 0.6 | 1.3 | 1.3 | 1.3 | 1.8 | 1.3 |
| C6/C2 Molar Ratio | 0.02 | 0.07 | 0.03 | 0.08 | 0.08 | 0.08 |
| Ethylene lb/hr | 30.3 | 16.4 | 20.8 | 19.9 | 18.2 | 21.3 |
| Hexene lb/hr | 0.5 | 1.2 | 0.8 | 1.5 | 1.5 | 1.6 |
| Isopentane lb/hr | — | | | | | |
| Nitrogen lb/hr | 22.1 | | | | | |
| Ethylene Mol % | 24.9 | | | | | |
| Hexene Mol % | 0.6 | | | | | |
| Hydrogen Mol % | 15.1 | | | | | |
| Isopentane Mol % | 1.0 | | | | | |
| Nitrogen Mol % | 57.4 | | | | | |
| E.B. Production Rate, lb/hr | 16.6 | 15.6 | 16.9 | 18.0 | 15.7 | 19.0 |
| Bed Weight, lbs | 107.3 | 91.1 | 89.1 | 91.0 | 90.3 | 89.4 |
| Fluidized Bed Density (lb/ft3) | 13.5 | | | | | |
| Bed Volume, ft3 | 11.0 | | | | | |
| Residence Time, hr | 2.58 | 2.2 | 2.0 | 2.1 | 2.2 | 2.0 |
| Space Time Yield, lb/hr/ft3 | 3.8 | 2.7 | 3.9 | 3.7 | 3.5 | 3.8 |
| Superficial gas velocity (ft/sec) | 1.6 | | | | | |

TABLE 4D

| | COMPARATIVE SAMPLES | | | | | |
|---|---|---|---|---|---|---|
| | SAMPLE NO. | | | | | |
| | C512 | C586 | C587 | C588 | C589 | C590 |
| RESIN PROPERTIES (Blend) | | | | | | |
| Flow Index, dg/min I21 (G) | 9.9 | 8.9 | 10.0 | 8.1 | 9.8 | 8.0 |
| Melt Index, dg/min I2 (G) | 0.15 | 0.12 | 0.14 | 0.09 | 0.13 | 0.10 |
| Density, g/cm3 (G) | 0.9395 | 0.9407 | 0.9407 | 0.9401 | 0.9408 | 0.9408 |
| MFR (MI21/MI2) (G) | 65.0 | 71.5 | 70.7 | 90.6 | 75.5 | 83.0 |
| Titanium, ppmw (G) | 1.0 | 2.2 | 2.0 | 2.4 | 2.3 | 2.3 |
| Aluminum ppmw (G) | 60.0 | 71.2 | 56.7 | 66.6 | 69.2 | 49.0 |
| Al/Ti (G) | 106.0 | 58.1 | 49.9 | 49.8 | 53.6 | 37.4 |
| Bulk Density, lb/ft3 (G) | 20.0 | 23.6 | 23.7 | 24.2 | 24.3 | 27.2 |
| APS, inches (G) | 0.031 | 0.027 | 0.026 | 0.0 | 0.026 | 0.027 |

TABLE 4D-continued

COMPARATIVE SAMPLES

| | SAMPLE NO. | | | | | |
|---|---|---|---|---|---|---|
| | C512 | C586 | C587 | C588 | C589 | C590 |
| Fines, Wt % less than 120 Mesh (G) | 2.3 | 3.0 | 2.8 | 2.6 | 1.9 | 1.0 |
| Split % by Energy Balance (G) | 60.1 | 62.5 | 61.4 | 59.2 | 62.2 | 57.7 |
| Split % calculated (G) | 49.8 | 57.3 | 57.7 | 53.7 | 60.6 | 52.9 |

[Split % (calculated) = (weight of HMW/(sum weight (HMW + LMW))) × 100]

TABLE 4E

COMPARATIVE EXAMPLES

| | SAMPLE NO. | | | | | |
|---|---|---|---|---|---|---|
| | C512 | C586 | C587 | C588 | C589 | C590 |
| MI2 - g/10 min (P) ASTM D-1238-04 | 0.15 | 0.12 | 0.14 | 0.08 | 0.13 | 0.1 |
| MI5 - g/10 min (P) ASTM D-1238-04 | 0.59 | 0.47 | 0.53 | 0.34 | 0.47 | 0.38 |
| ASTM D-1238-04 | 1.97 | 1.6 | 1.8 | 1.3 | 1.7 | 1.4 |
| MI21 - g/10 min (P) ASTM D-1238-04 | 10.21 | 8.6 | 9.4 | 7.6 | 9.5 | 8.1 |
| MFR (I21/I2) (P) | 68.4 | 71.7 | 67.1 | 95.0 | 73.1 | 81.0 |
| MFR (I21/I5) (P) | 17.2 | 18.3 | 17.7 | 22.4 | 20.2 | 21.3 |
| MFR (I10/I2) (P) | 13.2 | 13.3 | 12.9 | 16.3 | 13.1 | 14.0 |
| Density (g/cc) (P) ASTM D-790-00 | 0.9451 | 0.9413 | 0.9408 | 0.9407 | 0.9412 | 0.9419 |
| IR structure (P) | | | | | | |
| Trans/1000 carbons (P) ASTM D-6248-2004 | 0.009 | 0.012 | 0.008 | 0.01 | 0 | 0.01 |
| Vinyls/1000 carbons (P) ASTM D-6248-2004 | 0.23 | 0.148 | 0.135 | 0.167 | 0.14 | 0.148 |
| Methyls/1000 carbons (P) ASTM D-2238-1999 | 4.1 | 3.2 | 3.17 | 3.99 | 4.2 | 3.72 |
| Additive analysis | | | | | | |
| Irganox 1010 ppm | 1458 | 1392 | 1278 | 1645 | 1246 | 1359 |
| Irgafos 168 ppm total | 1573 | 1365 | 1310 | 1662 | 1216 | 1393 |
| Irgafos 168 ppm Active | 1276 | 1153 | 1129 | 1472 | 1019 | 1215 |
| Irgafos 168 ppm Inactive | 297 | 212 | 181 | 190 | 197 | 178 |
| Percent Active I-168 | 81.1 | 0.84 | 0.86 | 0.89 | 0.84 | 0.87 |

TABLE 4F

COMPARATIVE EXAMPLES

| | SAMPLE NO. | | | | | |
|---|---|---|---|---|---|---|
| | C512 | C586 | C587 | C588 | C589 | C590 |
| RMS-100 Viscosity MPa at 0.01 sec−1 shear rate | 90795 | 1.10E+05 | 9.80E+04 | 1.60E+05 | 1.10E+05 | 1.30E+05 |
| RMS-800 Viscosity MPa at 100 sec−1 shear rate | 2370 | 2460 | 2460 | 2550 | 2410 | 2560 |

TABLE 4F-continued

| | COMPARATIVE EXAMPLES | | | | | |
|---|---|---|---|---|---|---|
| | SAMPLE NO. | | | | | |
| | C512 | C586 | C587 | C588 | C589 | C590 |
| G'/G" @ 0.01 sec−1 Shear Rate | 0.305 | 0.33 | 0.29 | 0.37 | 0.32 | 0.33 |
| G'/G" @ 0.1 sec−1 Shear Rate | 0.451 | 0.47 | 0.43 | 0.54 | 0.46 | 0.48 |
| Viscosity ratio 0.01/100 data | 38.3 | 44.7 | 39.8 | 62.7 | 45.6 | 50.8 |
| Rheotens melt strength (cN) | 10.5 | | | | | |
| Rheotens Velocity (mm) | 145 | | | | | |
| DSC Melting Point (Deg C.) ASTM D-3418-03 | 128.67 | 128.31 | 128.05 | 128.88 | 128.89 | 129.01 |
| Heat of Fusion (J/g) ASTM D-3418-03 | 189.3 | 181.5 | 179 | 179.4 | 181 | 179.6 |
| DSC Crystallization point (Deg C.) ASTM D-3418-03 | 117.04 | 116.09 | 116.03 and 76.38 | 115.65 | 115.56 | 116.11 |
| Heat of Crystallization (J/g) ASTM D-3418-03 | 188.4 | 176.1 | 178.9 | 178.7 | 176.7 | 177.6 |
| DSC Induction Time (min) ASTM D-3350-05 | 60.07 | 32.29 | 40.73 | 54.74 | 34.53 | 55.94 |
| DSC Induction Temp (Deg C.) ASTM D-3350-05 | 237.9 | 235.25 | 242.28 | 244.83 | 237.65 | 244.61 |

TABLE 4G

| | COMPARATIVE EXAMPLES | | | | | |
|---|---|---|---|---|---|---|
| | SAMPLE NO. | | | | | |
| | C512 | C586 | C587 | C588 | C589 | C590 |
| C13 NMR Wt % Hexene ASTM D-5017-91 | 2.5 | 2.8 | 3 | 2.9 | 3.1 | 3 |
| Branches/1000 C. in Backbone ASTM D-5017-91 | 4.2 | | | | | |
| Atref HD fraction (%) | 73.8 | 68.8 | 72.8 | 68.2 | 66.1 | 71.5 |
| Temperature Minimum (C.) | 86.1 | 86 | 86.1 | 86 | 86 | 86.1 |
| SCB portion | 14.3 | 16.2 | 13.8 | 18 | 19.6 | 16.9 |
| SCB portion minimum temperature (C.) | 50 | 50 | 55 | 37 | 45 | 45 |
| SCB distribution Mv | 78786 | | | | | |
| Aterf Purge (%) | 11.9 | 15 | 13.4 | 13.8 | 14.3 | 11.6 |
| Purge Mv | 52026 | 110086 | 106484 | 116470 | 102464 | 92141 |
| Atref Overall Mv Average | 75602 | 117608 | 106552 | 125155 | 116623 | 115821 |
| Atref Dv viscosity - temperature slope (70-90 C. region) | 0.0024 | 0.021 | 0.0028 | 0.019 | 0.069 | 0.069 |
| Triple Detector Results | | | | | | |
| Conventional GPC | | | | | | |
| Mn | 27620 | 15950 | 20120 | 16670 | 11740 | 13120 |
| Mw | 199810 | 196180 | 201500 | 209430 | 198450 | 207000 |
| Mz | 816600 | 835700 | 876700 | 878600 | 869700 | 886800 |
| Mw/Mn | 7.2 | 12.3 | 10.0 | 12.6 | 16.9 | 15.8 |

TABLE 4G-continued

| COMPARATIVE EXAMPLES | | | | | | |
|---|---|---|---|---|---|---|
| | SAMPLE NO. | | | | | |
| | C512 | C586 | C587 | C588 | C589 | C590 |
| Absolute GPC | | | | | | |
| Mn | 26385 | 18821 | 23840 | 20437 | 14325 | 15633 |
| Mw | 210240 | 226160 | 227130 | 243880 | 244730 | 219720 |
| Mw (abs)/Mn abs | 8.0 | 12.0 | 9.5 | 11.9 | 17.1 | 14.1 |
| Mz(BB) | 861700 | 914200 | 912500 | 991700 | 926800 | 945000 |
| Mz (abs) | 924800 | 1075400 | 1070100 | 1134800 | 1172500 | 987500 |
| Mz + 1 (BB) | 1539000 | 1764000 | 1808700 | 1850200 | 1725700 | 1799900 |
| Mz (abs)/Mw | 4.4 | 4.76 | 4.71 | 4.65 | 4.79 | 4.49 |
| Mw (abs)/Mw (GPC) | | 1.15 | 1.13 | 1.16 | 1.23 | 1.06 |

TABLE 4H

| COMPARATIVE SAMPLES | | | | | | |
|---|---|---|---|---|---|---|
| | SAMPLE NO. | | | | | |
| | C512 | C586 | C587 | C588 | C589 | C590 |
| Plaque Properties | | | | | | |
| PENT (2.4 MPa) Hrs ASTM D-1473-01 | >8279 | >19442 (discont'd) | >19685 (discont'd) | >19594 (discont'd) | 7923 | 2095 |
| RCP Gc @ 23 C. from PENT plaque milled to 2 mm thick samples (KJ/m2) Modified (2 mm) ASTM F-2231-02 | Incomplete break no reading available | 134 | 155 | 118 | 57 | 121 |
| RCP Gc @ 23 C. from PENT plaque milled to 3 mm thick samples (KJ/m2) ASTM F-2231-02 | 176 | | | | | |
| Flexural Modulus (psi) @ 0.5 inches/min ASTM D-790-03 | 135800 | 137000 | 135000 | 131000 | 138000 | 136000 |
| SD | 5944 | | | | | |
| Secant Modulus (psi) 2% @ 0.5 inches/min ASTM D-790-03 | 96200 | 97400 | 100000 | 92500 | 97600 | 97500 |
| SD | 2550 | | | | | |
| Secant Modulus (psi) 1% @ 0.5 inches/min ASTM D-790-03 | 114200 | 117000 | 119000 | 111000 | 117000 | 118000 |
| SD | 3670 | | | | | |
| Tensile Strength (PSI) ASTM D638-03 | 5088 | 5320 | 5370 | 5250 | 5190 | 5060 |
| SD | 412 | | | | | |
| % Elongation ASTM D638-03 | 710 | 880 | 780 | 870 | 961 | 960 |
| SD | 14 | | | | | |
| Yield Strength (psi) ASTM D638-03 | 2483 | 2900 | 2790 | 2750 | 2940 | 3030 |
| SD | 77 | | | | | |
| Yield Strain (%) ASTM D638-03 | 3.974 | 7.7 | 6.5 | 7.4 | 7.5 | 6.1 |
| SD | 0.09 | | | | | |

TABLE 4I

COMPARATIVE EXAMPLES

| | \multicolumn{6}{c|}{SAMPLE NO.} | | | | | |
|---|---|---|---|---|---|---|
| | C512 | C586 | C587 | C588 | C589 | C590 |
| Burst Properties | | | | | | |
| $10^{**}5$ intercept at 23 C. (psi) ASTM D-1598-02 ASTM D-2837-04 | Failed Screening test @ 60 C. | NA | NA | NA | NA | NA |
| $10^{**}5$ intercept at 60 C., (psi) ASTM D-1598-02 ASTM D-2837-04 | Failed Screening test | Failed | Failed | Failed | Failed | Failed |
| 90 C. validation test (690 psi Hoop stress for >3800 hours) PPI TR #3 Section F.4.2.1 | NA | NA | NA | NA | NA | NA |

NA = Not Applicable

TABLE 5A

COMPARATIVE SAMPLES

| | \multicolumn{5}{c|}{SAMPLE NO.} | | | | |
|---|---|---|---|---|---|
| | C591 | C592 | C636 | C916 | C918 |
| Type | 0017 reduction | 0017 reduction | Precursor | Precursor | Precursor |
| Temp. ° C. | 80.0 | 80.0 | 80 | 80.0 | 80.0 |
| C2 Part. Pressure, psi | 31.9 | 29.1 | 28 | 32.0 | 33.4 |
| H2/C2 Molar Ratio | 0.061 | 0.043 | 0.02930 | 0.037 | 0.037 |
| C6/C2 Molar Ratio | 0.038 | 0.067 | 0.0617 | 0.084 | 0.084 |
| Ethylene lb/hr | 21.7 | 22.7 | | 26.7 | 27.1 |
| Hexene lb/hr | 0.6 | 1.2 | | 1.3 | 1.3 |
| Hydrogen mlb/hr | | | | 2.5 | 2.2 |
| Isopentane lb/hr | 3.0 | 3.0 | | — | — |
| Nitrogen lb/hr | | | | 4.4 | 4.2 |
| Ethylene Mol % | | | | 10.2 | 10.6 |
| Hexene Mol % | | | | 0.9 | 0.9 |
| Hydrogen Mol % | | | | 0.4 | 0.4 |
| Isopentane Mol % | | | | 8.0 | 8.0 |
| Nitrogen Mol % | | | | 80.2 | 80.0 |
| Cat cc/hr | | | 2.7 | 4.4 | 13.4 |
| E.B. Production Rate, lb/hr | 26.0 | 27.3 | 24.0 | 34.8 | 35.1 |
| Bed Weight, lbs | | | 98.4 | 68.3 | 68.5 |
| FBD(lb/ft$^3$) | | | 12.0 | 13.2 | 12.8 |
| Bed Volume, ft$^3$ | | | 8.2 | 8.64 | 10.64 |
| Residence Time, hr | 2.8 | 2.7 | 4.10 | 2.0 | 1.9 |
| STY, lb/hr/ft$^3$ | 2.4 | 2.8 | 2.9 | 4.0 | 3.3 |
| SGV (ft/sec) | | | | 1.6 | 10.6 |

TABLE 5B

COMPARATIVE SAMPLES

| | \multicolumn{5}{c|}{SAMPLE NO.} | | | | |
|---|---|---|---|---|---|
| | C591 | C592 | C636 | C916 | C918 |
| RESIN PROPERTIES (first reactor) | | | | | |
| Flow Index, dg/min I21 | 0.57 | 0.50 | 0.4 | 0.65 | 0.66 |
| Melt Index, dg/min I2 | — | — | | — | — |
| Density, g/cm$^3$ | 0.9291 | 0.9244 | 0.9261 | 0.9238 | 0.9238 |
| MFR | — | — | | — | — |
| Titanium, ppmw | 4.0 | 4.1 | 3.10 | 2.1 | 1.9 |
| Aluminum ppmw | 90.9 | 103.7 | 107.7 | 63.9 | 61.5 |
| Al/Ti | 40.4 | 45.5 | 62.4 | 53.9 | 56.4 |
| Bulk Density, lb/ft3 | 23.3 | 21.5 | 17.7 | 15.9 | 15.9 |
| APS, inches | 0.026 | 0.025 | 0.0345 | 0.036 | 0.037 |
| Fines, Wt % LT 120 Mesh | 1.2 | 1.1 | 1.9 | 1.6 | 1.3 |

TABLE 5C

COMPARATIVE SAMPLES

| | SAMPLE NO. | | | | |
|---|---|---|---|---|---|
| | C591 | C592 | C636 | C916 | C918 |
| REACTION CONDITIONS (second reactor) | | | | | |
| Temp. °C. | 94.9 | 94.9 | 99.9 | 94.9 | 94.9 |
| Pressure, psig | 392.6 | 392.6 | 380 | 388.0 | 386.8 |
| C2 Part. Pressure, psi | 64.8 | 70.4 | 75.3 | 84.8 | 91.0 |
| H2/C2 Molar Ratio | 1.3 | 1.3 | 1.74800 | 1.3 | 0.8 |
| C6/C2 Molar Ratio | 0.07 | 0.03 | 0.0486 | 0.035 | 0.035 |
| Ethylene lb/hr | 17.8 | 19.8 | | 25.2 | 30.3 |
| Hexene lb/hr | 1.3 | 0.7 | | 0.8 | 0.9 |
| Isopentane lb/hr | | | | 0.6 | 0.0 |
| Nitrogen lb/hr | | | | 13.6 | 16.7 |
| Ethylene Mol % | | | | 21.0 | 22.6 |
| Hexene Mol % | | | | 0.7 | 0.8 |
| Hydrogen Mol % | | | | 27.3 | 19.2 |
| Isopentane Mol % | | | | 0.3 | 0.2 |
| Nitrogen Mol % | | | | 49.3 | 55.8 |
| E.B. Production Rate, lb/hr | 16.1 | 17.5 | 19.5 | 16.1 | 18.6 |
| Bed Weight, lbs | 90.1 | 89.5 | 152.3 | 97.9 | 98.0 |
| Fluidized Bed Density (lb/ft³) | | | 11.2 | 14.1 | 13.7 |
| Bed Volume, ft³ | | | 13.6 | 10.0 | 12.0 |
| Residence Time, hr | 2.1 | 2.0 | 3.5 | 1.92 | 1.82 |
| Space Time Yield, lb/hr/ft³ | 3.5 | 4.0 | 1.4 | 5.1 | 4.5 |
| Superficial gas velocity (ft/sec) | | | | 1.8 | 1.7 |

TABLE 5D

COMPARATIVE SAMPLES

| RESIN PROPERTIES | SAMPLE NO. | | | | |
|---|---|---|---|---|---|
| (Blend) | C591 | C592 | C636 | C916 | C918 |
| Flow Index, dg/min I21 (G) | 9.0 | 8.5 | 8.9 | 9.9 | 9.7 |
| Melt Index, dg/min I2 (G) | 0.15 | 0.1 | 0.38 (MI5) | 0.13 | 0.14 |
| Density, g/cm³ (G) | 0.9400 | 0.9403 | 0.9407 | 0.9399 | 0.9396 |
| MFR (MI21/MI2) (G) | 61.1 | 69.4 | 23.4 (MI21/MI5) | 73.9 | 67.6 |
| Titanium, ppmw (G) | 2.4 | 2.5 | 1.88 | 1.3 | 1.1 |
| Aluminum ppmw (G) | 57.9 | 56.0 | 74.9 | 58.1 | 46.5 |
| Al/Ti (G) | 43.2 | 39.9 | 71.2 | 80.5 | 75.5 |
| Bulk Density, lb/ft3 (G) | 26.3 | 24.6 | 20.4 | 19.6 | 18.7 |
| APS, inches (G) | 0.026 | 0.025 | 0.0302 | 0.033 | 0.034 |
| Fines, Wt % less than120 Mesh (G) | 2.0 | 1.7 | 3.7 | 2.3 | 1.9 |
| Split % by Energy Balance(G) | 61.7 | 60.9 | | 68.4 | 65.4 |
| Split % calculated (G) | 58.5 | 57.8 | 57.7 | 58.6 | 55.4 |

[Split % (calculated) = (weight of HMW/(sum weight (HMW + LMW))) × 100]

TABLE 5E

COMPARATIVE SAMPLES

| | SAMPLE NO. | | | | |
|---|---|---|---|---|---|
| | C591 | C592 | C636 | C916 | C918 |
| MI2 - g/10 min (P) ASTM D-1238-04 | 0.14 | 0.13 | 0.0977 | 0.13 | 0.16 |
| MI5 - g/10 min (P) ASTM D-1238-04 | 0.53 | 0.45 | 0.382 | 0.48 | 0.60 |
| ASTM D-1238-04 | 1.8 | 1.6 | 1.51 | 1.71 | 2.13 |
| MI21 - g/10 min(P) ASTM D-1238-04 | 9.4 | 8.2 | 9.45 | 9.14 | 10.59 |
| MFR (I21/I2) (P) | 67.1 | 63.1 | 96.7 | 71.0 | 65.1 |
| MFR (I21/I5) (P) | 17.7 | 18.2 | 24.7 | 18.9 | 17.7 |
| MFR (I10/I2) (P) | 12.9 | 12.3 | 15.5 | 13.3 | 13.1 |
| Density (g/cc) (P) ASTM D-790-00 | 0.9403 | 0.9403 | 0.9425 | 0.9456 | 0.9446 |
| IR structure (P) | | | | | |
| Trans/1000 carbons (P) ASTM D-6248-2004 | 0 | 0 | 0.023 | 0.001 | 0.005 |
| Vinyls/1000 carbons (P) ASTM D-6248-2004 | 0.135 | 0.126 | 0.219 | 0.17 | 0.2 |
| Methyls/1000 carbons (P) ASTM D-2238-1999 | 3.61 | 3.12 | 3.89 | 4.4 | 4 |
| Additive analysis | | | | | |
| Irganox 1010 ppm | 1324 | 1233 | 1824 | 1421 | 1462 |
| Irgafos 168 ppm total | 1316 | 1365 | 2199 | 953 | 968 |
| Irgafos 168 ppm Active | 1080 | 1119 | 1994 | 533 | 654 |
| Irgafos 168 ppm Inactive | 236 | 246 | 205 | 1486 | 1622 |

TABLE 5E-continued

COMPARATIVE SAMPLES

| | SAMPLE NO. | | | | |
|---|---|---|---|---|---|
| | C591 | C592 | C636 | C916 | C918 |
| Percent Active I-168 | 0.82 | 0.82 | 90.68 | 64.1 | 59.7 |

TABLE 5F

COMPARATIVE SAMPLES

| | SAMPLE NO. | | | | |
|---|---|---|---|---|---|
| | C591 | C592 | C636 | C916 | C918 |
| RMS-100 Viscosity MPa·S at 0.01 sec−1 shear rate | 9.00E+05 | 1.10E+06 | | 1070000 | 866000 |
| RMS-800 Viscosity MPa·S at 100 sec−1 shear rate | 25200 | 26100 | | 24252 | 24463 |
| G'/G" @ 0.01 sec−1 Shear Rate | 0.29 | 0.32 | | 0.337 | 0.284 |
| G'/G" @ 0.1 sec−1 Shear Rate | 0.42 | 0.45 | | 0.467 | 0.421 |
| Viscosity ratio 0.01/100 data | 35.7 | 42.1 | | 44.1 | 35.4 |
| Rheotens melt strength (cN) | | | 13 | 11 | 10 |
| Rheotens Velocity (mm) | | | | 145 | 149 |
| DSC Melting Point (Deg C.) ASTM D-3418-03 | 128.85 | 129.6 | 127.47 | 128.26 | 128.37 |
| Heat of Fusion (J/g) ASTM D-3418-03 | 180.2 | 173.6 | 190.8 | 184.7 | 180.6 |
| DSC Crystallization point (Deg C.) ASTM D-3418-03 | 115.45 | 115.45 | 116.41 | 116.05 | 116.1 |
| Heat of Crystallization (J/g) ASTM D-3418-03 | 179.5 | 172.4 | 188.6 | 178 | 175.9 |
| DSC Induction Time (min) ASTM D-3350-05 | 43.62 | 39.9 | | | |
| DSC Induction Temp (Deg C.) ASTM D-3350-05 | 237.86 | 245.58 | | | |
| C13 NMR Wt % Hexene ASTM D-5017-91 | 3.1 | 2.8 | 2.4 | 3.1 | 2.7 |

TABLE 5G

COMPARATIVE SAMPLES

| | SAMPLE NO. | | | | |
|---|---|---|---|---|---|
| | C591 | C592 | C636 | C916 | C918 |
| Atref HD fraction (%) | 74.7 | 77 | 73 | 69.2 | 68.3 |
| Temperature Minimum (C.) | 86.1 | 86.3 | 86.1 | 87.1 | 86.1 |
| SCB portion | 14.6 | 12.3 | 14.6 | 17 | 14 |
| SCB portion minimum temperature (C.) | 50 | 56 | 56 | 55 | 60 |
| SCB distribution Mv | 92496 | 91775 | 112183 | 109150 | 119540 |
| ATREF Purge (%) | 10.7 | 10.7 | 12.4 | 13.8 | 17.7 |
| Purge Mv | 73084 | 86842 | 97678 | 84706 | 112700 |
| ATREF Overall Mv Average | 90419 | 91247 | 110384 | 105777 | 118329 |

TABLE 5G-continued

| | COMPARATIVE SAMPLES | | | | |
|---|---|---|---|---|---|
| | SAMPLE NO. | | | | |
| | C591 | C592 | C636 | C916 | C918 |
| ATREF Dv viscosity - temperature slope (70° C. -90° C. region) Triple Detector Results Conventional GPC | 0.054 | 0.018 | 0.041 | −0.0032 | 0.021 |
| Mn | 16690 | 19640 | 10890 | 17770 | 21120 |
| Mw | 194430 | 200670 | | 161720 | 162700 |
| Mz | 808700 | 880800 | | 707900 | 680800 |
| Mw/Mn | 11.6 | 10.2 | | 9.1 | 7.7 |
| Absolute GPC | | | | | |
| Mn | 20881 | 23343 | | 17309 | 19200 |
| Mw | 215820 | 209010 | 241400 | 157960 | 168500 |
| Mw (abs)/Mn abs | 10.3 | 9.0 | 22.2 | 9.1 | 8.8 |
| Mz (BB) | 845200.0 | 805000.0 | 1290000 | 590100 | 645500 |
| Mz (abs) | 965500 | 896400 | | 620400 | 732400 |
| Mz + 1 (BB) | 1647200.0 | 1536400.0 | 2504000.0 | 1114200 | 1196200 |
| Mz (abs)/Mw | 4.47 | 4.29 | 5.3 | 3.9 | 4.3 |
| Mw (abs)/Mw (GPC) | 1.11 | 1.04 | | | |

TABLE 5H

| | COMPARATIVE SAMPLES | | | | |
|---|---|---|---|---|---|
| | SAMPLE NO. | | | | |
| Plaque Properties | C591 | C592 | C636 | C916 | C918 |
| PENT (2.4 MPa) Hrs ASTM D-1473-01 | 18047 | >19320 (discontinued) | 1687 | 12880 (discontinued) | >13,181 (on test) |
| RCP Gc @ 23 C. from PENT plaque milled to 2 mm thick samples (KJ/m2) Modified (2 mm) ASTM F-2231-02 | 127 | 175 | 176.1 | 194.5 | 175.7 |
| RCP Gc @ 23 C. from PENT plaque milled to 3 mm thick samples (KJ/m2) ASTM F-2231-02 | | | | | |
| Flexural Modulus (psi) @ 0.5 inches/min ASTM D-790-03 | 134000 | 135000 | 144400 | 151000 | 148770 |
| SD | | | | 8666 | 5640 |
| Secant Modulus (psi) 2% @ 0.5 inches/min ASTM D-790-03 | 95000 | 100000 | | 102000 | 100075 |
| SD | | | | 920 | 1675 |
| Secant Modulus (psi) 1% @ 0.5 inches/min ASTM D-790-03 | 114000 | 120000 | | 122300 | 120000 |
| SD | | | | 1473 | 281 |
| Tensile Strength (PSI) ASTM D638-03 | 5320 | 5470 | 4764 | 5074 | 5554 |
| SD | | | | 444 | 300 |
| % Elongation ASTM D638-03 | 880 | 730 | 752 | 740 | 630 |
| SD | | | | 55 | 118 |
| Yield Strength (psi) ASTM D638-03 | 2440 | 2860 | 2700 | 2448 | 2572 |
| SD | | | | 65 | 163 |
| Yield Strain (%) ASTM D638-03 | 15.7? | 11? | 5.9 | 4 | 5.6 |
| SD | | | | 0.25 | 3.6 |

TABLE 5I

COMPARATIVE SAMPLES

| Burst Properties | C591 | C592 | C636 | C916 | C918 |
|---|---|---|---|---|---|
| 10**5 intercept at 23 C. (psi) ASTM D-1598-02 ASTM D-2837-04 | NA | NA | NA | NA | 1328 |
| 10**5 intercept at 60 C., (psi) ASTM D-1598-02 ASTM D-2837-04 | Failed | Failed | ~940 | Failed | 952 |
| Hours on test at 60 C. | | | | | 7388 |
| 90 C. validation test (690 psi Hoop stress for >3800 hours) PPI TR #3 Section F.4.2.1 | NA | NA | | NA | |

NA = Not Applicable

TABLE 6A

COMPARATIVE SAMPLES

| | C919 | C920 | C921 | C923 | C924 |
|---|---|---|---|---|---|
| Type | Precursor | Precursor | Precursor | Precursor | 0017 reduction |
| First Reactor REACTION CONDITIONS | | | | | |
| Temp. ° C. | 80.0 | 80.0 | 80.0 | 80.0 | 80.0 |
| C2 Part. Pressure, psi | 30.8 | 36.8 | 33.5 | 26.5 | 38.8 |
| H2/C2 Molar Ratio | 0.012 | 0.034 | 0.028 | 0.034 | 0.027 |
| C6/C2 Molar Ratio | 0.115 | 0.124 | 0.112 | 0.099 | 0.114 |
| Ethylene lb/hr | 27.5 | 26.8 | 27.5 | 26.9 | 27.0 |
| Hexene lb/hr | 1.8 | 2.1 | 1.8 | 1.5 | 1.9 |
| Hydrogen mlb/hr | 2.7 | 7.1 | 5.4 | 5.2 | 5.4 |
| Isopentane lb/hr | — | — | — | — | — |
| Nitrogen lb/hr | 4.6 | 4.3 | 4.4 | 4.1 | 3.8 |
| Ethylene Mol % | 9.8 | 11.8 | 10.7 | 8.5 | 12.4 |
| Hexene Mol % | 1.1 | 1.4 | 1.2 | 0.8 | 1.4 |
| Hydrogen Mol % | 0.1 | 0.4 | 0.3 | 0.3 | 0.3 |
| Isopentane Mol % | 8.0 | 8.0 | 8.0 | 8.0 | 8.0 |
| Nitrogen Mol % | 79.7 | 78.5 | 79.2 | 82.3 | 78.2 |
| Cat cc/hr | 14.4 | 14.4 | 14.4 | 14.4 | 15.4 |
| E.B. Production Rate, lb/hr | 34.7 | 34.8 | 34.8 | 35.0 | 35.1 |
| Bed Weight, lbs | 68.7 | 68.5 | 68.5 | 68.5 | 68.3 |
| FBD(lb/ft3) | 12.3 | 12.3 | 12.3 | 12.7 | 11.7 |
| Bed Volume, ft3 | 11.64 | 11.64 | 11.64 | 11.64 | 12.64 |
| Residence Time, hr | 2.0 | 2.0 | 2.0 | 2.0 | 1.9 |
| STY, lb/hr/ft3 | 3.0 | 3.0 | 3.0 | 3.0 | 2.8 |
| SGV (ft/sec) | 11.6 | 11.6 | 11.6 | 11.6 | 12.6 |

TABLE 6B

COMPARATIVE SAMPLES

| | C919 | C920 | C921 | C923 | C924 |
|---|---|---|---|---|---|
| RESIN PROPERTIES (First reactor) | | | | | |
| Flow Index, dg/min I21 | 0.26 | 0.87 | 0.66 | 0.56 | 0.71 |
| Melt Index, dg/min I2 | — | — | — | — | — |
| Density, g/cm3 | 0.9179 | 0.9183 | 0.9194 | 0.9206 | 0.9205 |
| MFR | — | — | — | — | — |
| Titanium, ppmw | 1.7 | 1.8 | 1.8 | 2.3 | 1.6 |
| Aluminum ppmw | 60.6 | 65.0 | 71.7 | 65.5 | 71.6 |
| Al/Ti | 62.3 | 63.4 | 71.9 | 50.1 | 81.0 |
| Bulk Density, lb/ft3 | 16.1 | 15.8 | 15.3 | 16.4 | 15.4 |
| APS, inches | 0.041 | 0.041 | 0.039 | 0.038 | 0.041 |
| Fines, Wt % LT 120 Mesh | 1.5 | 1.0 | 1.2 | 0.9 | 0.4 |

TABLE 6C

COMPARATIVE SAMPLES

| | SAMPLE NO. | | | | |
|---|---|---|---|---|---|
| | C919 | C920 | C921 | C923 | C924 |
| REACTION CONDITIONS (Second reactor) | | | | | |
| Temp. ° C. | 94.9 | 94.9 | 95.0 | 94.9 | 95.0 |
| Pressure, psig | 387.7 | 386.6 | 386.7 | 342.6 | 342.7 |
| C2 Part. Pressure, psi | 123.6 | 100.1 | 113.4 | 70.1 | 127.1 |
| H2/C2 Molar Ratio | 0.8 | 0.5 | 0.5 | 1.3 | 0.5 |
| C6/C2 Molar Ratio | 0.013 | 0.011 | 0.011 | 0.01 | 0.01 |
| Ethylene lb/hr | 37.8 | 33.5 | 37.7 | 27.5 | 36.7 |
| Hexene lb/hr | 0.5 | 0.4 | 0.4 | 0.3 | 0.4 |
| Isopentane lb/hr | 1.0 | 1.0 | 1.0 | 1.0 | 2.0 |
| Nitrogen lb/hr | 13.5 | 17.6 | 17.4 | 21.2 | 13.1 |
| Ethylene Mol % | 30.7 | 24.9 | 28.2 | 19.6 | 35.6 |
| Hexene Mol % | 0.4 | 0.3 | 0.3 | 0.2 | 0.4 |
| Hydrogen Mol % | 26.0 | 12.4 | 14.1 | 25.5 | 17.7 |
| Isopentane Mol % | 0.4 | 0.3 | 0.3 | 0.4 | 0.3 |
| Nitrogen Mol % | 41.8 | 61.5 | 56.1 | 53.8 | 45.6 |
| E.B. Production Rate, lb/hr | 22.9 | 20.7 | 25.1 | 16.6 | 24.1 |
| Bed Weight, lbs | 98.6 | 98.6 | 99.6 | 98.0 | 98.4 |
| Fluidized Bed Density (lb/ft3) | 13.8 | 12.7 | 13.0 | 14.6 | 14.0 |
| Bed Volume, ft3 | 13.0 | 13.0 | 13.0 | 13.0 | 14.0 |
| Residence Time, hr | 1.71 | 1.78 | 1.66 | 1.90 | 1.66 |
| Space Time Yield, lb/hr/ft3 | 4.4 | 4.3 | 4.6 | 4.0 | 4.2 |
| Superficial gas velocity (ft/sec) | 1.7 | 1.7 | 1.7 | 1.6 | 1.6 |

TABLE 6D

COMPARATIVE SAMPLES

| | SAMPLE NO. | | | | |
|---|---|---|---|---|---|
| | C919 | C920 | C921 | C923 | C924 |
| RESIN PROPERTIES (Blend) | | | | | |
| Flow Index, dg/min I21 (G) | 8.6 | 8.6 | 9.2 | 7.5 | 9.0 |
| Melt Index, dg/min I2 (G) | 0.09 | 0.17 | 0.17 | 0.11 | 0.17 |
| Density, g/cm3 (G) | 0.9405 | 0.9371 | 0.9397 | 0.9392 | 0.9396 |
| MFR (MI21/MI2) (G) | 100.6 | 49.6 | 54.3 | 70.2 | 54.4 |
| Titanium, ppmw (G) | 1.0 | 1.1 | 0.9 | 1.6 | 0.9 |
| Aluminum ppmw (G) | 41.8 | 50.6 | 41.4 | 54.6 | 46.3 |
| Al/Ti (G) | 77.1 | 80.3 | 85.3 | 62.4 | 91.9 |
| Bulk Density, lb/ft3 (G) | 18.7 | 17.9 | 17.9 | 19.5 | 18.9 |
| APS, inches (G) | 0.036 | 0.038 | 0.038 | 0.033 | 0.039 |
| Fines, Wt % less than 120 Mesh (G) | 1.8 | 1.2 | 1.5 | 1.8 | 0.6 |
| Split % by Energy Balance (G) | 60.3 | 62.6 | 58.1 | 67.8 | 59.3 |
| Split % calculated (G) | 47.9 | 54.8 | 50.5 | 60.5 | 51.6 |
| MI2 - g/10 min (P) ASTM D-1238-04 | 0.10 | 0.19 | 0.19 | 0.10 | 0.17 |
| MI5 - g/10 min (P) ASTM D-1238-04 | 0.42 | 0.67 | 0.71 | 0.46 | 0.66 |
| MI10 - g/10 min (P) ASTM D-1238-04 | 1.68 | 2.16 | 2.36 | 1.53 | 2.20 |
| MI21 - g/10 min (P) ASTM D-1238-04 | 9.14 | 9.84 | 11.06 | 8.13 | 10.58 |
| MFR (I21/I2) (P) | 90.7 | 51.0 | 58.3 | 81.1 | 61.6 |
| MFR (I21/I5) (P) | 21.6 | 14.7 | 15.6 | 17.7 | 16.1 |
| MFR (I10/I2) (P) | 16.6 | 11.2 | 12.4 | 15.2 | 12.8 |

[Split % (calculated) = (weight of HMW/(sum weight (HMW + LMW))) × 100]

TABLE 6E

COMPARATIVE SAMPLES

| | SAMPLE NO. | | | | |
|---|---|---|---|---|---|
| | C919 | C920 | C921 | C923 | C924 |
| Density (g/cc) (P) ASTM D-792-00 | 0.9457 | 0.9424 | 0.9455 | 0.9451 | 0.9447 |
| IR structure (P) | | | | | |
| Trans/1000 carbons(P) ASTM D-6248-2004 | 0.034 | 0.062 | 0.04 | 0.02 | 0.036 |
| Vinyls/1000 carbons (P) ASTM D-6248-2004 | 0.2 | 0.16 | 0.18 | 0.17 | 0.18 |
| Methyls/1000 carbons (P) ASTM D-2238-1999 | 4.4 | 1.5 | 4 | 4.7 | 4.2 |
| Additive analysis | | | | | |
| Irganox 1010 ppm | 1500 | 1494 | 1486 | 1452 | 1642 |
| Irgafos 168 ppm total | 918 | 760 | 733 | 823 | 836 |
| Irgafos 168 ppm Active | 694 | 907 | 923 | 826 | 1049 |
| Irgafos 168 ppm Inactive | 1612 | 1667 | 1656 | 1649 | 1885 |
| Percent Active I-168 | 56.9 | 45.6 | 44.3 | 49.9 | 44.4 |
| RMS-100 Viscosity MPa · S at 0.01 sec−1 shear rate | 150000 | 74500 | 75400 | 132000 | 92700 |
| RMS-800 Viscosity MPa · S at 100 sec−1 shear rate | 2379 | 2616 | 2467 | 2649 | 2545 |

TABLE 6E-continued

| | COMPARATIVE SAMPLES | | | | |
|---|---|---|---|---|---|
| | SAMPLE NO. | | | | |
| | C919 | C920 | C921 | C923 | C924 |
| G'/G" @ 0.01 sec−1 Shear Rate | 0.327 | 0.295 | 0.308 | 0.397 | 0.384 |
| G'/G" @ 0.1 sec−1 Shear Rate | 0.563 | 0.404 | 0.422 | 0.511 | 0.48 |
| Viscosity ratio 0.01/100 data | 63.1 | 28.5 | 30.6 | 49.8 | 36.4 |
| Rheotens melt strength (cN) | 12.5 | 9.5 | 9.5 | 12.5 | 10 |
| Rheotens Velocity (mm) | 130 | 150 | 160 | 130 | 125 |

TABLE 6F

| | COMPARATIVE SAMPLES | | | | |
|---|---|---|---|---|---|
| | SAMPLE NO. | | | | |
| | C919 | C920 | C921 | C923 | C924 |
| DSC Melting Point (Deg C.) ASTM D-3418-03 | 129.3 | 129.22 | 129.82 | 128.79 | 129.28 |
| Heat of Fusion (J/g) ASTM D-3418-03 | 187.2 | 174.9 | 177.5 | 180.3 | 180.8 |
| DSC Crystallization point (Deg C.) ASTM D-3418-03 | 116.75 | 116.33 | 116.49 | 116.32 | 117.53 |
| Heat of Crystallization (J/g) ASTM D-3418-03 | 175.6 | 169.8 | 170.9 | 175.5 | 180 |
| DSC Induction Time (min) ASTM D-3350-05 | | | | | |
| DSC Induction Temp (Deg C.) ASTM D-3350-05 | | | | | |
| C13 NMR Wt % Hexene ASTM D-5017-91 | 2.8 | 3.6 | 2.8 | 3 | |
| Branches/1000 C in Backbone ASTM D-5017-91 | | | | | |
| ATREF HD fraction (%) | 72.2 | 67.6 | 74.5 | 72.1 | 72.3 |
| Temperature Minimum (° C.) | 87 | 87.4 | 86.6 | 86 | 86 |
| SCB portion | 13.9 | 17.6 | 12.8 | 15.2 | 13.2 |
| SCB portion minimum temperature (° C.) | 55 | 35 | 55 | 48 | 55 |
| SCB distribution Mv | 118808 | 117914 | 104429 | 100613 | 76229 |
| ATREF Purge (%) | 13.9 | 14.8 | 12.7 | 12.7 | 14.5 |
| Purge Mv | 99009 | 104622 | 85525 | 79988 | 63014 |
| ATREF Overall Mv Average | 116056 | 115947 | 102028 | 97994 | 74313 |
| ATREF Dv viscosity - temperature slope (70° C. -90° C. region) | −0.0027 | 0.0063 | 0.00031 | −0.00078 | −0.0011 |

TABLE 6G

COMPARATIVE SAMPLE

| | SAMPLE NO. | | | | |
|---|---|---|---|---|---|
| | C919 | C920 | C921 | C923 | C924 |
| Triple Detector Results Conventional GPC | | | | | |
| Mn | 21660 | 29250 | 28640 | 22120 | 31000 |
| Mw | 196560 | 133280 | 170000 | 200480 | 186380 |
| Mz | 885000 | 453400 | 679700 | 827900 | 776200 |
| Mw/Mn | 9.1 | 4.6 | 5.9 | 9.1 | 6.0 |
| Absolute GPC | | | | | |
| Mn | 20500 | 29900 | 29900 | 21640 | 30733 |
| Mw | 199290 | 163170 | 191960 | 200750 | 194260 |
| Mw (abs)/Mn abs | 9.7 | 5.5 | 6.4 | 9.3 | 6.3 |
| Mz(BB) | 829000 | 558100 | 704000 | 790200 | 759200 |
| Mz (abs) | 811200 | 927600 | 867100 | 785600 | 865000 |
| Mz + 1 (BB) | 1540300 | 1108400 | 1356800 | 1467100 | 1440300 |
| Mz (abs)/Mw | 4.1 | 5.7 | 4.5 | 3.9 | 4.5 |

TABLE 6H

COMPARATIVE SAMPLE

| | SAMPLE NO. | | | | |
|---|---|---|---|---|---|
| Plaque Properties | C919 | C920 | C921 | C923 | C924 |
| PENT (2.4 MPa) Hrs ASTM D-1473-01 | >13513 (on test) | >13478 (on test) | >13274 (on test) | 12768 (discontinued) | 12314 (discontinued) |
| RCP Gc @ 23 C. from PENT plaque milled to 2 mm thick samples (KJ/m2) Modified (2 mm) ASTM F-2231-02 | 204.9 | 193.4 | 206 | 193.4 | 204.9 |
| RCP Gc @ 23 C. from PENT plaque milled to 3 mm thick samples (KJ/m2) ASTM F-2231-02 | | | | | |
| Flexural Modulus (psi) @ 0.5 inches/min ASTM D-790-03 | 153800 | 141250 | 151000 | 144000 | 139300 |
| SD | 3650 | 2920 | 8520 | 6580 | 8540 |
| Secant Modulus (psi) 2% @ 0.5 inches/min ASTM D-790-03 | 101600 | 93150 | 101700 | 98000 | 95400 |
| SD | 1718 | 1400 | 1907 | 2626 | 2685 |
| Secant Modulus (psi) 1% @ 0.5 inches/min ASTM D-790-03 | 122200 | 112300 | 122000 | 117500 | 114300 |
| SD | 2093 | 1310 | 2660 | 3978 | 4062 |
| Tensile Strength (PSI) ASTM D-638-03 | 5376 | 5310 | 5040 | 4980 | 5080 |
| SD | 134 | 150 | 412 | 140 | 395 |
| % Elongation ASTM D-638-03 | 620 | 682 | 725 | 590 | 695 |
| SD | 54 | 37 | 35 | 80 | 50 |
| Yield Strength (psi) ASTM D-638-03 | 2628 | 2330 | 2525 | 2438 | 2544 |
| SD | 115 | 48 | 59 | 27 | 52 |
| Yield Strain (%) ASTM D-638-03 | 6.4 | 4.6 | 4.56 | 4.7 | 4.72 |
| SD | 5.3 | 0.09 | 0.23 | 0.17 | 0.38 |

TABLE 6I

COMPARATIVE SAMPLES

| | SAMPLE NO. | | | | |
|---|---|---|---|---|---|
| Burst Properties | C919 | C920 | C921 | C923 | C924 |
| 10**5 intercept at 23 C. (psi) ASTM D-1598-02 ASTM D-2837-04 | NA | NA | NA | NA | NA |
| 10**5 intercept at 60 C., (psi) ASTM D-1598-02 ASTM D-2837-04 | Failed | Failed | Failed | Failed | Failed |
| 90 C. validation test (690 psi Hoop stress for >3800 hours) PPI TR #3 Section F.4.2.1 | NA | NA | NA | NA | NA |

NA = Not Applicable

TABLE 7A

COMPETITIVE SAMPLES

| | SAMPLE NO. | |
|---|---|---|
| | COM049 | COM769 |
| Type Info | Solvay-Fortiflex K-38-20-160 | Chevron Phillips TR-418Q |
| MI2 - g/10 min (P) ASTM D-1238-04 | 0.22 | 0.14 |
| MI5 - g/10 min (P) ASTM D-1238-04 | 1.05 | 0.76 |
| MI10 - g/10 min (P) ASTM D-1238-04 | 3.85 | 3.26 |
| MI21 - g/10 min (P) ASTM D-1238-04 | 19.9 | 15.4 |
| MFR (I21/I2) (P) | 90.5 | 110 |
| MFR (I21/I5) (P) | 19.0 | 20.3 |
| MFR (I10/I2) (P) | 17.5 | 23.3 |
| Density (g/cc) (P) ASTM D-792-00 | 0.9422 | 0.9398 |
| Additive analysis | | |
| Irganox 1010 ppm | | 1312 |
| Irgafos 168 ppm total | | 700 |
| Irgafos 168 ppm Active | | 660 |
| Irgafos 168 ppm Inactive | | 40 |
| Percent Active I-168 | | 0.94 |
| RMS-100 Viscosity MPa·S at 0.01 sec-1 shear rate | 91500 | 116000 |
| RMS-800 Viscosity MPa·S at 100 sec-1 shear rate | | 1870 |
| G'/G" @ 0.01 sec-1 Shear Rate | | 0.63 |
| G'/G" @ 0.1 sec-1 Shear Rate | | 0.68 |
| Viscosity ratio 0.01/100 data | | 62 |
| Rheotens melt strength (cN) | 13 | |

TABLE 7B

COMPETITIVE SAMPLES cont.

| | SAMPLE NO. | |
|---|---|---|
| | COM049 | COM769 |
| DSC Melting Point (Deg C.) ASTM D-3418-03 | 126.63 | |
| Heat of Fusion (J/g) ASTM D-3418-03 | 181.5 | |
| DSC Crystallization point (Deg C.) ASTM D-3418-03 | 114.57 | |
| Heat of Crystallization (J/g) ASTM D-3418-03 | 164.6 | |
| DSC Induction Time (min) ASTM D-3350-05 | | |
| DSC Induction Temp (Deg C.) ASTM D-3350-05 | | |
| C13 NMR Wt % Hexene ASTM D-5017-91 | 3.2 | 3.7 |
| Branches/1000 C. in Backbone ASTM D-5017-91 | | |
| Atref HD fraction (%) | 70.5 | 68.8 |
| Temperature Minimum (C.) | 86 | 87 |
| SCB portion | 22.1 | 19 |
| SCB portion minimimu temperature (C.) | 55 | 62 |
| SCB distribution Mv | 98970 | 130026 |
| Aterf Purge (%) | 7.4 | 12.2 |
| Purge Mv | 71715 | 93577 |
| Atref Overall Mv Average | 96953 | 125579 |
| Atref Dv viscosity - temperature slope (70° C.-90° C. region) | 0.04 | 0.018 |
| Triple Detector Results | | |
| Conventional GPC | | |
| Mn | 14900 | 10800 |
| Mw | | 200000 |

TABLE 7B-continued

COMPETITIVE SAMPLES cont.

| | SAMPLE NO. | |
|---|---|---|
| | COM049 | COM769 |
| Mz | | 1555000 |
| Mw/Mn | | 18.5 |
| Absolute GPC | | |
| Mn | | 11000 |
| Mw | 145800 | 200500 |
| Mw (abs)/Mn abs | 9.79 | 18.6 |
| Mz (BB) | 713400 | 1533000 |
| Mz (abs) | 1480000 | 1482000 |
| Mz + 1 (BB) | | 3610000.0 |
| Mz (abs)/Mw | 4.89 | 7.4 |
| Mw (abs)/Mw (GPC) | | 1.0 |

TABLE 7C

COMPETITIVE SAMPLES cont.

| | SAMPLE NO. | |
|---|---|---|
| | COM049 | COM769 |
| Plaque Properties | | |
| PENT (2.4 MPa) Hrs ASTM D-1473-01 | 2890 | 8625 |
| RCP Gc @ 23 C. from PENT plaque milled to 2 mm thick samples (KJ/m2) Modified (2 mm) ASTM F-2231-02 | 120 | 53 |
| RCP Gc @ 23 C. from PENT plaque milled to 3 mm thick samples (KJ/m2) ASTM F-2231-02 | | |
| Flexural Modulus (psi) @ 0.5 inches/min ASTM D-790-03 SD | 130700 | 126000 |
| Secant Modulus (psi) 2% @ 0.5 inches/min ASTM D-790-03 SD | | 89400 |
| Secant Modulus (psi) 1% @ 0.5 inches/min ASTM D-790-03 SD | | 105000 |
| Tensile Strength (PSI) ASTM D-638-03 SD | 4290 | 4425 |
| % Elongation ASTM D-638-03 SD | 822 | 780 |
| Yield Strength (psi) ASTM D-638-03 SD | 2633 | 2720 |
| Yield Strain (%) ASTM D-638-03 SD | 7.1 | |
| Burst Properties | | |
| 10**5 intercept at 23 C. (psi) ASTM D-1598-02 ASTM D-2837-04 | >1260 | >1260 |
| 10**5 intercept at 60 C., (psi) ASTM D-1598-02 ASTM D-2837-04 | >960 | >960 |
| Hours on test at 60 C. | | |
| 90 C. validation test (690 psi Hoop stress for >3800 hours) PPI TR #3 Section F.4.2.1 | | |

Scale-Up Polymerizations

Two scale-up polymerizations (inventive examples) are shown in tables 8A and 8B.

Preparation of Catalyst Precursor

A titanium trichloride catalyst precursor was prepared in an approximately 7,500 liter glass lined vessel, equipped with pressure and temperature control, and a turbine agitator. A nitrogen atmosphere (<5 ppm $H_2O$) was maintained at all times. Tetrahydrofuran (10,500 lbs, 4,800 kg, <400 ppm $H_2O$) were added to the vessel. The tetrahydrofuran was recovered from a closed cycle dryer, and contained approximately 0.1 percent Mg and 0.3 percent Ti. An "11 percent THF solution" of triethylaluminum was added to scavenge residual water. The reactor contents were heated to 40° C., and 13.7 lbs (6 kg) of granular magnesium metal (particle size 0.1-4 mm) was added, followed by 214.5 lbs (97.3 kg) of titanium tetrachloride added over a period of one-half hour.

The mixture was continuously agitated. The exotherm resulting from the addition of titanium tetrachloride caused the temperature of the mixture to rise to approximately 44° C. The temperature was then raised to 70° C., and held at that temperature for approximately four hours, then cooled to 50° C. At the end of this time, 522 pounds (238 kg) of magnesium dichloride were added, and heating initiated to raise the temperature to 70° C. The mixture was held at this temperature for another five hours, then cooled to 35° C., and filtered through a 100 mesh (150 μm) filter to remove solids.

Fumed silica (CAB-O-SIL™ TS-610, manufactured by the Cabot Corporation) (811 lbs, 368 kg) was added to the above precursor solution over a period of one hour. The mixture was stirred by means of a turbine agitator during this time, and for 4 hours thereafter, to thoroughly disperse the silica. The temperature of the mixture was held at 40° C. throughout this period, and a dry nitrogen atmosphere was maintained at all times. The resulting slurry was spray dried using an 8-foot diameter, closed cycle spray dryer, equipped with a rotary atomizer. The rotary atomizer was adjusted to give catalyst particles with a D50 on the order of 20-30 μm. The scrubber section of the spray dryer was maintained at approximately +5 to −5° C.

Nitrogen gas was introduced into the spray dryer at an inlet temperature of 140 to 165° C., and was circulated at a rate of approximately 1000-1800 kg/hour. The catalyst slurry was fed to the spray dryer at a temperature of about 35° C., and a rate of 65-150 kg/hour, or sufficient to yield an outlet gas temperature in the range of 100-125° C. The atomization pressure was maintained at slightly above atmospheric. The resulting catalyst particles are mixed with mineral oil (Kaydol™ 350, available from Witco Corporation), under a nitrogen atmosphere, in a 400 liter glass lined vessel, equipped with a turbine agitator, to form a slurry containing approximately 28 percent of the catalyst precursor.

Catalyst Precursor Partial Pre-Activation

The mineral oil slurry of precursor was partially activated (0017 reduction) by contact at room temperature with an appropriate amount of a 50 percent mineral oil solution of tri-n-hexyl aluminum (TNHA). The catalyst precursor slurry was pre-contacted with the activator, and fed through a Kenics mixer to provide mixing prior to feeding to the reactor.

Polymerization

As shown in Tables 8A and 8B, ethylene was copolymerized with 1-hexene in two fluidized bed reactors. Each polymerization was continuously conducted, after equilibrium was reached, under the respective conditions, as set forth in Tables 8A and 8B. Polymerization was initiated in the first reactor, by continuously feeding the catalyst (Ziegler/Natta catalyst) and cocatalyst (trialkyl aluminum (triethyl aluminum or TEAL)) into a fluidized bed of polyethylene granules, together with ethylene, 1-hexene and hydrogen. The resulting copolymer, mixed with active catalyst, was withdrawn from the first reactor, and transferred to the second reactor, using second reactor gas as a transfer medium. The second reactor also contained a fluidized bed of polyethylene granules. Ethylene, 1-hexene, and hydrogen were introduced into the second reactor, where the gases come into contact with the polymer and catalyst from the first reactor. Inert gases, nitrogen and isopentane, made up the remaining pressure in both the first and second reactors. In the second reactor, the cocatalyst was again introduced. The final product blend was continuously removed. In the second scale-up run, the second reactor (2B) was operated in condensing mode. This resulted in an improvement in reactor operation through a significant reduction in the level of static build-up in the reactor, and a reduction in the tendency for resin to be drawn toward the reactor walls.

TABLE 8A

| | SAMPLE NO. | | | |
|---|---|---|---|---|
| | 1A (First Reactor) | 1B (Second Reactor) | 2A (First Reactor) | 2B (Second Reactor) |
| Catalyst Modification | 0017 reduction | | 0017 reduction | |
| Temp. ° C. | 80 | 95 | 80 | 95 |
| Pressure (psig) | 283 | 353 | 281 | 345 |
| C2 Part. Pressure, psi | 36.2 | 89.7 | 39.7 | 79.5 |
| H2/C2 Molar Ratio | 0.032 | 0.6 | 0.029 | 0.60 |
| C6/C2 Molar Ratio | 0.058 | 0.026 | 0.059 | 0.026 |
| N2 Mol % | 74.6 | 52.8 | 72.5 | 51.4 |
| H2 Mol % | 0.386 | 14.6 | 0.396 | 13.2 |
| C4H4 Mol % | 12.1 | 24.4 | 13.4 | 22.1 |
| C2H6 Mol % | 0.941 | 1.53 | 0.907 | 1.48 |
| IC5 Mol % | 10.77 | 5.94 | 11.93 | 10.91 |
| C6H12 Mol % | 0.7 | 0.632 | 0.79 | 0.571 |
| Teal Flow (lbs/hr) | 6.8 | 2.5 | 8.9 | 3.4 |
| Production Rate, Mlb/hr | 37.7 | 37 | 46.4 | 42.7 |
| Catalyst Feed (lbs/hr) | 12.2 | — | 15.9 | — |
| TnHal Feed lb/hr) | 1.23 | — | 1.60 | — |
| TnHal/THF | 17 | — | 17 | — |
| C2 Feed (Mlbs/hr) | 36.6 | 36.6 | 45.1 | 42.2 |
| Total C6 Feed (lbs/hr) | 1154 | 624 | 1413 | 738 |
| H2 Feed (lbs/hr) | 0.62 | 26.3 | 0.64 | 26.4 |
| N2 Feed (lbs/hr) | 201 | 26 | 278 | 31 |
| Total IC5 Feed to Rx (lbs/hr) | 941 | 0 | 1508 | 558 |
| Vent Flow (lbs/hr) | 0 | 692 | 0 | 967 |
| Bed Weight (Mlbs) | 88.4 | 166 | 85.1 | 175 |
| Upper FBD (lbs/ft³) | 13 | 15.4 | 12.9 | 16.5 |
| Lower FBD (lbs/ft³) | 15.2 | 18.6 | 14.4 | 19.3 |
| Bed Level (ft) | 32.6 | 47.2 | 38.7 | 48.0 |

TABLE 8B

| | SAMPLE NO. | | | |
|---|---|---|---|---|
| | 1A (First Reactor) | 1B (Second Reactor) | 2A (First Reactor) | 2B (Second Reactor) |
| Residence Time (hr) | 2.3 | 2.2 | 1.8 | 2.0 |
| STY (lb/hr/ft³) | 6.5 | 4.2 | 7.8 | 4.7 |
| SGV (ft/s) | 1.69 | 2.03 | 1.72 | 1.83 |
| Dewpoint (° C.) | 51.4 | 40.7 | 54.2 | 55.9 |
| Inlet Temp. (° C.) | 40.9 | 56.9 | 39.2 | 51.9 |
| Wt % Condensing | 7.07 | 0 | 10.59 | 3.71 |
| Split | 0.504 | 0.496 | 0.521 | 0.479 |
| C2 Split | 0.5 | 0.5 | 0.516 | 0.484 |
| Ti (ppmw) | 2.57 | 1.25 | 3.11 | 1.65 |
| Al/Ti | 73.8 | 74.5 | 61.0 | 62.3 |
| Melt Index (I5) | | 0.66 | | 0.65 |

TABLE 8B-continued

| | SAMPLE NO. | | | |
|---|---|---|---|---|
| | 1A (First Reactor) | 1B (Second Reactor) | 2A (First Reactor) | 2B (Second Reactor) |
| Flow Index (I21) | 0.57 | 10.14 | 0.55 | 10.10 |
| MFR (I21/I5) | | 15.4 | | 15.5 |
| Density (g/cc) | 0.9243 | 0.9392 | 0.9248 | 0.9396 |

[Split % (calculated) = weight of HMW/(sum weight (HMW + LMW)) × 100]

Each blend has a single peak in an ATREF profile eluting above 30° C., and has a coefficient of viscosity average molecular weight (CMv) less than −0.0032 in the log(calculated Mv) versus elution temperature, said CMv calculated in the range of elution temperatures from 70° C. to 90° C., and wherein Mv is the viscosity average molecular weight.

Film Data

Inventive composition D20 comprises a blend containing a high molecular weight ethylene/hexene-1 interpolymer and a low molecular weight ethylene/hexene-1 interpolymer.

The high molecular weight ethylene/hexene-1 interpolymer is a heterogeneously branched linear interpolymer, and has a density of 0.9243 g/cc, and a high load melt index (I21) of 0.57 g/10 min (direct measurement).

The low molecular weight ethylene/hexane-1 interpolymer is heterogeneously branched linear interpolymer, and has a density in the range of 0.949-0.955 g/cc, and a melt index (I2) in the range of 15-25 g/10 min.

The blend has a single peak in an ATREF profile eluting above 30° C., and has a coefficient of viscosity average molecular weight (CMv) less than −0.0032 in the log(calculated Mv) versus elution temperature, said CMv calculated in the range of elution temperatures from 70° C. to 90° C., and wherein Mv is the viscosity average molecular weight.

Figure 29:
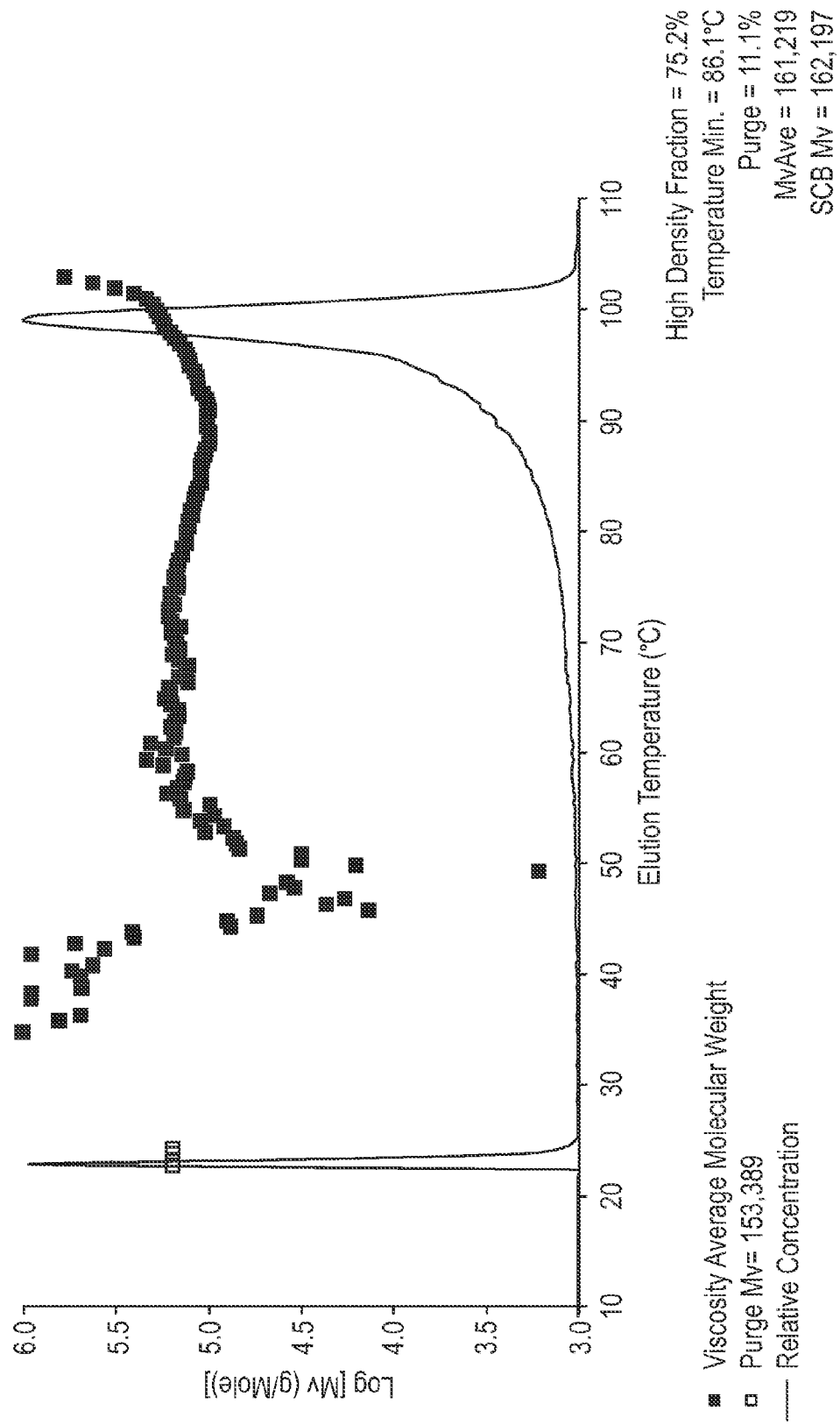

A description of the reaction conditions for the D20 blend is shown in Tables 8A and 8B. Some properties of the D20 resin are shown in Table 9. The ATREF-DV overlay profile for the D20 blend is shown in FIG. 29.

The D20 composition was fabricated into a three films (D20-1 to D20-3) on a standard smooth barrel extruder. The extrusion conditions are shown in Table 10.

Film properties are shown in Tables 11 and 12. Film tensile properties were compared against a film prepared from a comparative, unimodal, Cr catalyzed ethylene/1-hexene, copolymer (D25).

The two films, D20-1 (5 mils) and D20-2 (5 mils), had the following properties: a MD Tear of 131 g/mil and 140 g/mil, respectively, a CD Tear of 460 g/mil and 390 g/mil, respectively, a Dart Impact that exceeded the A scale, and a Normalized Dart Impact of 81.5 g/mil and 85.1 g/mil, respectively, on the "B" scale (1 mil=0.001 inch, and 1 inch=25.4 mm).

The film D20-3 (9 mils) had the following properties: a MD tear of 190 g/mil, a CD tear of 260 g/mil, a Dart Impact that exceeded the "A" scale, and a Normalized Dart Impact of 104.8 g/mil on the "B" scale.

For each film, unexpectedly superior properties were demonstrated. The films had good MD Tear and Dart Impact. These properties are especially needed in heavy duty shipping sacks (HDSS), where high stiffness, good Tear Resistance and good Dart Impact are required.

For "drip irrigation tubing," typical industry requirements for 4 to 6 mil thick film are as follows: Yield Strength CD (ASTM 882) from 3350 to 4250 psi, and Yield Strength MD (ASTM 882) from 2750 to 3450 psi. As shown in Table 12B, none of the comparative films (D25-1 and D25-3), at 5 mils, met the CD yield strength requirement. However, as shown in Table 12A, the inventive films (D20-1 and D20-2), at 5 mils, met the required CD yield strength, and met, or came very close to, the required MD yield strength.

TABLE 9

| Basic Property Data of D20 Resin and D25 Resin | | | | |
|---|---|---|---|---|
| | ASTM Test | Units | D20 | D25 |
| Basic Property Data | | | | |
| MI2 | D-1238-04 | g/10 min | 0.17 | 0.22 |
| MI5 | D-1238-04 | g/10 min | 0.63 | 1.1 |
| MI10 | D-1238-04 | g/10 min | 2.2 | 4.4 |
| MI21 | D-1238-04 | g/10 min | 10.7 | 22.5 |
| MI21/MI2 | | | 62.9 | 102 |
| MI21/MI5 | | | 17.0 | 20.5 |
| MI10/MI2 | | | 12.9 | |
| Density (ASTM) | D-792-00 | g/cc | 0.9406 | |
| | | Corrected for the additive contribution | 0.9393 | 0.9398 |
| Flexural Modulus @ 5% | D-790-99 | psi | 138000 | |
| Secant Modulus @ 2% | D-790-99 | psi | 95000 | |
| Secant Modulus @ 1% | D-790-99 | psi | 113500 | |
| Tensile Strength @ Break | D-638-03 | psi | 5040 | |
| % Elongation @ break | D-638-03 | | 950 | |
| Yield Strength | D-638-03 | psi | 2930 | |
| % Elongation @ yield | D-638-03 | | 7.1 | |
| Irganox 1010 | | ppm | 1500 | |
| Irgafos 168 | | ppm | 1500 | |
| UV 3529 | | ppm | 1670 | |
| UV 531 | | ppm | 560 | |
| Conventional GPC Data | | | | |
| Mn | | | 25000 | |
| Mw | | | 197000 | |
| Mw/Mn | | | 7.9 | |
| Mz | | | 865000 | |

TABLE 9-continued

Basic Property Data of D20 Resin and D25 Resin

Absolute GPC Data

| | |
|---|---|
| Mn | 24500 |
| Mw | 222000 |
| Mw/Mn | 9.1 |
| Mz(BB) | 1114000 |
| Mz(abs) | 1461000 |
| Mz + 1 (BB) | 2513000 |
| Mz/Mw | 6.58 |
| g' | 0.986 |

| | Test | Units | D20 |
|---|---|---|---|
| Basic Property Data | | | |
| DMS Viscosity | | | |
| 0.01585 sec−1 | | Pa-s | 57300 |
| 0.1 sec−1 | | Pa-s | 40000 |
| 100 sec−1 | | Pa-s | 2028 |
| Ratio 0.01585/100 | | Pa-s | 28.2 |
| Ratio 0.1/100 | | Pa-s | 19.7 |
| DSC | | | |
| Melting Point (° C.) | | | 127.7 |
| Enthalpy (J/g) | | | 184.7 |
| Crystallization Point (° C.) | | | 116 |
| Enthalpy (J/g) | | | 183.9 |
| OIT @ 210 (° C.) | | | >100 minutes |
| Thermal Stability (need >220 (° C.)) | ASTM D-3350-02 | | 248.6 |
| ATREF | | | |
| ATREF HD fraction (%) | | | 75.2 |
| Temperature Minimum (° C.) | | | 86 |
| SCB portion | | | 13.7 |
| SCB portion minimum temperature (° C.) | | | 45 |
| SCB distribution Mv | | | 162200 |
| ATREF Purge (%) | | | 11.1 |
| Purge Mv | | | 153400 |
| ATREF Overall Mv Average | | | 161200 |
| ATREF Dv viscosity - temperature slope (70-90° C. region) | | | −0.012 |

TABLE 10

Extrusion Conditions for D20 Films
Extruder 2.5 inch
Screw Davis Standard
Barrier II
Die Diameter 6 inches
Die Gap 70 mils

| Barrel Zone Temperature | | Set | Actual | Actual | Actual |
|---|---|---|---|---|---|
| Barrel 1 | F. | 375 | 376 | 375 | 375 |
| Barrel 2 | F. | 435 | 435 | 435 | 435 |
| Barrel 3 | F. | 420 | 420 | 421 | 420 |
| Barrel 4 | F. | 405 | 405 | 405 | 405 |
| Barrel 5 | F. | 405 | 404 | 406 | 404 |
| Screen Changer | F. | 420 | 420 | 420 | 420 |
| Adapter | F. | 420 | 421 | 418 | 419 |
| Rotator | F. | 420 | 424 | 430 | 412 |
| Lower Die | F. | 420 | 419 | 421 | 419 |
| Upper Die | F. | 420 | 419 | 423 | 420 |
| Output Rate | lbs/hr | | 101.1 | 101.9 | 101.9 |
| RPM | | | 51.5 | 51.5 | 51.5 |
| Rate/RPM | lbs/hr/RPM | | 1.96 | 1.98 | 1.98 |
| Barrel Pressure P1 | psi | | 2450 | 2540 | 2680 |
| Barrel Pressure P2 | psi | | 3140 | 3420 | 3030 |
| Barrel Pressure P3 | psi | | 4250 | 4350 | 4440 |
| Screen Changer | psi | | 4850 | 4740 | 4870 |
| Adapter | psi | | 1910 | 2010 | 1990 |
| Melt Temperature | F. | | 473 | 472 | 473 |

TABLE 11A

D20 Film Data

| Product | Test | Units | D20-1 | D20-2 | D20-3 |
|---|---|---|---|---|---|
| Gage | | mils | 5 | 5 | 9 |
| BUR | | | 2 | 2.1 | 2.1 |
| MI2 | ASTM D-1238-04 | g/10 min | 0.17 | 0.17 | 0.17 |
| MI21 | ASTM D-1238-04 | g/10 min | 10.7 | 10.7 | 10.7 |

TABLE 11A-continued

D20 Film Data

| Product | Test | Units | D20-1 | D20-2 | D20-3 |
|---|---|---|---|---|---|
| MFR (MI21/MI2) | | | 62.9 | 62.9 | 62.9 |
| Density | ASTM D-792-00 | g/cc | 0.9393 | 0.9393 | 0.9393 |
| COF O/I | ASTM D-1894-06 | | | | |
| Kinetic | | Dimensionless | 0.308 | 0.32 | 0.279 |
| Static | | Dimensionless | 0.348 | 0.347 | 0.408 |
| Dart A Scale | ASTM D-1709-04 | g | No Fail | No Fail | No Fail |
| Dart B scale** | ASTM D-1709-04 | g | 428 | 404 | 996 |
| Actual Thickness | | | 5.25 | 4.75 | 9.5 |
| Normalized Dart B | | g/mil | 81.5 | 85.1 | 104.8 |
| Elmendorf Tear | | | | | |
| CD (or TD) | ASTM D-1922-06a | g/mil | 460 | 390 | 260 |
| MD | ASTM D-1922-06a | g/mil | 131 | 140 | 190 |
| MD/CD | | | 0.28 | 0.36 | 0.73 |
| Gloss | ASTM D-2457-03 | % | 6.6 | 6.6 | 7.1 |
| Haze | ASTM D-1003-00 | % | 77 | 76 | 80 |
| Puncture | ASTM D-5748-07 | (Ft-Lb)/in3 | 76.5 | 71.8 | 29.8 |

**B scale dart impact - sample did not fail on the A scale.

TABLE 11B

D25 Comparative Film Data

| Product | Test | Units | D25-1 | D25-2 | D25-3 |
|---|---|---|---|---|---|
| Gage | | mils | 5 | 9 | 5 |
| BUR | | | 2 | 2.1 | 2.1 |
| MI2 | ASTM D-1238-04 | g/10 min | 0.22 | 0.22 | 0.22 |
| MI21 | ASTM D-1238-04 | g/10 min | 22.5 | 22.5 | 22.5 |
| MFR (MI21/MI2) | | | 102 | 102 | 102 |
| Density | ASTM D-792-00 | g/cc | 0.9398 | 0.9398 | 0.9398 |
| COF O/I | ASTM D-1894-06 | | | | |
| Kinetic | | Dimensionless | 0.336 | 0.252 | 0.271 |
| Static | | Dimensionless | 0.375 | 0.277 | 0.237 |
| Dart A Scale | ASTM D-1709-04 | g | 340 | 700 | 320 |
| Dart B Scale | ASTM D-1709-04 | g | — | — | — |
| Actual Thickness | | | 4.8 | 9 | 4.8 |
| Normalized Dart A | | g/mil | 70.8 | 77.8 | 66.7 |
| Elmendorf Tear | | | | | |
| CD (or TD) | ASTM D-1922-06a | g/mil | 575 | 389 | 570 |
| MD | ASTM D-1922-06a | g/mil | 77 | 124 | 90 |
| MD/CD | | | 0.13 | 0.32 | 0.16 |
| Gloss | ASTM D-2457-03 | % | 4.6 | 5 | 5.2 |
| Haze | ASTM D-1003-00 | % | 83.5 | 84.4 | 84.1 |
| Puncture | ASTM D-5748-07 | (Ft-Lb)/in3 | — | — | — |

TABLE 12A

Film Tensile Properties

| Product | Test | Units | Industry Requirements | D20-1 | D20-2 | D20-3 |
|---|---|---|---|---|---|---|
| Nominal Gage | | mils | 4-6 mils | 5 | 5 | 9 |
| BUR | | | | 2 | 2.1 | 2.1 |
| Tensile Properties | | | | | | |
| Ultimate Tensile CD | ASTM D-882-02 | psi | | 6500 | 7000 | 5270 |
| Ultimate Tensile MD | ASTM D-882-02 | psi | | 7520 | 5430 | 6560 |
| % Elongation CD | ASTM D-882-02 | | | 750 | 695 | 745 |
| % Elongation MD | ASTM D-882-02 | | | 600 | 580 | 770 |
| Yield Strength CD | ASTM D-882-02 | psi | 3350-4250 | 3380 | 3420 | 3120 |
| Yield Strength MD | ASTM D-882-02 | psi | 2750-3450 | 2990 | 2740 | 2900 |
| Secant Modulus 1% CD | ASTM D-882-02 | psi | | 92000 | 95500 | 85000 |
| Secant Modulus 2% CD | ASTM D-882-02 | psi | | 74000 | 76500 | 69000 |
| Secant Modulus 1% MD | ASTM D-882-02 | psi | | 76500 | 80000 | 77000 |
| Secant Modulus 2% MD | ASTM D-882-02 | psi | | 63000 | 65000 | 63500 |

TABLE 12B

Film Tensile Properties

| Product | Test | Units | Industry Requirements | D25-1 | D25-2 | D25-3 |
|---|---|---|---|---|---|---|
| Nominal Gage | | mils | 4-6 mils | 5 | 9 | 5 |
| BUR | | | | 2 | 2.1 | 2.1 |
| Tensile Properties | | | | | | |
| Ultimate Tensile CD | ASTM D-882-02 | psi | | 5250 | 5120 | 4910 |
| Ultimate Tensile MD | ASTM D-882-02 | psi | | 5220 | 4600 | 5830 |
| % Elongation CD | ASTM D-882-02 | | | 800 | 840 | 750 |
| % Elongation MD | ASTM D-882-02 | | | 630 | 715 | 690 |
| Yield Strength CD | ASTM D-882-02 | psi | 3350-4250 | 3080 | 3270 | 3170 |
| Yield Strength MD | ASTM D-882-02 | psi | 2750-3450 | 3065 | 2950 | 2980 |
| Secant Modulus 1% CD | ASTM D-882-02 | psi | | 102600 | 88200 | 97200 |

TABLE 12B-continued

Film Tensile Properties

| Product | Test | Units | Industry Requirements | D25-1 | D25-2 | D25-3 |
|---|---|---|---|---|---|---|
| Secant Modulus 2% CD | ASTM D-882-02 | psi | | 82600 | 72000 | 77500 |
| Secant Modulus 1% MD | ASTM D-882-02 | psi | | 82700 | 76600 | 82800 |
| Secant Modulus 2% MD | ASTM D-882-02 | psi | | 66400 | 63400 | 64400 |

What is claimed is:

1. A film comprising at least one component formed from a composition, comprising a blend, wherein said blend comprises a high molecular weight ethylene-based interpolymer and a low molecular weight ethylene-based interpolymer, and
   wherein the high molecular weight ethylene-based interpolymer is a heterogeneously branched linear or a homogeneously branched linear ethylene-based interpolymer, and has a density from 0.922 g/cc to 0.929 g/cc, and a high load melt index (I21) from 0.2 g/10 min to 1.0 g/10 min, and
   wherein the low molecular weight ethylene-based interpolymer is heterogeneously branched linear or a homogeneously branched linear ethylene-based interpolymer, and has a density from 0.940 g/cc to 0.955 g/cc, and a melt index (I2) from 6 g/10 min to 50 g/10 min; and
   wherein the blend has a single peak in an ATREF profile eluting above 30° C., and has a coefficient of viscosity average molecular weight (CMv) less than −0.0032 in the log(calculated Mv) versus elution temperature, said CMv calculated in the range of elution temperatures from 70° C. to 90° C., and wherein Mv is the viscosity average molecular weight, and
   wherein the composition has an I21/I2 ratio from 30 to 80 and a density less than, or equal to, 0.945 g/cc.

2. The film of claim 1, wherein the high molecular weight ethylene interpolymer has a density from 0.9229 g/cc to 0.9271 g/cc.

3. The film of claim 1, wherein the CMv is less than −0.0036.

4. The film of claim 1, wherein the blend is an in-situ blend.

5. The film of claim 1, wherein the composition has a density from 0.930 g/cc to 0.945 g/cc.

6. The film of claim 1, wherein the high molecular weight ethylene-based interpolymer is present in an amount from 45 to 55 weight percent, based on the sum weight of the high molecular weight ethylene-based interpolymer and the low molecular weight ethylene-based interpolymer.

7. The film of claim 1, wherein the composition has a melt index, I2, from 0.05 g/10 min to 0.5 g/10 min.

8. The film of claim 1, wherein the high molecular weight ethylene-based interpolymer is an ethylene/α-olefin interpolymer.

9. The film of claim 1, wherein the low molecular weight ethylene-based interpolymer is an ethylene/α-olefin interpolymer.

10. The film of claim 1, wherein the film is a multi-layered film.

11. The film of claim 1, wherein the film is a single layered film.

12. The film of claim 1, wherein the film has a thickness from 2 mils to 50 mils.

13. The film of claim 1, wherein the film has an Elmendorf Tear Strength greater than, or equal to, 100 g/mil, in the machine direction.

14. The film of claim 1, wherein the film has an Elmendorf Tear Strength greater than, or equal to, 220 g/mil, in the traverse direction.

15. The film of claim 1, wherein the film has a Normalized Dart Impact (B scale) greater than, or equal to, 60 g.

16. The film of claim 1, wherein the high molecular weight ethylene-based interpolymer is a heterogeneously branched linear ethylene-based interpolymer.

17. The film of claim 1, wherein the low molecular weight ethylene-based interpolymer is a heterogeneously branched linear ethylene-based interpolymer.

18. The film of claim 1, wherein weight ratio of the high molecular weight component to the low molecular weight component is from 55/45 to 45/55.

* * * * *